US010031595B2

United States Patent
Sawai et al.

(10) Patent No.: US 10,031,595 B2
(45) Date of Patent: *Jul. 24, 2018

(54) CONTROL DEVICE, INPUT DEVICE, CONTROL SYSTEM, HANDHELD DEVICE, AND CONTROL METHOD

(71) Applicant: Sony Corporation, Tokyo (JP)

(72) Inventors: Kunihito Sawai, Kanagawa (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 15/139,597

(22) Filed: Apr. 27, 2016

(65) Prior Publication Data

US 2016/0239104 A1   Aug. 18, 2016

Related U.S. Application Data

(63) Continuation of application No. 14/526,321, filed on Oct. 28, 2014, now Pat. No. 9,354,723, which is a
(Continued)

(30) Foreign Application Priority Data

Jun. 4, 2009   (JP) ................ 2009-135018

(51) Int. Cl.
G06F 3/0346 (2013.01)
G06F 3/038 (2013.01)
(Continued)

(52) U.S. Cl.
CPC ............ G06F 3/038 (2013.01); G06F 3/0346 (2013.01); G06F 3/0485 (2013.01);
(Continued)

(58) Field of Classification Search
CPC .................................................. G06F 3/0346
See application file for complete search history.

(56) References Cited

U.S. PATENT DOCUMENTS 8,531,395 B2   9/2013   Sawai et al.
8,896,528 B2   11/2014  Sawai et al.
(Continued)

FOREIGN PATENT DOCUMENTS

JP       2001-056743 A     2/2001
WO    WO 2009/020204 A1   2/2009
(Continued)

OTHER PUBLICATIONS

U.S. Appl. No. 12/785,535, filed May 24, 2010, Sawai et al.
U.S. Appl. No. 13/972,270, filed Aug. 21, 2013, Sawai et al.
U.S. Appl. No. 14/526,321, filed Oct. 28, 2014, Sawai et al.

Primary Examiner — Alexander Eisen
Assistant Examiner — Cory Almeida
(74) Attorney, Agent, or Firm — Wolf, Greenfield & Sacks, P.C.

(57) ABSTRACT

A control device includes: a receiver for receiving first information regarding the movement of a casing, and second information regarding whether to reflect the first information on the movement of coordinate values; a storage unit for storing a whole-screen region including a real-screen region, and a virtual-screen region set around the real-screen region; a generator for generating the coordinate values within the whole-screen region based on the first information; a switcher for switching a first state in which the coordinate values are movable, and a second state in which the coordinate values are immovable, based on the second information; a determining unit for determining which of the real-screen region or the virtual-screen region the coordinate values belong to; and a coordinate-value control unit for controlling the coordinate values so as to move the coordi-
(Continued)

nate values within the virtual-screen region to the position of predetermined coordinate values within the real-screen region.

20 Claims, 37 Drawing Sheets

Related U.S. Application Data continuation of application No. 13/972,270, filed on Aug. 21, 2013, now Pat. No. 8,896,528, which is a continuation of application No. 12/785,535, filed on May 24, 2010, now Pat. No. 8,531,395.

(51) Int. Cl.
| | | |
|---|---|---|
| *G06F 3/0481* | (2013.01) | |
| *G06F 3/0485* | (2013.01) | |
| *G06T 3/40* | (2006.01) | |
| *G06T 3/60* | (2006.01) | |
| *G06T 11/20* | (2006.01) | |

(52) U.S. Cl.
CPC ............ *G06F 3/04812* (2013.01); *G06T 3/40* (2013.01); *G06T 3/60* (2013.01); *G06T 11/206* (2013.01); *G06F 2203/04801* (2013.01)

(56) References Cited

U.S. PATENT DOCUMENTS

| | | | |
|---|---|---|---|
| 2006/0048072 A1* | 3/2006 | Jarrett | G06F 3/0485 715/784 |
| 2007/0176899 A1* | 8/2007 | Yoo | G06F 3/03542 345/158 |
| 2008/0204404 A1* | 8/2008 | Kneissler | G06F 3/0317 345/156 |
| 2010/0265175 A1* | 10/2010 | Kabasawa | G06F 3/0346 345/159 |
| 2010/0309123 A1 | 12/2010 | Sawai et al. | |
| 2014/0062878 A1 | 3/2014 | Sawai et al. | |
| 2015/0049019 A1 | 2/2015 | Sawai et al. | |

FOREIGN PATENT DOCUMENTS

| WO | WO 2009/072504 A1 | | 6/2009 |
|---|---|---|---|
| WO | WO2009072504 | * | 6/2009 |

\* cited by examiner

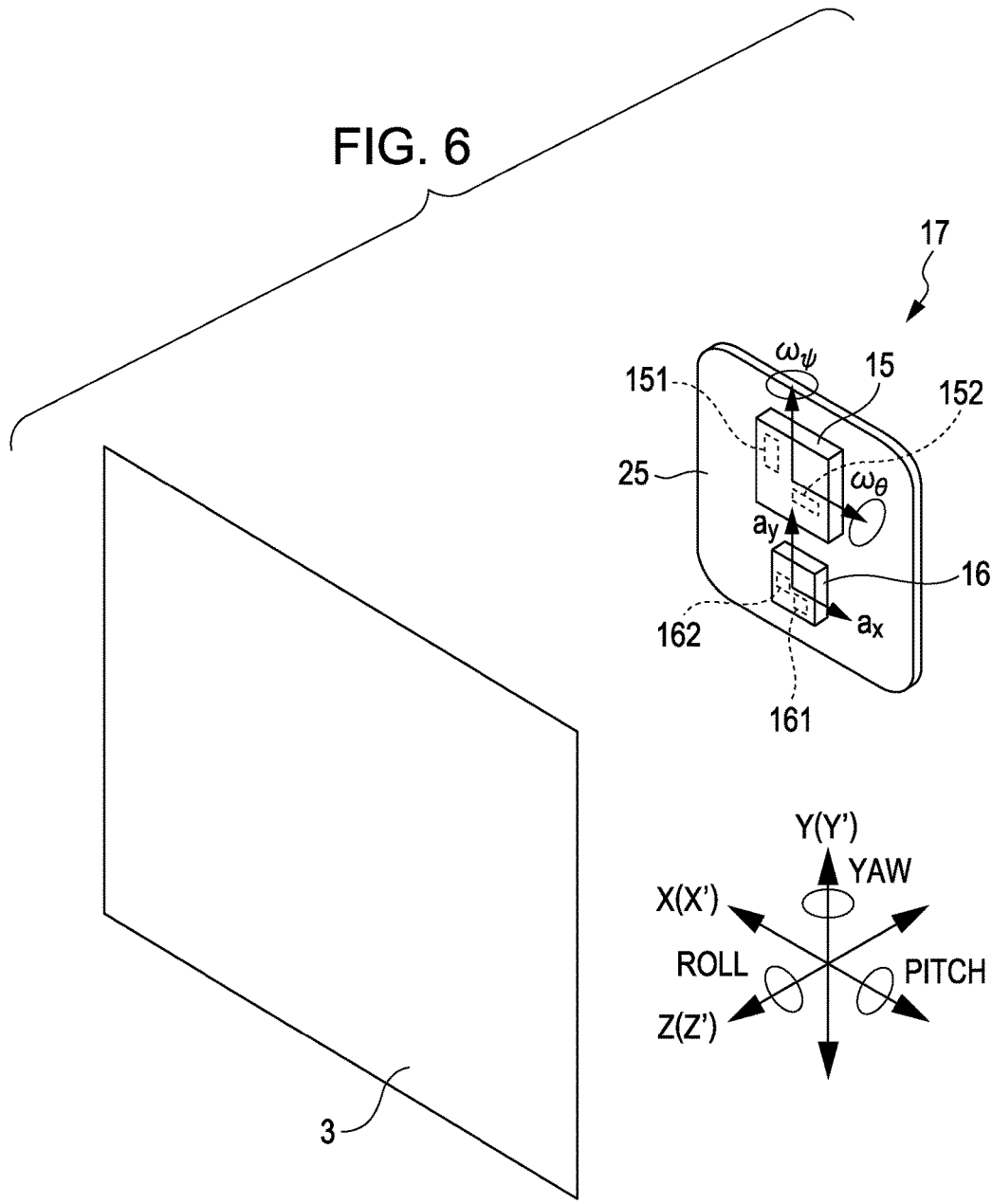

$\omega 1 < \omega 2 < \omega 3$

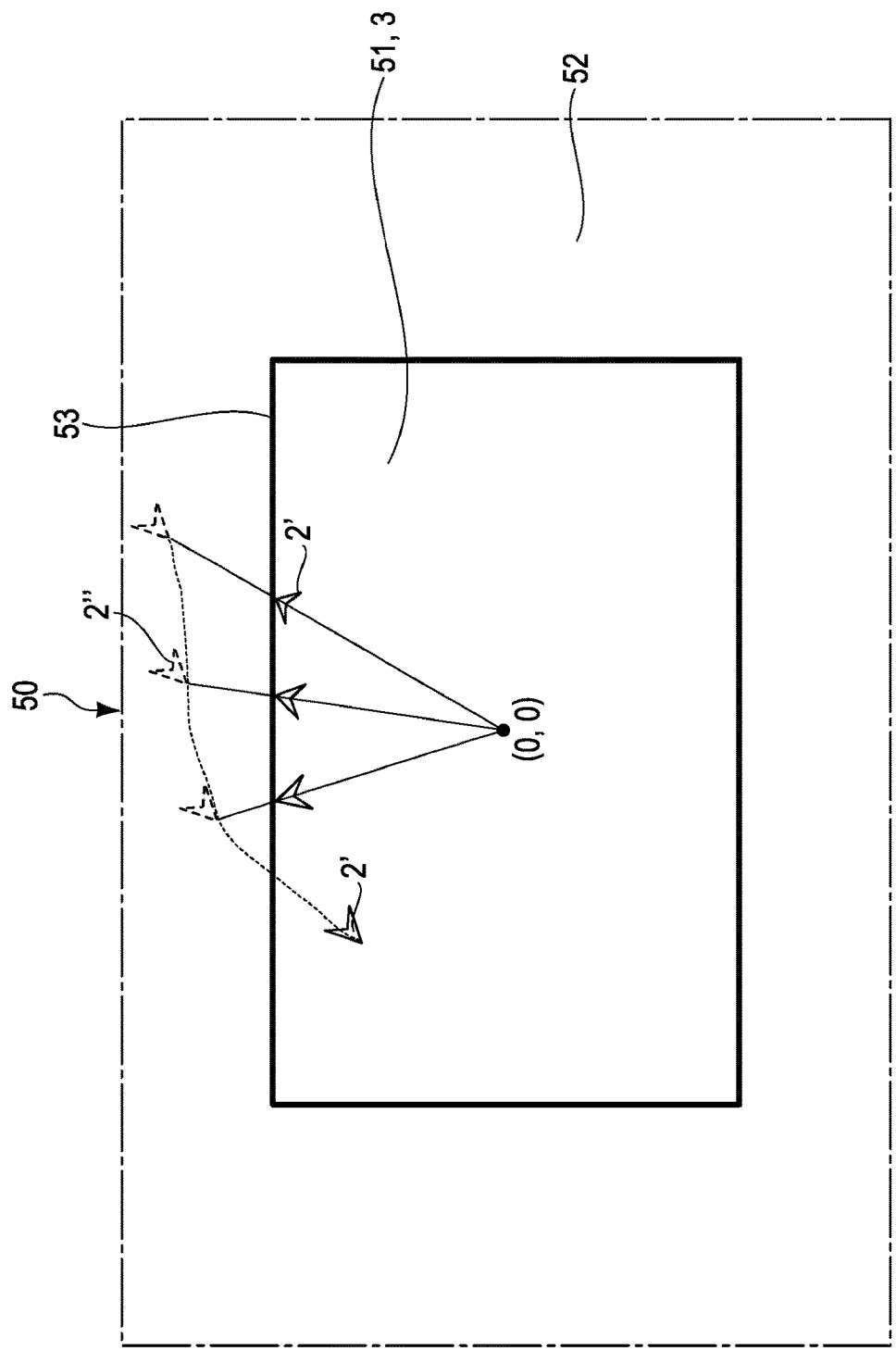

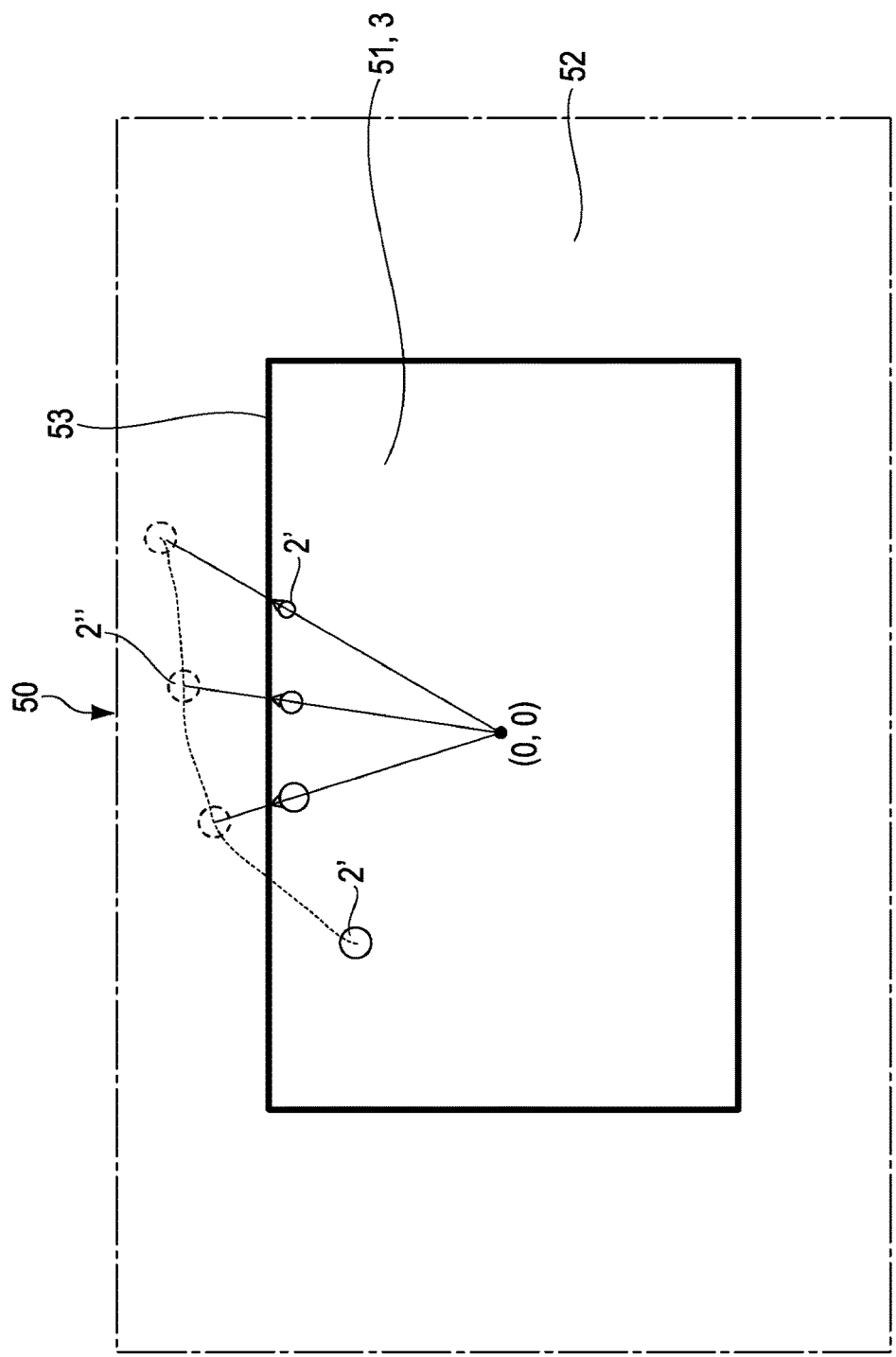

CONTROL DEVICE, INPUT DEVICE, CONTROL SYSTEM, HANDHELD DEVICE, AND CONTROL METHOD

RELATED APPLICATIONS

This application is a continuation of and claims the benefit under 35 U.S.C. § 120 of U.S. patent application Ser. No. 14/526,321, titled "CONTROL DEVICE, INPUT DEVICE, CONTROL SYSTEM, HANDHELD DEVICE, AND CONTROL METHOD" and filed Oct. 28, 2014, which is a continuation of and claims the benefit under 35 U.S.C. § 120 of U.S. patent application Ser. No. 13/972,270, titled "CONTROL DEVICE, INPUT DEVICE, CONTROL SYSTEM, HANDHELD DEVICE, AND CONTROL METHOD" and filed Aug. 21, 2013, which is a continuation of U.S. patent application Ser. No. 12/785,535, titled "CONTROL DEVICE, INPUT DEVICE, CONTROL SYSTEM, HANDHELD DEVICE, AND CONTROL METHOD" and filed May 24, 2010, which claims priority and benefit under 35 U.S.C. § 119 of Japanese Patent Application Serial No. 2009-135018, filed in the Japan Patent Office on Jun. 4, 2009, each of which is hereby incorporated by reference in its entirety.

BACKGROUND OF THE INVENTION

1. Field of the Invention

The present invention relates to a control device, an input device, a control system, a handheld device, and a control method, which control the coordinate values of a pointer.

2. Description of the Related Art

Input devices such as a mouse, a touch pad, and the like have been principally employed as controllers for GUI (Graphical User Interface) which is commonplace with PCs (Personal Computers). GUI has not stayed at the HI (Human Interface) of PCs according to the related art, and has been used, for example, as interfaces of AV equipment or game machines used in the living room or the like with a television set as an image medium. Various types of input devices serving as spatial operation types which a user can operate in 3D space have been proposed as such a GUI controller (e.g., see Japanese Unexamined Patent Application Publication No. 2001-56743 (paragraphs [0030] and [0045], FIG. 2), and International Publication No. 2009/020204 (paragraphs [0145] through [0152], [0194] through [0199], FIG. 7)).

The input device described in Japanese Unexamined Patent Application Publication No. 2001-56743 (paragraphs and [0045], FIG. 2) detects the angular velocity of the input device by an angular velocity sensor, generates the displacement information of a cursor according to the angular velocity thereof, and transmits this to a control device. The control device moves the cursor on a screen according to the displacement information transmitted from the input device.

With the input device described in Japanese Unexamined Patent Application Publication No. 2001-56743 (paragraphs and [0045], FIG. 2), an arrangement is made wherein the displacement information of the cursor is transmitted all the time, and accordingly, the cursor may perform movement that the user does not intend. For example, after finishing use of the input device, when the user attempts to put the input device on a table, the cursor is moved on the screen despite the user's intentions along with the movement of the input device.

As for a technique relating to such a problem, with International Publication No. 2009/020204 (paragraphs through [0152], [0194] through [0199], FIG. 7), an input device including two-step operating type operating buttons having a move button, a determine button, and a surface button whereby the move button and the determine button can consecutively be pressed, is described. With this input device, in a state in which the surface button is not pressed by the user, a pointer is not moved on the screen. In the event of the surface button being half-pressed by the user, the move button at the first step is pressed, and the movement of the pointer is started on the screen. In the event of the surface button further being pressed by the user, the determine button at the second step is pressed, and predetermined processing is executed on the screen. Subsequently, when releasing the finger from the surface button, pressing of the move button is released, the movement of the pointer on the screen is stopped. The user can arbitrarily control starting and stopping of the movement of the pointer, and accordingly, the user's unintentional movement of the pointer is restricted.

SUMMARY OF THE INVENTION

Incidentally, such an input device as described in Japanese Unexamined Patent Application Publication No. 2001-56743 (paragraphs [0030] and [0045], FIG. 2), and International Publication No. 2009/020204 (paragraphs through [0152], [0194] through [0199], FIG. 7) is a relative device having relative relationship between the direction indicated by the input device and the display position of the pointer. In the case of the user operating the pointer using such an input device, the direction indicated by the input device and the display position of the pointer may not completely agree, giving the user an unnatural feeling.

For example, in the case that a menu shape is displayed on the edge portion of the screen, when the user is pointing within the range of the menu shape, the pointer moves to the edge portion of the screen, and though the pointer does not move any more, the user continuously attempts to move the input device. Therefore, mismatch between the display position of the pointer and the relative position of the input device occurs at the edge portion of the screen, giving the user an unnatural feeling.

In order to solve such a problem, for example, it can be conceived as an effective tool to set a virtual screen region around the real screen region. Thus, the operating range of the pointer by the input device can be prevented from being restricted to the narrow real screen region. Thus, it can be conceived to prevent mismatch between the display position of the pointer and the relative position of the input device from occurring at the edge portion of the real screen region.

Now, let us assume a combination of a mode wherein a virtual screen region is set around the real screen region, and a mode wherein, such as described in International Publication No. 2009/020204 (paragraphs [0145] through [0152], [0194] through [0199], FIG. 7), the move button is provided to the input device.

In this case, let us say that in the event that a virtual pointer (a virtual pointer conceptually determined to exist within the virtual screen region) is being operated within the virtual screen region, the user releases pressing of the move button. Thus, the movement of the virtual pointer is stopped within the virtual screen region.

However, the user is prevented from visually recognizing the virtual pointer within the virtual screen region. In the case that the virtual pointer exists within the virtual screen region, for example, in the event of a mode wherein a real pointer (pointer to be actually displayed) is displayed on the edge portion on the screen, the user instinctively attempts to restart the movement of the pointer by pointing the real pointer on the screen that can visually be recognized using the input device, and repressing the move button.

However, in this case, the substantial coordinate values of the pointer exist on the position of the virtual pointer within the virtual screen region but not the position of the displayed real pointer. Thus, a problem occurs wherein mismatch is caused between the display position of the pointer, and the relative position between that position and the pointing direction of the input device.

It has been found desirable to provide a technique such as a control device or the like whereby mismatch between the display position of the pointer, and the relative position between that position and the pointing direction of the input device, can be prevented from occurring.

A control device according to an embodiment of the present invention is a control device which controls, based on first information relating to the movement of a casing, and second information relating to whether to reflect the movement of the casing on the movement of coordinates values, which are transmitted from an input unit, the coordinate values, and includes a reception unit, a storage unit, generating unit, switching unit, determining unit, and coordinate-value control unit.

The reception unit configured to receive the first information and the second information. The storage unit configured to store the whole screen region including a real screen region equivalent to a real screen, and a virtual screen region that is a virtual region set in the circumference of the real screen region. The generating unit is configured to generate the coordinate values within the whole screen region based on the first information. The switching unit is configured to switch a first state in which the coordinate values are movable, and a second state in which the coordinate values are immovable, based on the second information. The determining unit is configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

"Virtual image region" may be set to all portions around the real screen region, or may be set to a portion around the real screen region.

"The case that the first state and the second state are switched" includes both of a case where the first state (the state in which the coordinate values are movable) is switched to the second state (the state in which the coordinate values are immovable), and a case where the second state is switched to the first state.

With the present invention, in the case that the coordinate values belong to the virtual screen region, and in the event that the movable state and the immovable state of the coordinate values is switched, the coordinate values within the virtual region may be moved to a predetermined position within the real screen region. Thus, for example, in the case that pressing of the move button is released by the user, and the coordinate values of the pointer are stopped within the virtual region, the coordinate values thereof may be moved to the positions of the coordinate values within the real screen region. Typically, in the case that the coordinate values exist within the real screen region, the pointer is displayed on the position thereof.

In the case that the user intends to start the movement of the pointer again, and points the pointer displayed within the real screen region using the input device, the substantial position according to the coordinate values of the pointer, and the relative position between that position and the pointing direction of the input device are matched. Thus, when the user presses the move button again to start the movement of the pointer again, mismatch between the display position of the pointer, and the relative position between that position and the position of the input device can be prevented from occurring.

The control device may further include display control unit. The display control unit controls, in the case that the coordinate values belong to the real screen region, the display of the real screen so as to display the pointer on the position according to the coordinate values within the real screen region. Also, the display control unit controls, in the case that the coordinate values belong to the virtual screen region, the display of the real screen so as to display the pointer on a position on the edge portion of the real screen region according to the coordinate values within the virtual screen region.

With the present invention, in the case that the coordinate values belong to the virtual screen region, the pointer is displayed on the edge portion of the real screen region. Thus, for example, in the case that an icon or the like is displayed near the edge portion of the real screen region, operations of the displayed icon or the like are facilitated.

With the control device, the coordinate-value control unit may control the coordinate values so as to move the coordinate values within the virtual screen region to a position where the pointer within the real screen region is displayed. Alternatively, the coordinate-value control unit may control the coordinate values so as to move the coordinate values within the virtual screen region to the center of the real screen region.

With the control device, the display control unit may control, in the case that the coordinate values belong to the virtual screen region, the display so as to display the pointer on an intersection of the edge portion of the real screen region, and a straight line connecting the center of the real screen region, and the coordinate values.

With the control device, the display control unit may change the display mode of the pointer displayed on the edge portion of the real screen region according to the movement of the coordinate values within the virtual screen region.

Thus, the user can readily recognize that the coordinate values of the pointer exist within the virtual screen region, and which position within the virtual screen region the coordinate values are positioned.

"Change in the display mode of the pointer" includes the rotation of the pointer, change in the degree of deformation, change in rotation speed, change in size, change in color, change in color density, change in blinking speed, change due to animation expressions, and the like.

With the control device, the display control unit may change the display mode of the pointer so that the pointer displayed on the edge portion of the real screen region indicates the direction of the coordinate values within the virtual screen region.

Thus, the user can readily recognize the direction of the coordinate values of the pointer within the virtual screen region.

With the control device, the display control unit may change the display mode of the pointer according to distance between the coordinate values within the virtual screen region, and the pointer displayed on the edge portion of the real screen region.

Thus, the user can readily recognize the distance between the pointer displayed on the edge portion of the real screen region, and the coordinate values of the pointer within the virtual screen region.

With the control device, the reception unit may receive a determination command transmitted from the input device. In this case, the coordinate-value control unit may control, when the coordinate values belong to the virtual screen region, and also the determination command is received, the coordinate values so as to move the coordinate values within the virtual screen region to the position of predetermined coordinate values within the real screen region.

With the control device, in the case of further including display control unit, the display control unit may display, in the case that the coordinate values belong to the virtual screen region, a small screen including an indication object indicating the positions of the coordinate values as to the whole screen region, and indicating the whole screen region, on a predetermined within the real screen region.

Thus, the user can readily visually recognize the positions of the coordinate values of the pointer within the virtual screen region.

With the control device, the storage unit may store a selection operating object serving as the selection operating object of the input device as a selection operating region by being correlated with a portion or the whole of the virtual screen region. In this case, the control device may further include a processing unit configured to execute, in the case that the coordinate values belong to the selection operating region, processing corresponding to the selection operating object.

Thus, the user can operate the selection operating object with a sense of operating the selection operating region within the virtual screen region.

Examples of "selection operating object" include channel selection of a broadcast program or the like, selection of playback or stop of a moving image, selection of fast forward or fast rewind, frame forward or frame rewind of still images, and the like, which is an object that can become various selection items.

"Selection operating region" may be correlated with not only the virtual screen region but also the real screen region.

A control device according to another embodiment of the present invention is a control device configured to control coordinate values based on information relating to the movement of a casing that is transmitted from an input device including a selecting unit configured to select a first state for reflecting the movement of the casing on the movement of the coordinate values, and a second state for not reflecting thereon, a transmission unit configured to transmit the information, and a transmission control unit configured to control transmission of the information so as to move the coordinate values in the first state, and so as not to move the coordinate values in the second state, and the control device includes a reception unit, a storage unit, generating unit, determining unit, and coordinate-value control unit.

The reception unit configured to receive the information. The storage unit configured to store the whole screen region including a real screen region equivalent to a real screen, and a virtual screen region that is a virtual region set in the circumference of the real screen region. The generating unit is configured to generate the coordinate values within the whole screen region based on the information. The determining unit is configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

An input device according to an embodiment of the present invention includes a casing, a detecting unit, a selecting unit, a storage unit, generating unit, generation control unit, determining unit, and coordinate-value control unit.

The detecting unit configured to detect the movement of the casing. The selecting unit configured to select a first state for reflecting the movement of the casing on the movement of coordinate values, and a second state for not reflecting thereon. The storage unit configured to store the whole screen region including a real screen region equivalent to a real screen, and a virtual screen region that is a virtual region set in the circumference of the real screen region. The generating unit is configured to generate the coordinate values within the whole screen region based on the movement of the casing. The generation control unit is configured to control generation of the coordinate values so as to move the coordinate values in the first state, and so as not to move the coordinate values in the second state. The determining unit configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

A control system according to an embodiment of the present invention includes an input device, and a control device.

The input device includes a casing, a detecting unit, a selecting unit, and a transmission unit.

The detecting unit configured to detect the movement of the casing. The selecting unit configured to select whether to reflect the movement of the casing on the movement of coordinate values. The transmission unit configured to transmit first information relating to the movement of the casing, and second information relating to whether to reflect the movement of the casing on the movement of the coordinates.

The control device includes a reception unit, a storage unit, generating unit, switching unit, determining unit, and coordinate-value control unit.

The reception unit configured to receive the first information and the second information. The storage unit configured to store the whole screen region including a real screen region equivalent to a real screen, and a virtual screen region that is a virtual region set in the circumference of the real screen region. The generating unit is configured to generate the coordinate values within the whole screen region based on the first information. The switching unit is configured to switch a first state in which the coordinate values are movable, and a second state in which the coordinate values are immovable, based on the second information. The determining unit is configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

A control system according to another embodiment of the present invention includes an input device, and a control device.

The input device includes a casing, a detecting unit, a selecting unit, a transmission unit, and transmission control unit.

The detecting unit configured to detect the movement of the casing. The selecting unit configured to select a first state for reflecting the movement of the casing on the movement of coordinate values, and a second state for not reflecting thereon. The transmission unit configured to transmit information relating to the movement of the casing. The transmission control unit is configured to control transmission of the information so as to move the coordinate values in the first state, and so as not to move the coordinate values in the second state.

The control device includes a reception unit, a storage unit, generating unit, determining unit, and coordinate-value control unit.

The reception unit configured to receive the information. The storage unit configured to store the whole screen region including a real screen region equivalent to a real screen, and a virtual screen region that is a virtual region set in the circumference of the real screen region. The generating unit is configured to generate the coordinate values within the whole screen region based on the information. The determining unit is configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

A handheld device according to an embodiment of the present invention includes a casing, a display unit, a detecting unit, a selecting unit, a storage unit, generating unit, generation control unit, determining unit, and coordinate-value control unit.

The display unit is provided to the casing. The detecting unit configured to detect the movement of the casing. The selecting unit configured to select a first state for reflecting the movement of the casing on the movement of coordinate values, and a second state for not reflecting the movement of the casing on the movement of the coordinate values. The storage unit configured to store the whole screen region including a real screen region equivalent to a real screen to be displayed on the display unit, and a virtual screen region that is a virtual region set in the circumference of the real screen region. The generating unit is configured to generate the coordinate values within the whole screen region based on the movement of the casing. The generation control unit is configured to control generation of the coordinate values so as to move the coordinate values in the first state, and so as not to move the coordinate value in the second state. The determining unit is configured to determine which of the real screen region or the virtual screen region the coordinate values belong to. The coordinate-value control unit is configured to control, in the case that the coordinate values belong to the virtual screen region, and also the first state and the second state are switched, the coordinate values so as to move the coordinate values within the virtual screen region to the position of predetermined coordinate values within the real screen region.

A control method according to an embodiment of the present invention includes storing the whole screen region including a real screen region equivalent to a real screen, and a virtual screen region that is a virtual region set in the circumference of the real screen region.

Coordinate values within the whole screen region are generated based on the movement of a casing. A first state in which the coordinate values are movable and a second state in which the coordinate values are immovable are switched. Determination is made regarding which of the real screen region or the virtual screen region the coordinate values belong to. In the case that the coordinate values belong to the virtual screen region, and also the first state and the second state are switched, the coordinate values are controlled so as to move the coordinate values within the virtual screen region to the position of predetermined coordinate values within the real screen region.

With the above description, components described as units may be realized by hardware, or may be realized by both software and hardware. In the case of a component being realized by both software and hardware, hardware thereof includes at least a storage device which stores a software program.

The hardware is typically configured by selectively employing at least one of CPU (Central Processing Unit), MPU (Micro Processing Unit), RAM (Random Access Memory), ROM (Read Only Memory), DSP (Digital Signal Processor), FPGA (Field Programmable Gate Array), ASIC (Application Specific Integrated Circuit), NIC (Network Interface Card), WNIC (Wireless NIC), modem, optical disc, magnetic disk, and flash memory.

As described above, according to the present invention, there can be provided a technique such as a control device or the like whereby mismatch between the display position of the pointer, and the relative position between that position and the pointing direction of the input device can be prevented from occurring when a user switches starting and stopping of the movement of the pointer.

BRIEF DESCRIPTION OF THE DRAWINGS

FIG. 6 is a perspective view illustrating a sensor unit;

FIGS. 29A and 29B are diagrams illustrating an example in the case that the shape of the real pointer is changed according to distance between the real pointer and the virtual pointer in the event that the center coordinates (origin (0, 0)) of the real screen region are taken as a reference;

DESCRIPTION OF THE PREFERRED EMBODIMENTS

Embodiments of the present invention will be described below with reference to the drawings.

First Embodiment

Overall Configuration of Control System and Configuration of Each Unit

Figure 1:
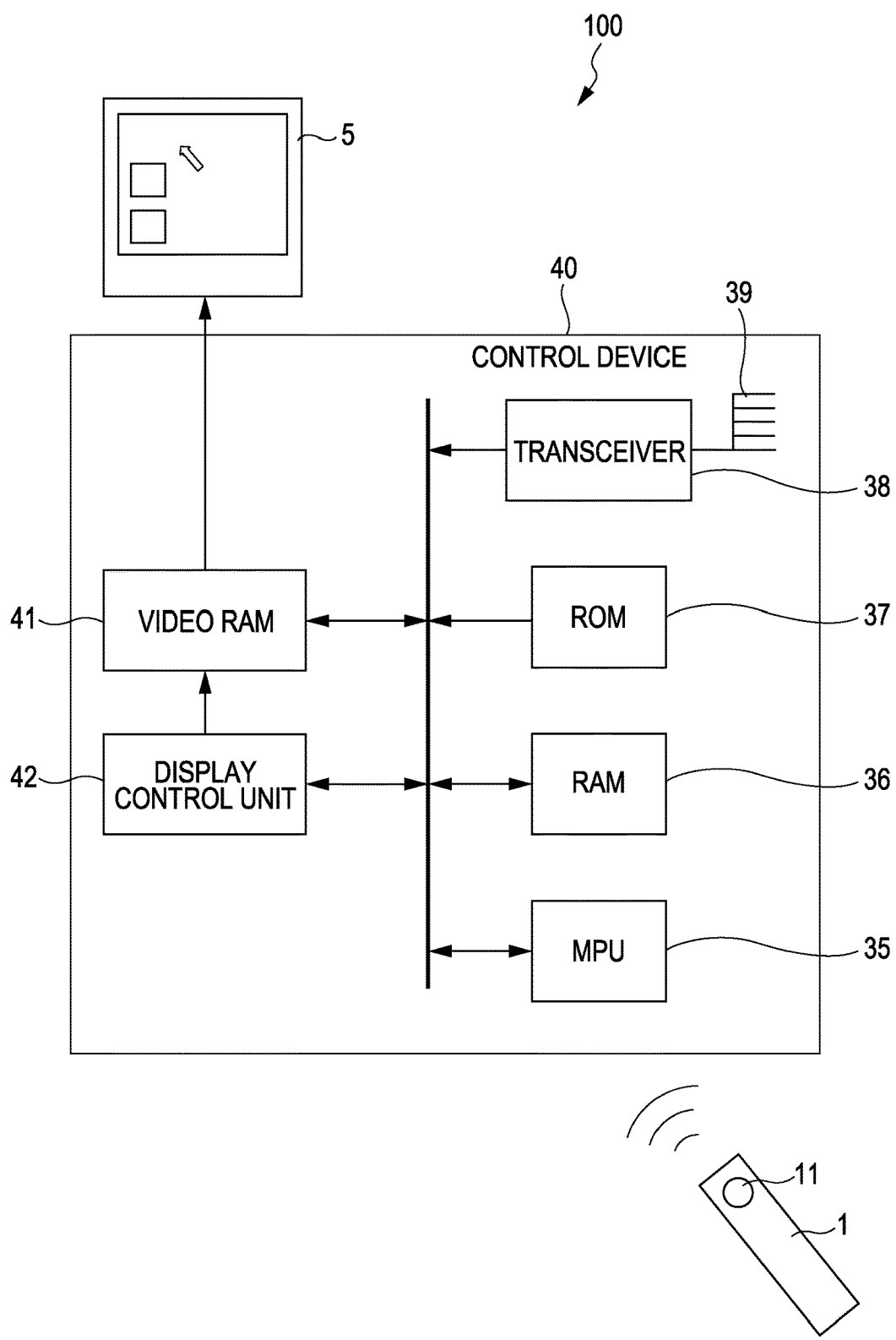
FIG. 1 is a diagram illustrating a control system according to an embodiment of the present invention.
Figure 2:
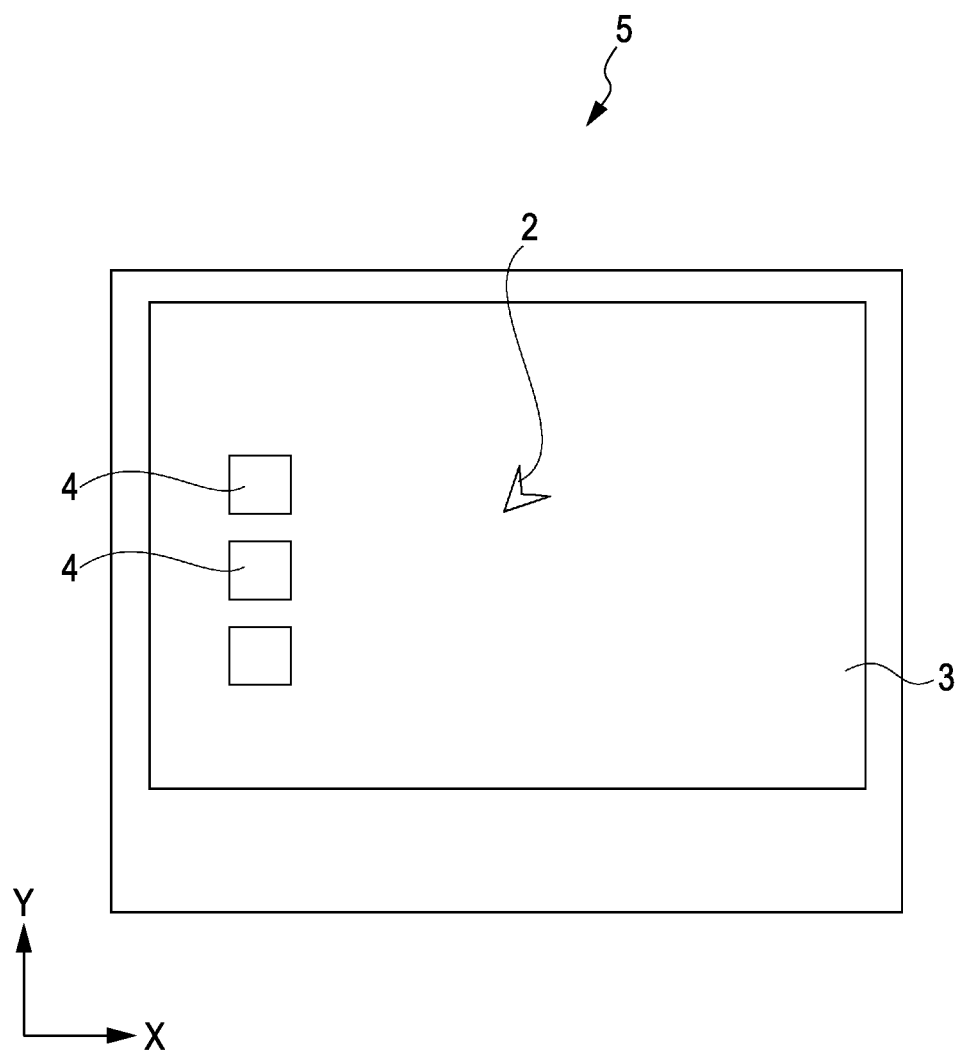
FIG. 2 is a diagram illustrating an example of a screen to be displayed on a display device.

FIG. 1 is a diagram illustrating a control system according to a first embodiment of the present invention. A control system 100 includes a display device 5, a control device 40, and an input device 1. FIG. 2 is a diagram illustrating an example of a screen 3 to be displayed on the display device 5. GUI such as a pointer 2, icons 4, and the like are displayed on the screen 3. The pointer 2 has, for example, the shape of feathers on an arrow. However, the shape of the pointer 2 is not restricted to this, and for example may be a simple circle or a polygonal shape or the like. The shape of the pointer 2 is not particularly restricted.

The icons 4 are images obtained by the content of a program function, an execution command, or a file on a computer being imaged on the screen 3.

The display device 5 is configured of, for example, a liquid crystal display, an EL (Electro-Luminescence) display, or the like. The display device 5 may be a device integrated with a display capable of receiving a television broadcast or the like, or may be a device in which such a display and the control device 40 are integrated.

Figure 3:
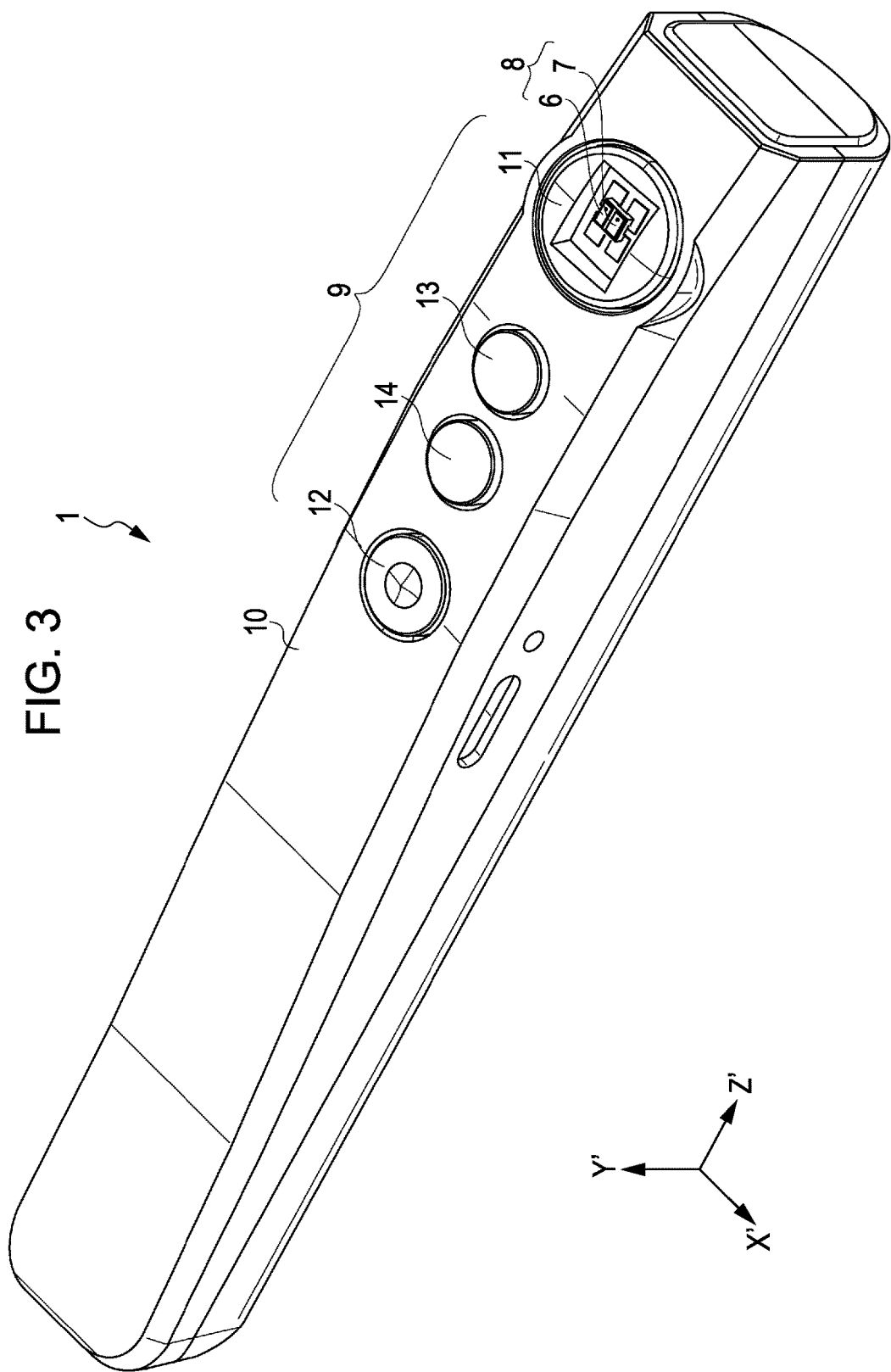
FIG. 3 is a perspective view illustrating an input device.

FIG. 3 is a perspective view illustrating the input device 1. As shown in FIG. 3, the input device 1 includes a casing 10, and an operating portion 9 having various buttons 11 through 14 disposed on the upper portion of the casing 10. The casing 10 has a long shape in one direction, and has a size so as to be fit into the user's grasped hand.

The operating portion 9 includes a button disposed on the tip portion side of the upper portion of the casing 10, a button 12 disposed near the center of the upper portion of the casing 10, and buttons 13 and 14 disposed between the buttons 11 and 12.

The button 11 is an operating portion capable of two-step switching. The button 11 includes an optical sensor 8, and this optical sensor 8 serves as a switch at the first step. Also, the button 11 houses a switch 23 (see FIG. 4) for detecting that the button 11 is pressed, and this switch 23a serves as a switch at the second step.

A function serving as a movement control button, i.e., a function for the user arbitrarily controlling the movement of the pointer 2 is assigned to the switch at the first step (optical sensor 8) of the button 11. Also, a function serving as a determine button (e.g., a function equivalent to the left button of a planar operation type mouse) is assigned to the switch at the second step (switch 23a) of the button 11.

The optical sensor 8 is a reflective-type optical sensor, and includes, for example, a light-emitting element 6 made up of an LED (Light Emitting Diode) or the like, and a light-receiving element 7 made up of a photo transistor or the like. According to this optical sensor 8, whether or not there is the user's finger (e.g., thumb) above the button 11 is detected.

In the case that there is the user's finger above the button 11, light emitted from the light emitting element 6 is reflected at the user's finger, input to the light-receiving element 7, and a light-receiving signal is output from the light-emitting element 7. The control system 100 switches a state in which the pointer 2 is movable, and a state in which the pointer 2 is immovable based on this light receiving signal.

Now, there are two modes of a mode wherein the pointer 2 is movable on the screen 3 in the case that there is the user's finger above the button 11, and a mode wherein the pointer 2 is movable on the screen 3 in the case that there is no user's finger above the button 11. The control system 100 does not care either mode, but with the present embodiment, for convenience of description, description will be made assuming a mode wherein the pointer 2 is movable on the screen 3 in the case that there is the user's finger above the button 11.

In FIG. 3, though drawing is omitted, a condenser lens member for condensing light emitted from the optical sensor 8, and light reflected at the user's finger is disposed above the optical sensor 8. The condenser lens member is made up of an optically-transparent resin, for example, such as polycarbonate, acrylic resin, or the like, but is not restricted to these. The upper surface of the condenser lens member is formed integrally with the upper surface of the button 11.

Note that the switch at the first step is not restricted to the optical sensor 8, and accordingly, another sensor such as an electrostatic capacity sensor or the like may be used.

A function equivalent to the right button of a mouse is assigned to the button 12 provided near the center of the casing 10. Also, functions such as increase/decrease of volume, fast forward/fast rewind of a moving image to be displayed on the screen 3, up/down of the channel such as a broadcast program or the like, or the like are assigned to the buttons 13 and 14. Note that the layout and assigned functions of the buttons 11 through 14 may be changed as appropriate.

Figure 4:
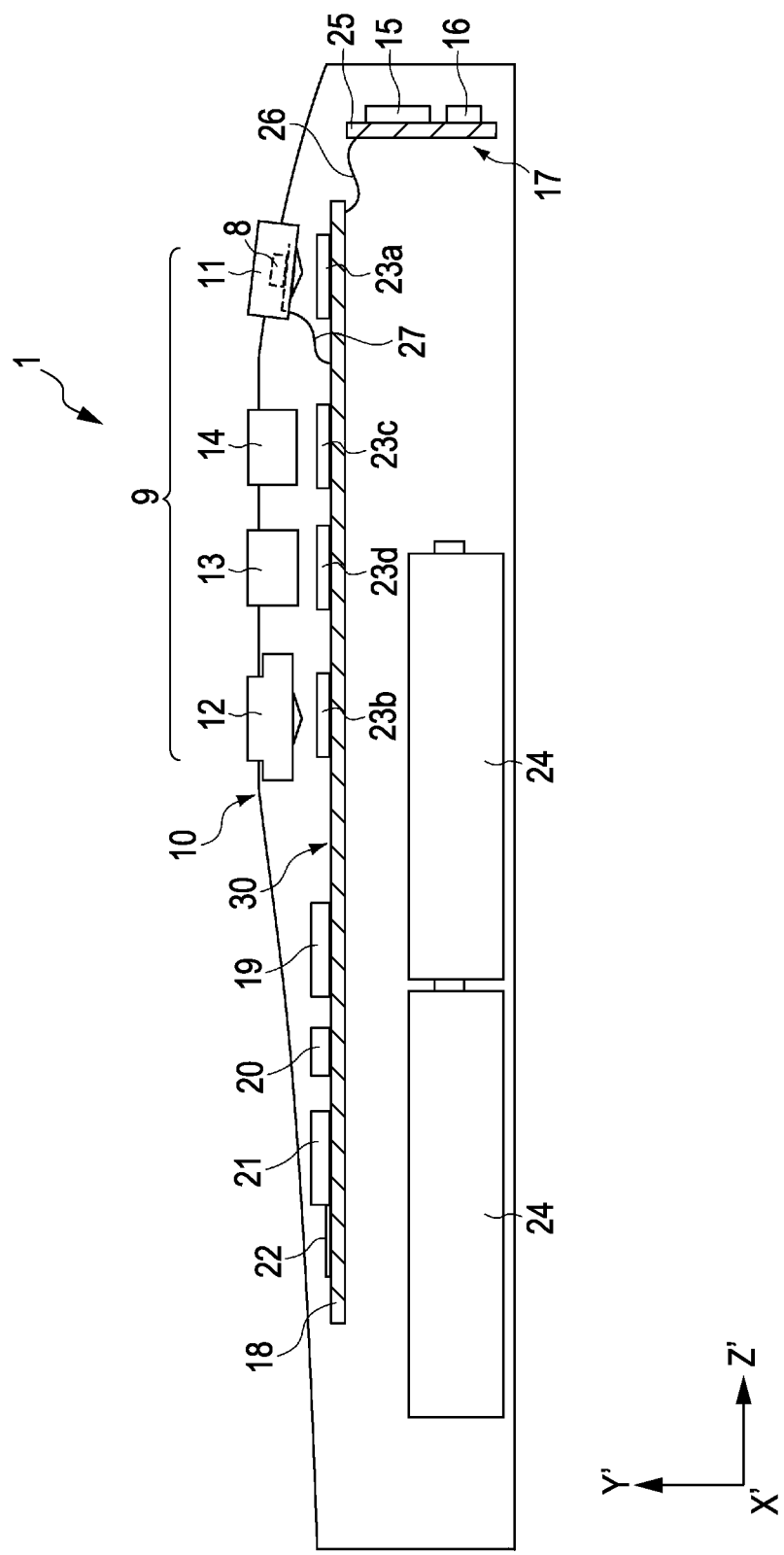
FIG. 4 is a diagram schematically illustrating the internal configuration of the input device.
Figure 5:
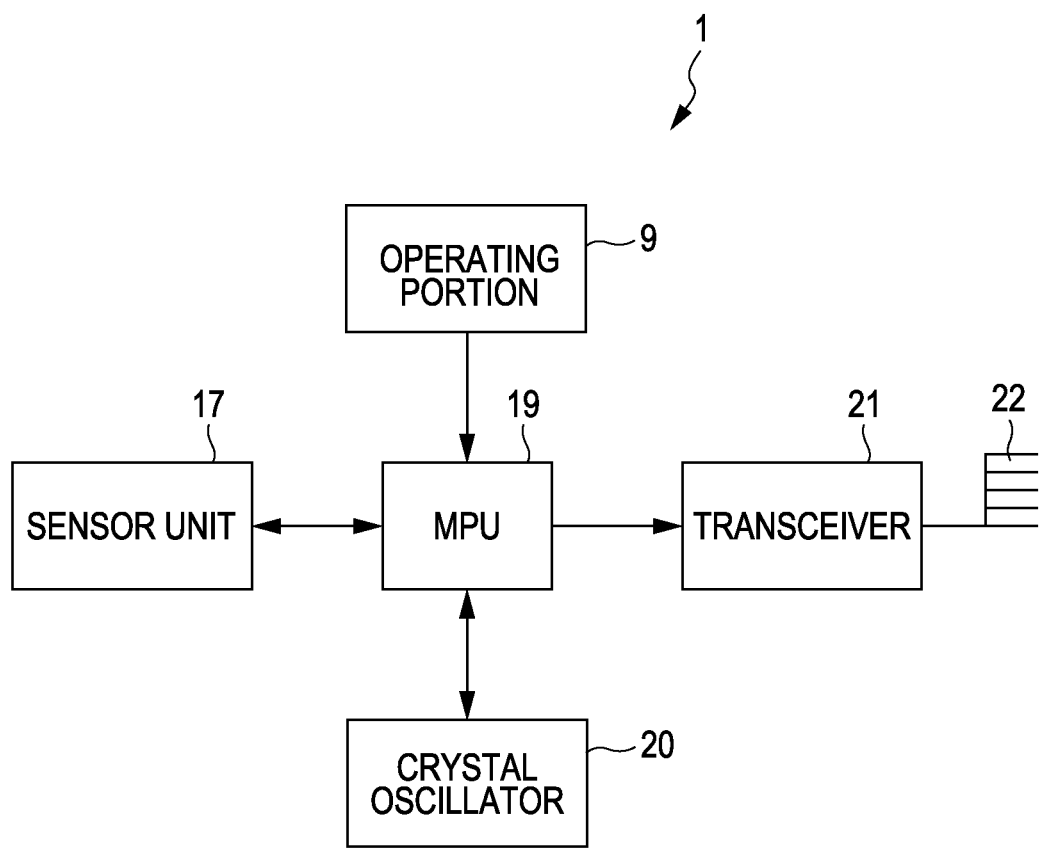
FIG. 5 is a block diagram illustrating the electric configuration of the input device.

FIG. 4 is a diagram schematically illustrating the internal configuration of the input device 1. FIG. 5 is a block diagram illustrating the electric configuration of the input device 1. The input device 1 includes a sensor unit 17, a control unit 30, and a battery 24.

FIG. 6 is a perspective view illustrating the sensor unit 17. Note that, within the present Specification, a coordinate system moving along with the input device 1, i.e., the coordinate system fixed to the input device 1 is represented with X' axis, Y' axis, and Z' axis. On the other hand, a coordinate system which stays still on the earth, i.e., an inertial coordinate system, is represented with X axis, Y axis, and Z axis. Also, with the following description, regarding the movement of the input device 1, the rotational direction of the circumference of the X' axis will be referred to "pitch direction", the rotational direction of the circumference of the Y' axis will be referred to "yaw direction", and the rotational direction of the circumference of the Z' axis (roll axis) will be referred to "roll direction", The sensor unit 17 includes an angular velocity sensor unit 15 for detecting mutually different angles, e.g., the angular velocity of the circumference of the orthogonal two axes (X' axis and Y' axis). That is to say, the angular velocity sensor unit 15 includes two sensors of a first angular velocity sensor 151, and a second angular velocity sensor 152.

Also, the sensor unit 17 includes an acceleration sensor unit 16 for detecting acceleration along mutually orthogonal two axes. That is to say, the acceleration sensor unit 16 includes two sensors of a first acceleration sensor 161, and a second acceleration sensor 162.

The angular velocity sensor unit 15 and acceleration sensor unit 16 are packaged and mounted on a circuit substrate 25.

FIG. 6 illustrates a case where the angular velocity sensor unit 15 and the acceleration sensor unit 16 are mounted on either end surface (front surface) of the circuit substrate 25. However, a mounting method is not restricted to this, the angular velocity sensor unit 15 and the acceleration sensor unit 16 may be mounted separately on both surfaces of the circuit substrate, respectively. In this case, the size of the circuit substrate 25 can be reduced, and as a result thereof, the rigidity of the circuit substrate 25 can be enhanced.

As for the angular velocity sensor 151 and 152, an oscillation gyro sensor for detecting Coriolis force proportional to angular velocity is employed. As for the acceleration sensors 161 and 162, any type of sensor may be employed, such as a piezoresistance type, a piezo-electricity type, a capacity type, or the like. The angular velocity sensors 151 and 152 are not restricted to an oscillation gyro sensor, and accordingly, a rotation coma gyro sensor, a laser ring gyro sensor, a gas rate gyro sensor, or an earth magnetism type gyro sensor may be employed.

As shown in FIG. 4, let us say that the longitudinal direction, width direction, and thickness direction of the casing 10 are the Z'-axis direction, X'-axis direction, and Y'-axis direction, respectively. In this case, the sensor unit 17 is housed in the casing 10 so that the surface where the acceleration sensor unit 16 and the angular velocity sensor unit 15 are mounted, of the circuit substrate 25 is substantially parallel to an X'-Y' plane. Thus, both sensor units 15 and 16 detect, such as described above, angular velocity and acceleration regarding the X' axis and the Y' axis, respectively.

As shown in FIGS. 4 and 5, the control unit 30 includes a main substrate 18, an MPU 19 (Micro Processing Unit) mounted on the main substrate 18 (or CPU), a crystal oscillator 20, a transceiver 21, and an antenna 22 printed on the main substrate 18. Also, the control unit 30 includes switches 23a through 23d provided so as to correspond to the buttons 11 through 14 respectively, on the main substrate 18.

The main substrate 18 and the circuit substrate 25 are electrically connected by a flexible lead wire 26 made up of, for example, a FFC (Flexible Flat Cable) or the like. Also, the main substrate 18 and the optical sensor 8 are electrically connected by a flexible substrate 27 made up of, for example, a FPC (Flexible Printed Circuit).

The MPU 19 houses volatile and nonvolatile memory. The MPU 19 inputs the detection signal from the sensor unit 17, the operation signal from the operating portion (including the light-receiving signal from the optical sensor 8), and the like, and in order to generate a predetermined control signal according to these input signals, executes various types of computation processing and the like. The above memory may be provided separately from the MPU 19.

Typically, the sensor unit 17 outputs analog signals. In this case, the MPU 19 includes an A/D (Analog/Digital) converter. However, the sensor unit 17 may be a unit including an A/D converter.

The transceiver 21 transmits the control signal generated at the MPU 19 to the control device 40 via the antenna 22 as a RF wireless signal. Also, the transceiver 21 may receive various types of signal transmitted from the control device 40.

The crystal oscillator 20 generates clocks, and supplies this to the MPU 19. A dry cell or a rechargeable battery or the like is used as the battery 24.

As shown in FIG. 1, the control device 40 includes an MPU 35 (or CPU), RAM 36, ROM 37, video RAM 41, a display control unit 42, an antenna 39, and a transceiver 38.

The transceiver 38 receives the control signal transmitted form the input device 1 via the antenna 39. Also, the transceiver 38 may transmit predetermined various signals to the input device 1. The MPU 35 analyzes the control signal thereof to execute various types of computation processing. The display control unit 42 principally generates image data to be displayed on the screen 3 of the display device 5 according to the control of the MPU 35. The video RAM 41 serves as a work region of the display control unit 42, and temporarily stores the generated image data.

The control device 40 may be a dedicated device for the input device 1, or may be a PC or the like. The control device 40 is not restricted to a dedicated device for the input device, and may be a computer integrated with the display device 5, or may be an audio/visual device, projector, game machine, or car navigation device, or the like.

Figure 7A:
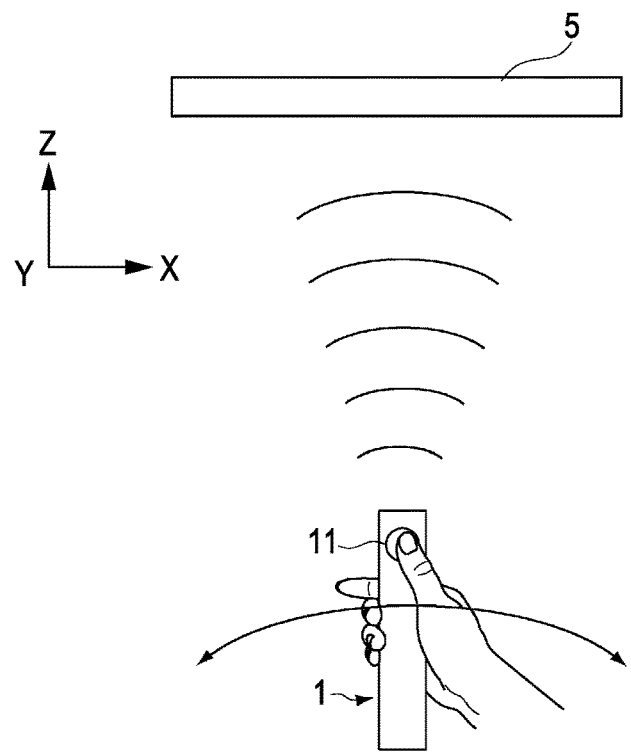
FIGS. 7A and 7B are diagrams for describing how to operate the input device, and a typical example of the movement of a pointer due to this.
Figure 7B:
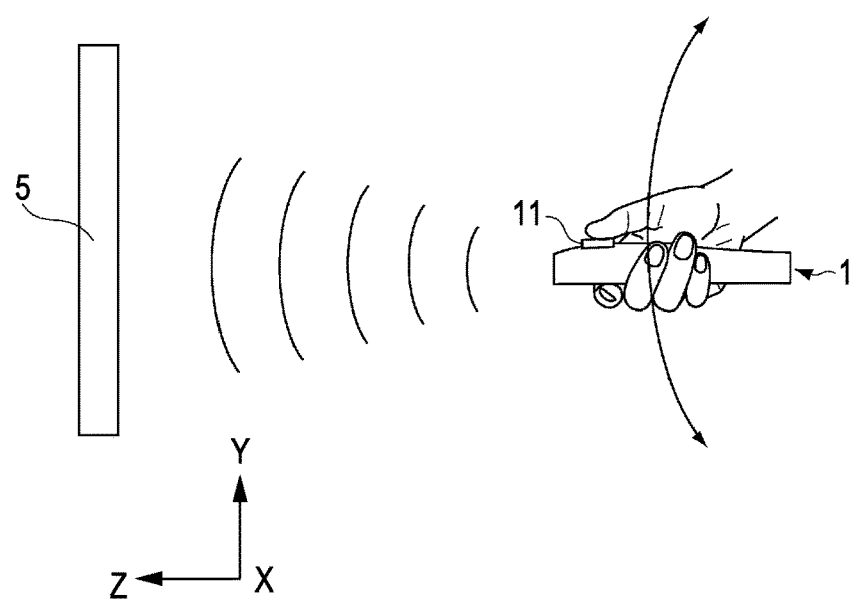

Next, how to operate the input device 1, and a typical example of the movement of the pointer 2 thereby will be described. FIGS. 7A and 7B are explanatory diagrams thereof. As shown in FIGS. 7A and 7B, the user grasps the input device 1 with the thumb being turned up, and directs the tip side of the input device 1 toward the display device 5. In this state, the circuit substrate 25 of the sensor unit 17 (see FIG. 6) is almost parallel to the screen 3 of the display device 5, and the two axes that are the detection axes of the sensor unit 17 correspond to the horizontal axis (X axis) and the vertical axis (Y axis) on the screen 3. Hereafter, the attitude of the input device 1 such as shown in FIGS. 7A and 7B will be referred to as "basic attitude".

First, in a basic attitude state, the user makes the thumb enter above the button 11 to set the pointer 2 to a movable state.

Subsequently, such as shown in FIG. 7A, the user shakes the wrist and arm in the horizontal direction, i.e., yaw direction from the basic attitude state. At this time, the first acceleration sensor 161 detects acceleration $a_x$ in the X'-axis direction, and the first angular velocity sensor 151 detects angular velocity N in the circumference of the Y'-axis. Based on the detection values thus detected, the control system 100 controls the display of the pointer 2 so that the pointer 2 moves in the horizontal-axis direction on the screen 3.

On the other hand, such as shown in FIG. 7B, in a basic attitude state, the user shakes the wrist and arm in the vertical direction, i.e., pitch direction. At this time, the second acceleration sensor 162 detects acceleration $a_y$ in the Y'-axis direction, and the second angular velocity sensor 152 detects angular velocity $\omega_\theta$ in the circumference of the X'-axis. Based on these detection values thus detected, the control system 100 controls the display of the pointer 2 so that the pointer 2 moves in the vertical-axis direction on the screen 3.

Figure 8:
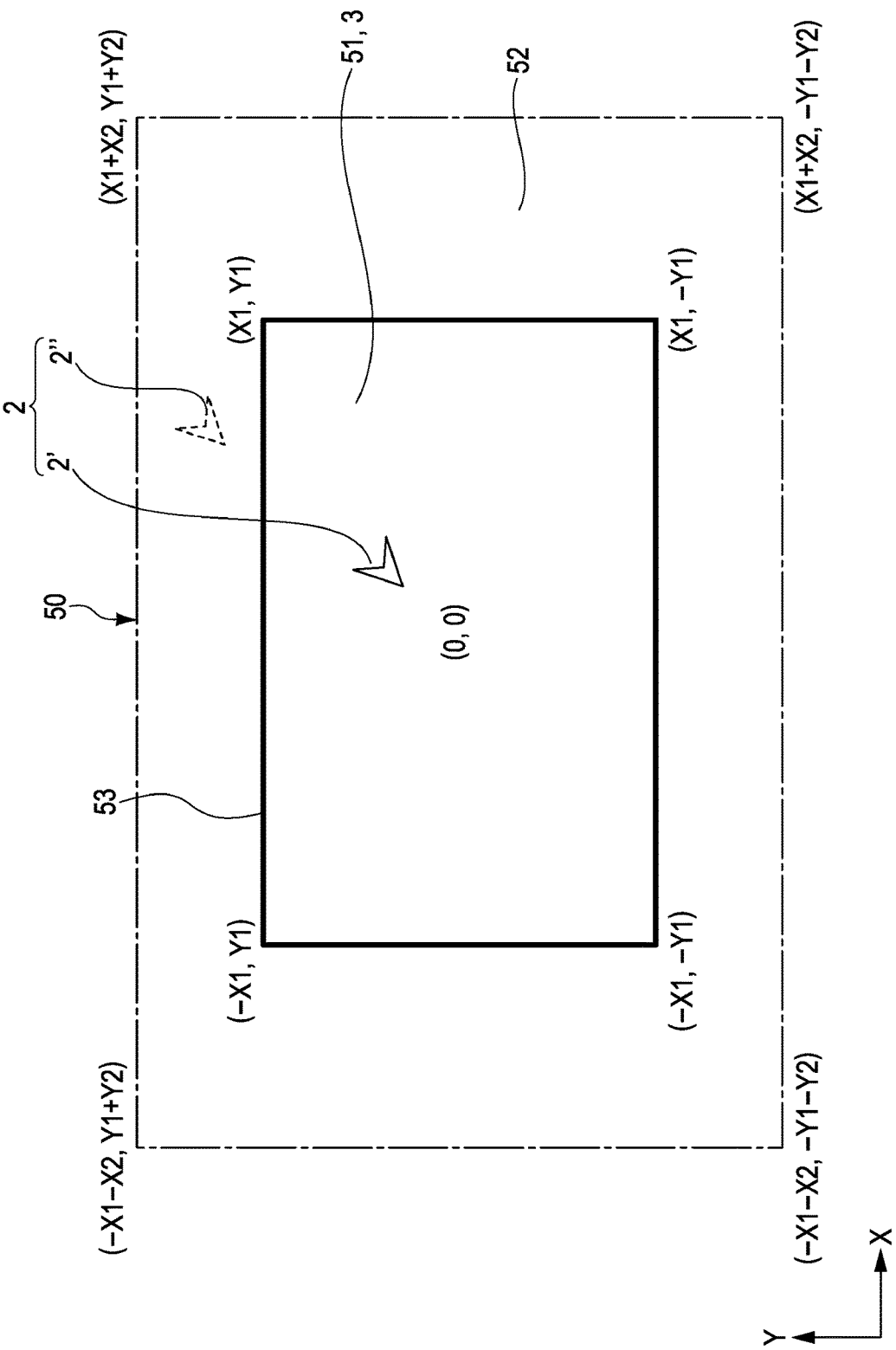
FIG. 8 is a diagram illustrating the whole screen region to be stored in a control device.

Next, description will be made regarding the whole screen region that the control device 40 stores. FIG. 8 is a diagram illustrating the whole screen region 50 to be stored in the control device 40.

The whole screen region 50 is divided into a real screen region 51 and a virtual screen region 52, which are stored in, for example, the ROM 37, RAM 36, or another memory of the control device 40. The real screen region 51 is a region equivalent to the screen 3 to be actually displayed on the display device 5, and the virtual screen region 52 is a virtual region set in the circumference of the real screen region 51.

The numbers of vertical and horizontal pixels of the real screen region 51 are taken as Xr and Yr, respectively. The numbers of pixels of the whole screen region are taken as Xv and Yv, respectively.

Examples of the numbers of horizontal and vertical pixels (Xr, Yr) of the real screen region 51 include (800, 600), (1280, 1024), (1920, 1080), and (2048, 1152). However, the numbers thereof are not restricted to these, and of course, other values may be employed.

The numbers of horizontal and vertical pixels (Xv, Yv) of the whole screen region 50 should be greater than (Xr, Yr). For example, when (Xr, Yr) are (800, 600), (Xv, Yv) may be set to, for example, (1280, 1024) or more (or less). For example, when (Xr, Yr) are (1920, 1080), (Xv, Yv) are (3920, 3080) or the like. However, any combination between (Xr, Yr) and (Xv, Yv) may be employed.

The size of the whole screen region 50 as to the real screen region 51 (the size of the virtual screen region 52 as to the real screen region 51) may be changed based on the content of processing executed by the control device 40. For example, in the case that the control device 40 executes processing regarding a game, and the game thereof is displayed on the display device 5, the whole screen region 50 may be set to a greater size as to the real screen region 51. Also, for example, in the case that the control device 40 executes processing regarding the Internet, and a web image or the like is displayed on the display device 5, the whole screen region 50 may be set to a smaller size as to the size of the whole screen region 50 when the processing regarding the game is being executed.

The MPU 35 of the control device 40 generates coordinate values with a coordinate system including the real screen region 51 and the virtual screen region 52 (the coordinate system of the whole screen region 50), which will be described later in detail. In this case, in the event that the generated coordinate values are included in the real screen image 51, the coordinate values thereof become the coordinate values of a real pointer 2', and in the event that the generated coordinate values are included in the virtual screen image 52, the coordinate values thereof become the coordinate values of a virtual pointer 2".

Now, the real pointer 2' is, in the case that coordinate values exist within the real screen region 51, a pointer to be actually displayed on the positions of the coordinate values thereof. Also, the virtual pointer 2" is, in the case that coordinate values exist within the virtual screen region 52, a virtual pointer conceptually determined to exist on the positions of the coordinate values thereof.

Note that, with the present Specification, let us say that in the case of simply being mentioned as the pointer 2, both of the real pointer 2' and the virtual pointer 2" are included.

With the coordinate system of the whole screen region 50, for example, the center of the real screen region 50 is taken as the origin (0, 0). The coordinate values of the four corners of the real screen region 51 are taken as, in the clockwise order from the coordinate value of the upper-right corner, (X1, Y1), (X1, −Y1), (−X1, −Y1), and (−X1, Y1). Also, the coordinate values of the four corners of the whole screen region 50 (the four corners of the virtual screen region 52) are taken as, in the clockwise order from the coordinate value of the upper-right corner, (X1+X2, Y1+Y2), (X1+X2, −Y1−Y2), (−X1−X2, −Y1−Y2), and (−X1−X2, Y1+Y2).

Note that, as described above, the coordinate values of the corners of the whole screen region 50 (the corners of the virtual screen region 52) may be changed according to the processing content executed by the control device 40.

FIG. 8 illustrates a mode wherein the virtual screen region 52 is set to all portions of the circumference of the real screen region 51. However, the mode is not restricted to this, and accordingly, the virtual screen region 52 may be set to a portion of the circumference of the real screen region 51.

Description of Operation

Next, the processing of the control system 100 will be described.

Processing when Coordinate Values are Generated with the Coordinate System of the Whole Screen Region 50 According to the Operation of the Input Device 1

First, description will be made regarding the processing of the control system 100 when coordinate values are generated with the coordinate system of the whole screen region 50 according to the operation of the input device 1.

Figure 9:
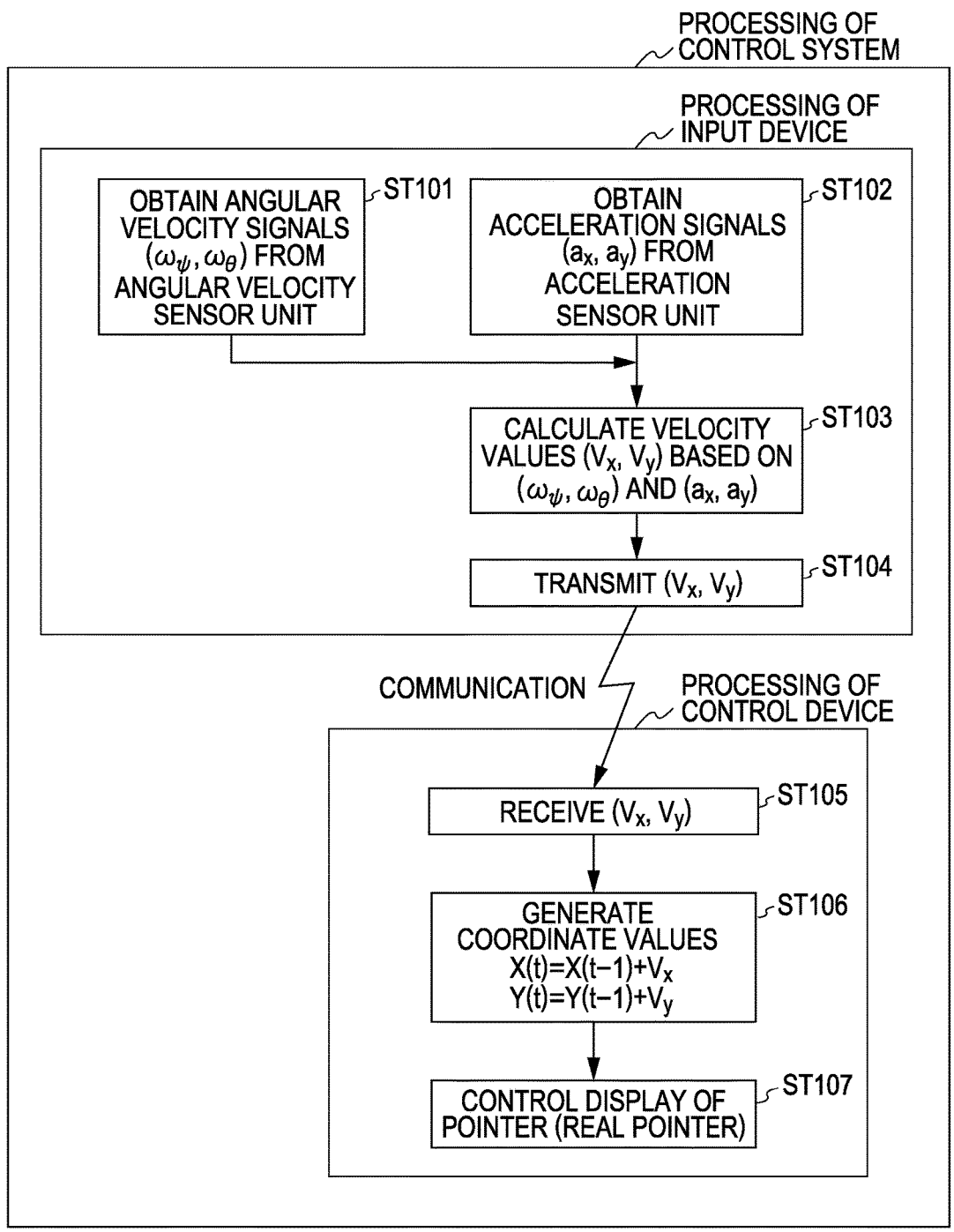
FIG. 9 is a diagram for describing operation when the coordinate values of the pointer within the whole screen region are generated according to the movement of the input device.

FIG. 9 is a flowchart illustrating the operation at that time. Note that, with description in FIG. 9, for convenience of description, description will be made assuming that the pointer 2 (including the real pointer 2' and the virtual pointer 2") is constantly in a movable state within the whole screen region 50. As shown in FIG. 9, when the angular velocity signals of the two axes are output from the angular velocity sensor unit 15, the MPU 19 of the input device 1 obtains angular velocity values ($\omega_\psi$, $\omega_\theta$) according to these angular velocity signals (ST101).

Also, when the acceleration signals of the two axes are output from the acceleration sensor unit 16, the MPU 19 obtains acceleration values ($a_x$, $a_y$) according to the acceleration signals of the two axes (ST102).

The MPU 19 typically performs obtaining of the angular velocity values ($\omega_\psi$, $\omega_\theta$) (ST101), and obtaining of the acceleration values ($a_x$, $a_y$) (ST102) in a synchronous manner. However, obtaining of the angular velocity values ($\omega_\psi$, $\omega_\theta$), and obtaining of the acceleration values ($a_x$, $a_y$) do not have to be performed in a synchronous manner (simultaneously). For example, the MPU 19 may obtain the acceleration values ($a_x$, $a_y$) after obtaining the angular velocity values ($\omega_\psi$, $\omega_\theta$), or may obtain the angular velocity values ($\omega_1$, $\omega_\theta$) after obtaining the acceleration values ($a_x$, $a_y$).

The MPU 19 calculates, based on the acceleration values ($a_x$, $a_y$) and the angular velocity values ($\omega_\psi$, $\omega_\theta$), velocity values (first velocity value $V_x$, second velocity value $V_y$) by a predetermined calculation (ST103). The first velocity value $V_x$ is a velocity value in a direction along the X' axis, and the second velocity value $V_y$ is a velocity value in a direction along the Y' axis.

As for a calculation method for the velocity values, a method may be quoted wherein the MPU 19 obtains the turning radiuses ($R_\psi$, $R_\theta$) of the operation of the input device 1 by dividing the acceleration values ($a_x$, $a_y$) by the angular velocity values ($\omega_\psi$, $\omega_\theta$), and multiplying the turning radiuses ($R_\psi$, $R_\theta$) by the angular velocity values ($\omega_\psi$, $\omega_\theta$), thereby obtaining the velocity values. The turning radiuses ($R_\psi$, $R_\theta$) may be obtained by dividing rates of change in acceleration ($\Delta a_x$, $\Delta a_y$) by rates of change in angular velocity ($\Delta(\Delta\omega_\psi)$, $\Delta(\Delta\omega_\theta)$). In the event that the turning radiuses ($R_\psi$, $R_\theta$) is obtained by dividing rates of change in acceleration ($\Delta a_x$, $\Delta a_y$) by rates of change in angular velocity ($\Delta(\Delta\omega_{104})$, $\Delta(\Delta\omega_\theta)$), influence of gravitational acceleration may be eliminated.

In the event that the velocity values are calculated by such a calculation method, a sense of operation corresponding to the user's intuition is obtained, and also the movement of the pointer 2 on the screen 3 is accurately fit into the operation of the input device 1. However, the velocity values ($V_x$, $V_y$) do not have to be calculated by the above calculation method.

As for another example of the calculation method for the velocity values ($V_x$, $V_y$), a method may be quoted wherein the MPU 19 obtains the velocity values, for example, by integrating the acceleration values ($a_x$, $a_y$), and also the angular velocity values ($\omega_\psi$, $\omega_\theta$) are used as assistance of the integration calculation thereof. Alternatively, the velocity values ($V_x$, $V_y$) may be obtained by simply integrating the acceleration values ($a_x$, $a_y$). Alternatively, the detected angular velocity values ($\omega_\psi$, $\omega_\theta$) may be employed as the displacement information of the pointer 2.

The MPU 19 transmits the information of the calculated velocity values ($V_x$, $V_y$) to the control device 40 via the transceiver 21 and the antenna 22 (ST104).

The MPU 35 of the control device 40 receives the information of the velocity values ($V_x$, $V_y$) via the antenna 39 and the transceiver 38 (ST105). In this case, the input device 1 transmits the velocity values ($V_x$, $V_y$) at predetermined clock intervals, i.e., at predetermined time intervals, and the control device 40 receives the velocity values for every predetermined number of clocks.

Upon receiving the velocity values, the MPU 35 of the control device 40 adds the velocity values ($V_x$, $V_y$) to the last coordinate values (X(t-1), Y(t-1)) to generate new coordinate values (X(t), Y(t)) by the following Expressions (1) and (2) (ST106).

$$X(t)=X(t-1)+V_x \quad (1)$$

$$Y(t)=Y(t-1)+Y_x \quad (2)$$

The new generated coordinate values (X(t), Y(t)) are coordinate values within the whole screen region 50 (see FIG. 8), and accordingly, the coordinate values (X(t), Y(t)) satisfy the following Expressions (3) and (4).

$$-X1-X2 \leq X(t) \leq X1+X2 \quad (3)$$

$$-Y1-Y2 \leq Y(t) \leq Y1+Y2 \quad (4)$$

Upon the new coordinate values (X(t), Y(t)) being generated within the whole screen region 50, the MPU 35 controls the display of the pointer 2 (real pointer 2') according to the positions of the generated coordinate values (ST107).

Note that, with the present embodiment, in the case that the generated coordinate values are included in the real screen region 51, the pointer 2 (real pointer 2') is displayed on the position according to the coordinate values within the real screen region 51, and in the case that the generated coordinate values are included in the virtual screen region 52, the pointer 2 (real pointer 2') is displayed on the position according to the coordinate values within the virtual screen region 52 (on the edge portion of the real screen region 51). The details regarding the display position of the pointer 2 will be described later.

Here, the calculation of the velocity values ($V_x$, $V_y$) may be executed by the control device 40. In this case, the input device 1 transmits the information of the angular velocity values ($\omega_\psi$, $\omega_\theta$) and the acceleration values ($a_x$, $a_y$) to the control device 40 via the transceiver 21 and the antenna 22. The control device 40 calculates the velocity values ($V_x$, $V_y$) based on the information of the angular velocity values ($\omega_\psi$, $\omega_\theta$) and the acceleration values ($a_x$, $a_y$) received via the antenna 39 and the transceiver 38. The calculation method for the velocity values is such as described above.

Processing Executed by the Control Device 100 for Switching the Movable State and the Immovable State of the Pointer 2

Next, description will be made regarding, in the case that the button 11 (first step) has been operated by the user, processing executed by the control system 100 for switching the movable state and the immovable state of the pointer 2 according to the operation thereof. Hereafter, description will be made regarding a method for switching the movable state and the immovable state of the pointer 2 by referring to several examples.

Figure 10:
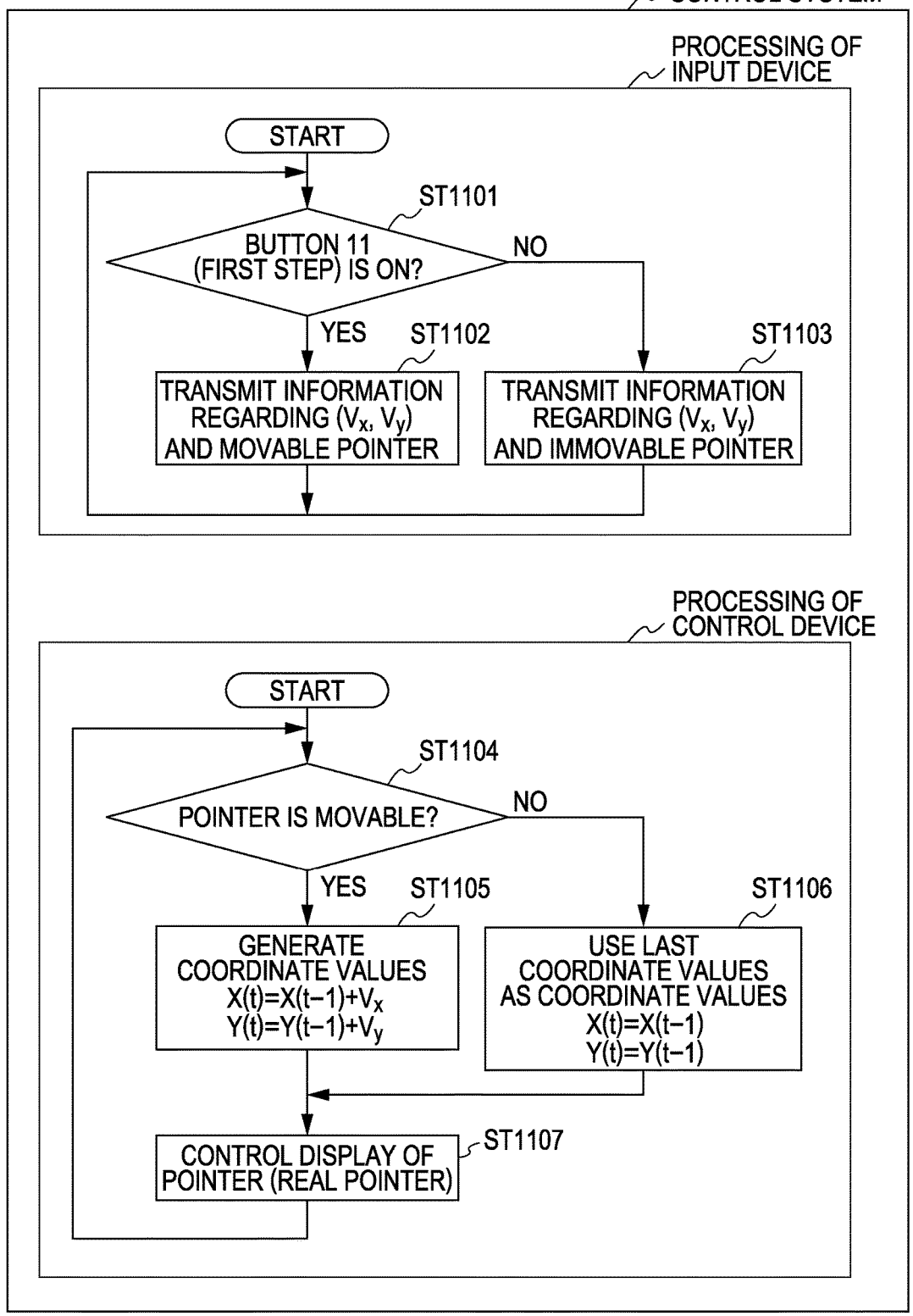
FIG. 10 is a diagram illustrating an example of processing of the control system in the case of switching the movable state and the immovable state of the pointer.
Figure 11:
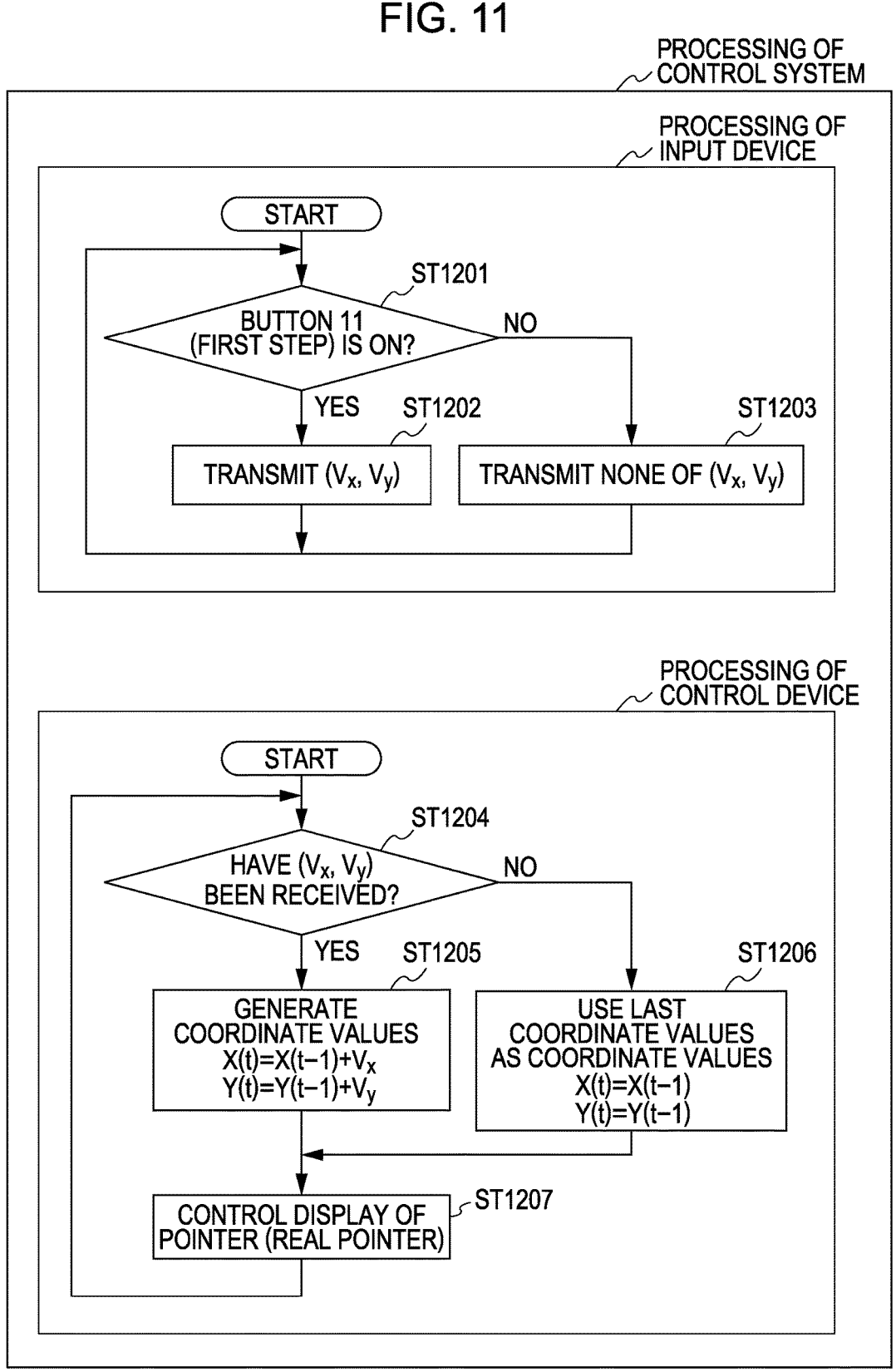
FIG. 11 is a diagram illustrating an example of processing of the control system in the case of switching the movable state and the immovable state of the pointer.

FIGS. 10 and 11 are diagrams illustrating an example of the processing of the control system 100 in the case of switching the movable state and the immovable state of the pointer 2, respectively. As shown in FIG. 10, the MPU 19 of the input device 1 determines whether or not the first step of the button 11 (optical sensor 8) is in an on state (ST1101). Upon the user making the thumb enter above the button 11 of the input device 1, light emitted from the light-emitting element 6 of the optical sensor 8 is reflected at the thumb, and input to the light-receiving element 7. Upon light being input to the light-receiving element 7, a light-receiving signal is output from the light-receiving element 7, and input to the MPU 19. In this case, the MPU 19 determines that the first step of the button 11 (optical sensor 8) is in an on state.

In the case that the first step of the button 11 is in an on state (YES in ST1101), the MPU 19 transmits the information of the velocity values $(V_x, V_y)$ (first information), and the movable information of the pointer 2 (second information) to the control device 40 (ST1102).

On the other hand, in the case that the first step of the button 11 is in an off state (NO in ST1101), the MPU 19 transmits the information of the velocity values $(V_x, V_y)$ (first information), and the immovable information of the pointer 2 (second information) to the control device 40 (ST1103).

That is to say, the MPU 19 of the input device 1 transmits the two pieces of the information of the information of the velocity values, and the movable/immovable information of the pointer 2 to the control device 40.

The MPU 15 of the control device 40 determines, based on the movable information of the pointer 2, or the immovable information transmitted from the input device 1, whether or not the pointer 2 is in a movable state (ST1104).

In the case that the pointer 2 is in a movable state (YES in ST1104), with the coordinate system of the whole screen region 50, the coordinate values (X(t), Y(t)) are generated by the above Expressions (1) and (2) (ST1105).

On the other hand, in the case that the pointer 2 is in an immovable state (NO in ST1104), the MPU 35 uses the last coordinate values (X(t−1), Y(t−1)) as the coordinate values (X(t), Y(t)) (ST1106). Alternatively, in ST1106 the MPU 35 may execute processing for adding (0, 0) to the last coordinate values (X(t−1), Y(t−1)).

Upon the coordinate values (X(t), Y(t)) being generated within the whole screen region 50, the MPU 35 controls the display of the pointer 2 (real pointer 2') according to the positions of the generated coordinate values (ST1107).

According to such processing, the user may arbitrarily select start and stop of the movement of the pointer 2 by making the thumb enter above the button 11, or releasing the thumb from above the button 11.

The MPU 19 of the input device 1 may transmit, instead of the movable information of the pointer 2, information indicating that the first step of the button 11 (optical sensor 8) is in an on state. Similarly, in ST1103 the MPU 19 may transmit, instead of the immovable information of the pointer 2, information indicating that the first step of the button 11 (optical sensor 8) is in an off state. In this case, the MPU 35 of the control device 40 should determine in ST1104 whether the first step of the button 11 (optical sensor 8) is in an on state or in an off state. The movable state and the immovable state of the pointer 2 may also be switched by such processing.

Next, processing illustrated in FIG. 11 will be described. As shown in FIG. 11, the MPU 19 of the input device 1 determines whether or not the first step of the button 11 (optical sensor 8) is in an on state (ST1201).

In the case that the first step of the button 11 (optical sensor 8) is in an on state (YES in ST1201), the MPU 19 transmits the information of the velocity values $(V_x, V_y)$ to the control device 40 (ST1202).

On the other hand, in the case that the first step of the button 11 (optical sensor 8) is in an off state (NO in ST1201), the MPU 19 does not transmit the information of the velocity values $(V_x, V_y)$ to the control device 40 (ST1203), and returns to ST1201.

Here, in the case of FIG. 11, unlike the processing shown in FIG. 10, in the case that the input device 1 transmits signals to the control device 40, the two pieces of the information (the information of the velocity values, and the movable/immovable information) do not have to be transmitted, but only the information of the velocity values is sufficient.

The MPU 35 of the control device 40 determines whether or not the information of the velocity values $(V_x, V_y)$ from the input device 1 has been received (ST1204). In the case that the information of the velocity values $(V_x, V_y)$ has been received (YES in ST1204), with the coordinate system of the whole screen region 50, the coordinate values (X(t), Y(t)) are generated by the above Expressions (1) and (2) (ST1205).

On the other hand, in the case that the information of the velocity values $(V_x, V_y)$ has not been received from the input device 1 (NO in ST1204), the MPU 35 employs the last coordinate values (X(t−1), Y(t−1)) as the coordinate value (X(t), Y(t)) (ST1206). Alternatively, the MPU 35 may execute processing for adding (0, 0) to the last coordinate values (X(t−1), Y(t−1)) in ST1206.

Upon the coordinate values (X(t), Y(t)) being generated within the whole screen region 50, the MPU 35 controls the display of the pointer 2 (real pointer 2') according to the positions of the generated coordinate values (ST1207).

The MPU 19 of the input device 1 may transmit the velocity values to the control device 40 as (0, 0) in ST1203. That is to say, in the case that the first step of the button 11 (optical sensor 8) is in an off state, the MPU 19 may transmit the velocity values to the control device 40 as (0, 0). The movable state and the immovable state of the pointer 2 may also be switched by such processing.

The Processing of the Control Device, and the Movement of the Real Pointer 2' and Virtual Pointer 2" within the Whole Screen Region Next, the processing of the control device 40 included in the control system 100 according to the present embodiment will be described further in detail, and also the movement of the real pointer 2' and virtual pointer 2" within the whole screen region 40 will be described.

Figure 12:
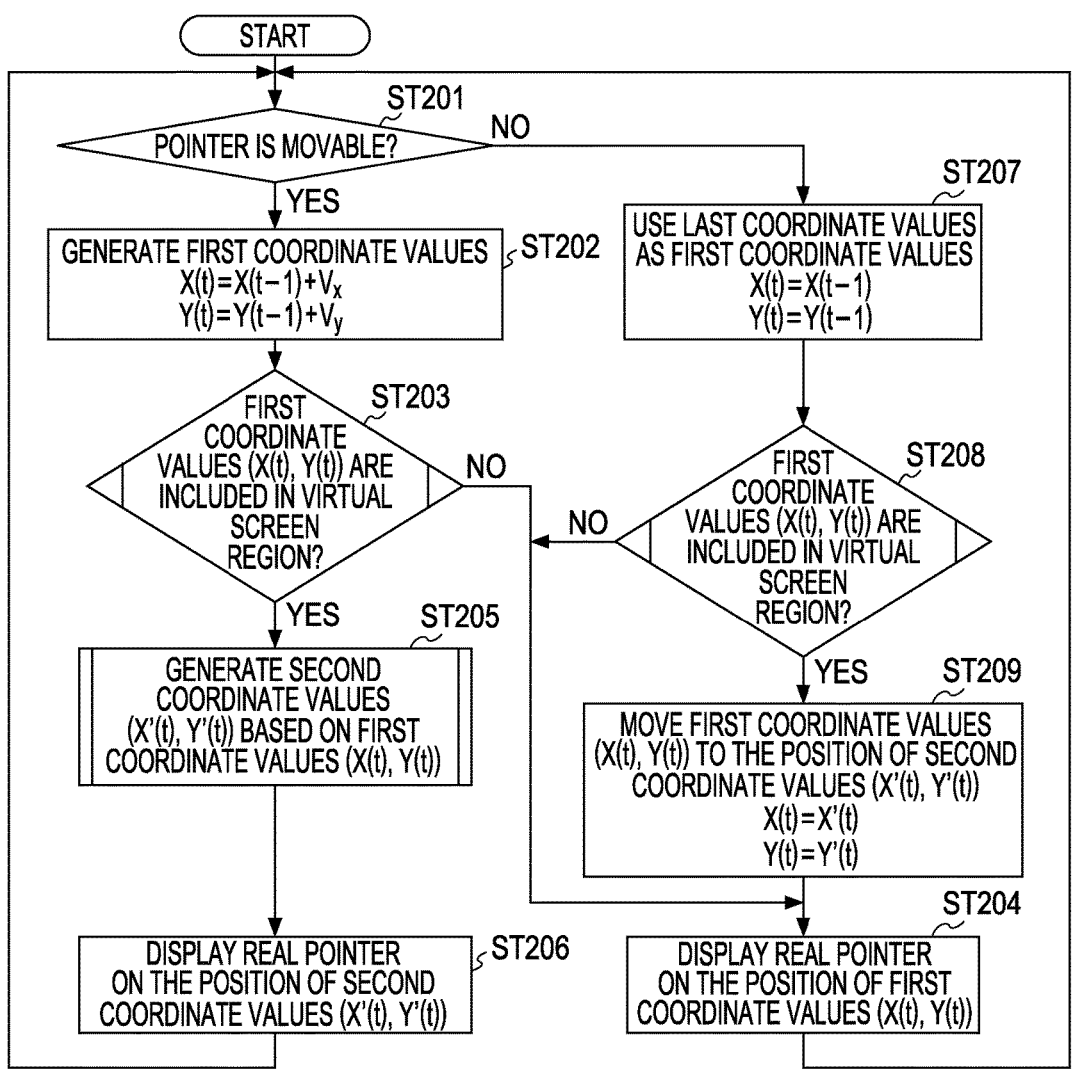
FIG. 12 is a flowchart illustrating the operation of a control device according to an embodiment of the present invention.

FIG. 12 is a flowchart illustrating the operation of the control device 40 according to the present embodiment. In FIG. 12, description will be made regarding a case where the switching method shown in FIG. 10 has been applied to the method for switching the movable state and the immovable state of the pointer 2.

Note that, with the description in FIG. 12 and thereafter, coordinate values to be determined within the whole screen region 50, which are coordinate values to be generated by the processing shown in ST106 in FIG. 9, ST1105 and ST1106 in FIG. 10, and the like, will be referred to as first coordinate values for convenience of description. Also, description in FIG. 12 will be made with reference to later-described FIGS. 13 through 16.

As shown in FIG. 12, the MPU 35 of the control device 40 determines, based on the movable information or immovable information of the pointer 2 transmitted from the input device 1, whether or not the pointer 2 is in a movable state (ST201).

In the case that the pointer 2 is in a movable state (YES in ST201), the MPU 35 of the control device 40 generates, based on the information of the velocity values ($V_x$, $V_y$) transmitted from the input device 1, the first coordinate values (X(t), Y(t)) within the whole screen region 50 (ST202).

Upon the first coordinate values (X(t), Y(t)) being generated, the MPU 35 determines whether or not the coordinate values (X(t), Y(t)) thereof are coordinate values included in the virtual screen region 52 (ST203).

Figure 13:
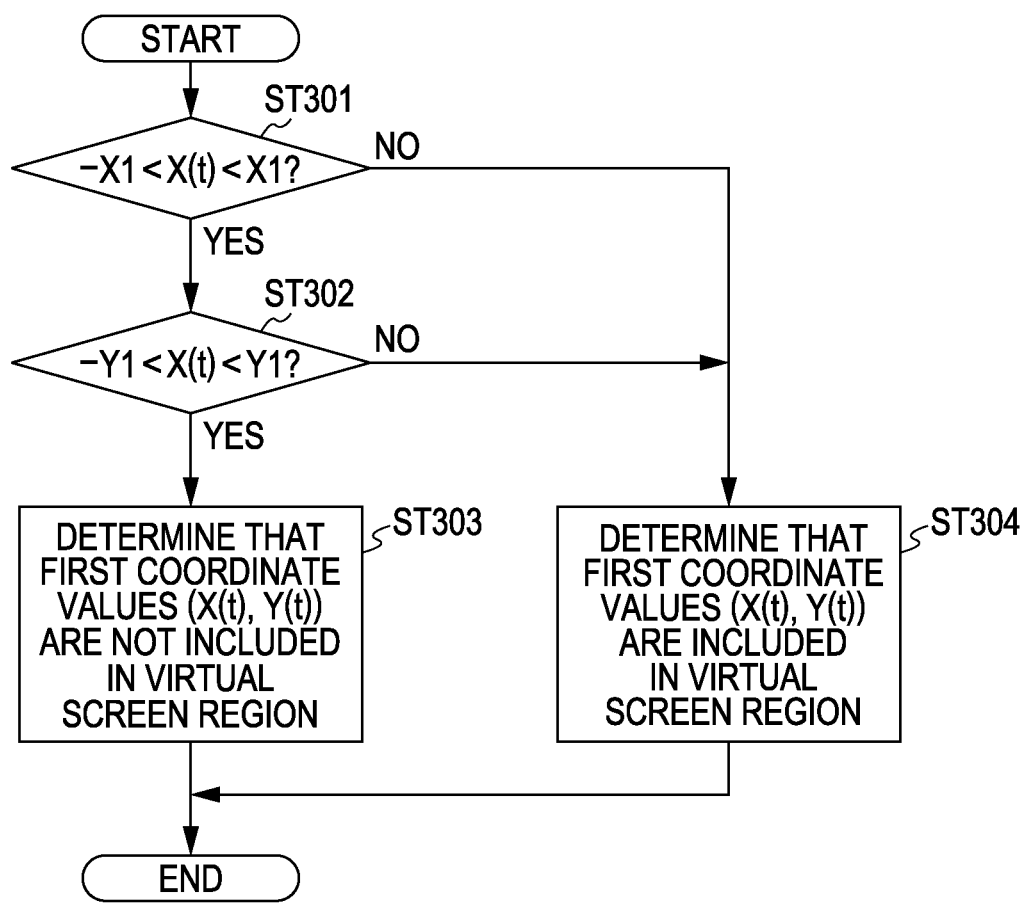
FIG. 13 is a diagram illustrating an example of a determining method regarding whether or not first coordinate values are coordinate values within a virtual screen region.

FIG. 13 is a diagram illustrating an example of a determining method regarding whether or not the first coordinate values (X(t), Y(t)) are coordinate values included in the virtual screen region 52.

The MPU 35 of the control device 40 determines by the following Expression (5) whether or not X(t) that is an X-axis component of the first coordinate values is a value between an X-axis component −X1 of the coordinate values of an edge portion 53 on the left side of the real screen region 51, and an X-axis component X1 of the coordinate values of the edge portion 53 on the right side (ST301).

$$-X1 < X(t) < X1 \quad (5)$$

In the case that the above Expression (5) is not satisfied (NO in ST301), i.e., in the case that X(t) is not a value between the left-side edge portion 53 and the right-side edge portion 53 of the real screen region 51, the MPU 35 determines that the first coordinate values (X(t), Y(t)) are values within the virtual screen region 52 (ST304).

In the case that the above Expression (5) is satisfied (YES in ST301), the MPU 35 proceeds to ST302. In ST302, the MPU 35 determines by the following Expression (6) whether or not Y(t) that is a Y-axis component of the first coordinate values is a value between a Y-axis component −Y1 of the coordinate values of the edge portion 53 on the lower side of the real screen region 51, and a Y-axis component Y1 of the coordinate values of the edge portion 53 on the upper side (ST302).

$$-Y1 < Y(t) < Y1 \quad (6)$$

In the case that the above Expression (6) is not satisfied (NO in ST302), i.e., in the case that Y(t) is not a value between the lower-side edge portion 53 and the upper-side edge portion 53 of the real screen region 51, the MPU 35 determines that the first coordinate values (X(t), Y(t)) are values within the virtual screen region 52 (ST304).

On the other hand, in the case that the above Expression (6) is satisfied (YES in ST302), the MPU 35 determines that the first coordinate values (X(t), Y(t)) are not values within the virtual screen region 52 (ST203).

As shown in FIG. 12, in the case that the first coordinate values (X(t), Y(t)) are not included in the virtual screen region 52 (NO in ST203), i.e., in the case that the first coordinate values are included in the real screen region 51, the MPU 35 controls the display of the screen 3 so as to display the real pointer 2' on the position according to the coordinate values (X(t), Y(t)) thereof (ST204).

On the other hand, in the case that the first coordinate values (X(t), Y(t)) are values within the virtual screen region 52 (YES in ST303), the MPU 35 generates the second coordinate values (X'(t), Y'(t)) based on the first coordinate values (X(t), Y(t)) (ST205).

Here, the second coordinate values (X'(t), Y'(t)) are coordinate values within the real screen region 51 to be generated based on the first coordinate values (X(t), Y(t)). With the present embodiment, the second coordinate values (X'(t), Y'(t)) are assumed to be coordinate values on the edge portion of the real screen region 51.

Upon generating the second coordinate values, the MPU 35 controls the display on the screen 3 so as to display the real pointer 2' on the position according to the second coordinate values (X'(t), Y'(t)). In this case, as described above, the second coordinate values (X'(t), Y'(t)) are assumed to be coordinate values on the edge portion of the real screen region 51, and accordingly, the real pointer 2' is displayed on the edge portion on the screen 3.

In the case that the first coordinate values (X(t), Y(t)) are coordinate values within the virtual screen region 52, it can conceptually be determined that the virtual pointer 2" exists on the position according to the coordinate values (X(t), Y(t)) thereof. Accordingly, it can be conceived by the processing shown in ST205 and ST206 that the real pointer 2' is displayed on the position according to the coordinate values of the virtual pointer 2" (first coordinate values (X(t), Y(t))) on the screen 3.

Figure 14:
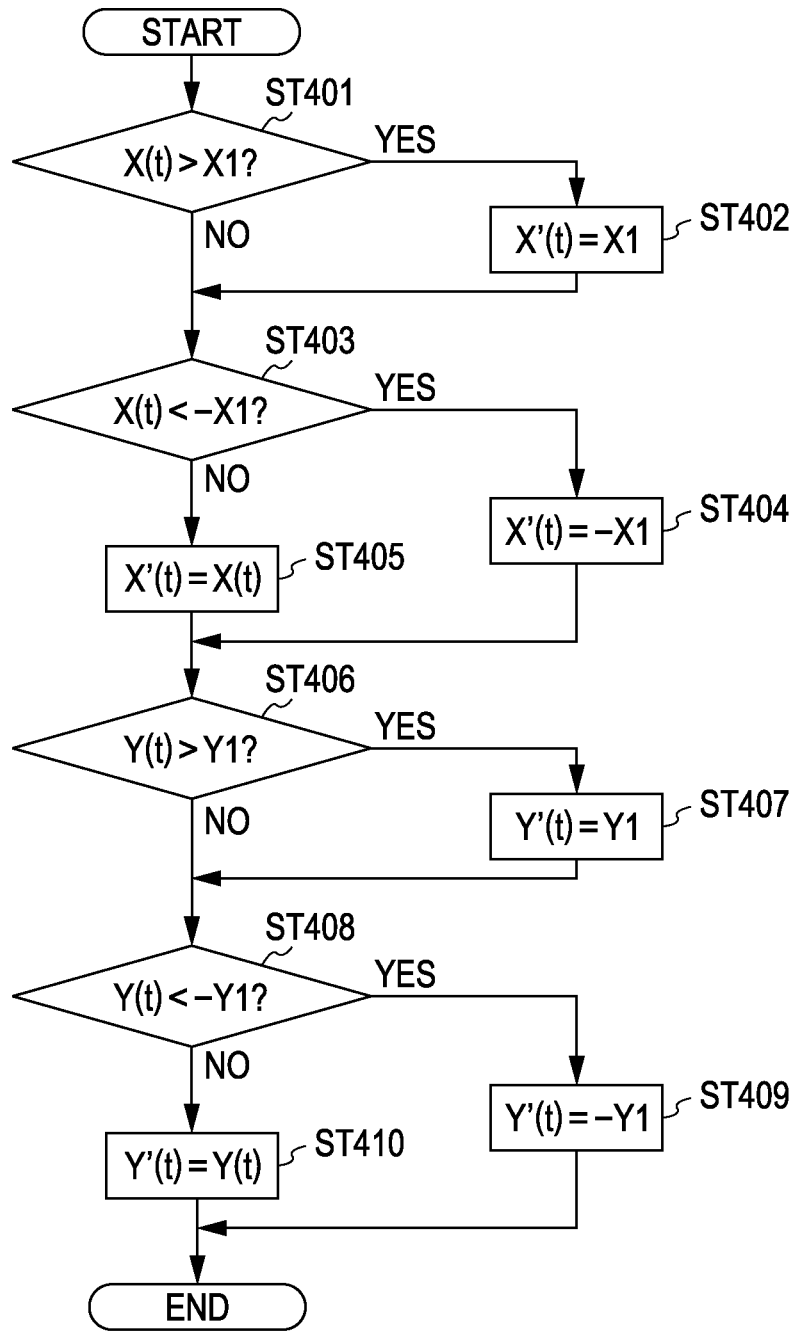
FIG. 14 is a diagram illustrating an example of a generating method of second coordinate values to be generated based on the first coordinate values.

FIG. 14 is a diagram illustrating an example of a generation method of the second coordinate values to be generated based on the first coordinate values by ST205 in FIG. 12.

The MPU 35 of the control device 40 determines whether or not X(t) that is an X-axis component of the first coordinate values is greater than the X-axis component X1 of the coordinate values of the edge portion 53 on the right side of the real screen region 51 (ST401). In the case that the X-axis component X(t) of the first coordinate values is greater than X1 (YES in ST401), the MPU 35 sets X'(t) that is an X-axis component of the second coordinate values to X1 (ST402).

On the other hand, in the case that the X-axis component X(t) of the first coordinate values is equal to or smaller than X1, the MPU 35 proceeds to the next ST403. In ST403, determination is made whether or not the X-axis component X(t) of the first coordinate values is smaller than the X-axis component −X1 of the coordinate values of the left-side edge portion 53 of the real screen region 51.

In the case that the X-axis component X(t) of the first coordinate values is smaller than −X1 (YES in ST403), the MPU 35 sets the X-axis component X'(t) of the second coordinate values to −X1 (ST404).

On the other hand, in the case that the X-axis component X(t) of the first coordinate values is equal to or greater than −X1 (NO in ST403), the MPU sets the X-axis component X'(t) of the second coordinate values to the X-axis component X(t) of the first coordinate values (ST405).

Next, the MPU 35 determines whether or not the Y-axis component Y(t) of the first coordinate values is greater than the Y-axis component Y1 of the coordinate values of the upper edge portion 53 of the real screen region 51 (ST406). In the case that the Y-axis component Y(t) of the first coordinate values is greater than Y1 (YES in ST406), the MPU 35 sets the Y-axis component Y'(t) of the second coordinate values to Y1 (ST407).

On the other hand, in the case that the Y-axis component Y(t) of the first coordinate values is equal to or smaller than Y1 (NO in ST406), the MPU 35 proceeds to ST408. In ST408, the MPU determines whether or not the Y-axis component Y(t) of the first coordinate values is smaller than the Y-axis component −Y1 of the lower edge portion 53 of the real screen region 51.

In the case that the Y-axis component Y(t) of the first coordinate values is smaller than −Y1 (YES in ST408), the MPU sets the Y-axis component Y'(t) of the second coordinate values to −Y1 (ST409).

On the other hand, in the case that the Y-axis component Y(t) of the first coordinate values is equal to or greater than −Y1 (NO in ST408), the MPU sets the Y-axis component Y'(t) of the second coordinate values to the Y-axis component Y(t) of the first coordinate values (ST410).

Figure 15:
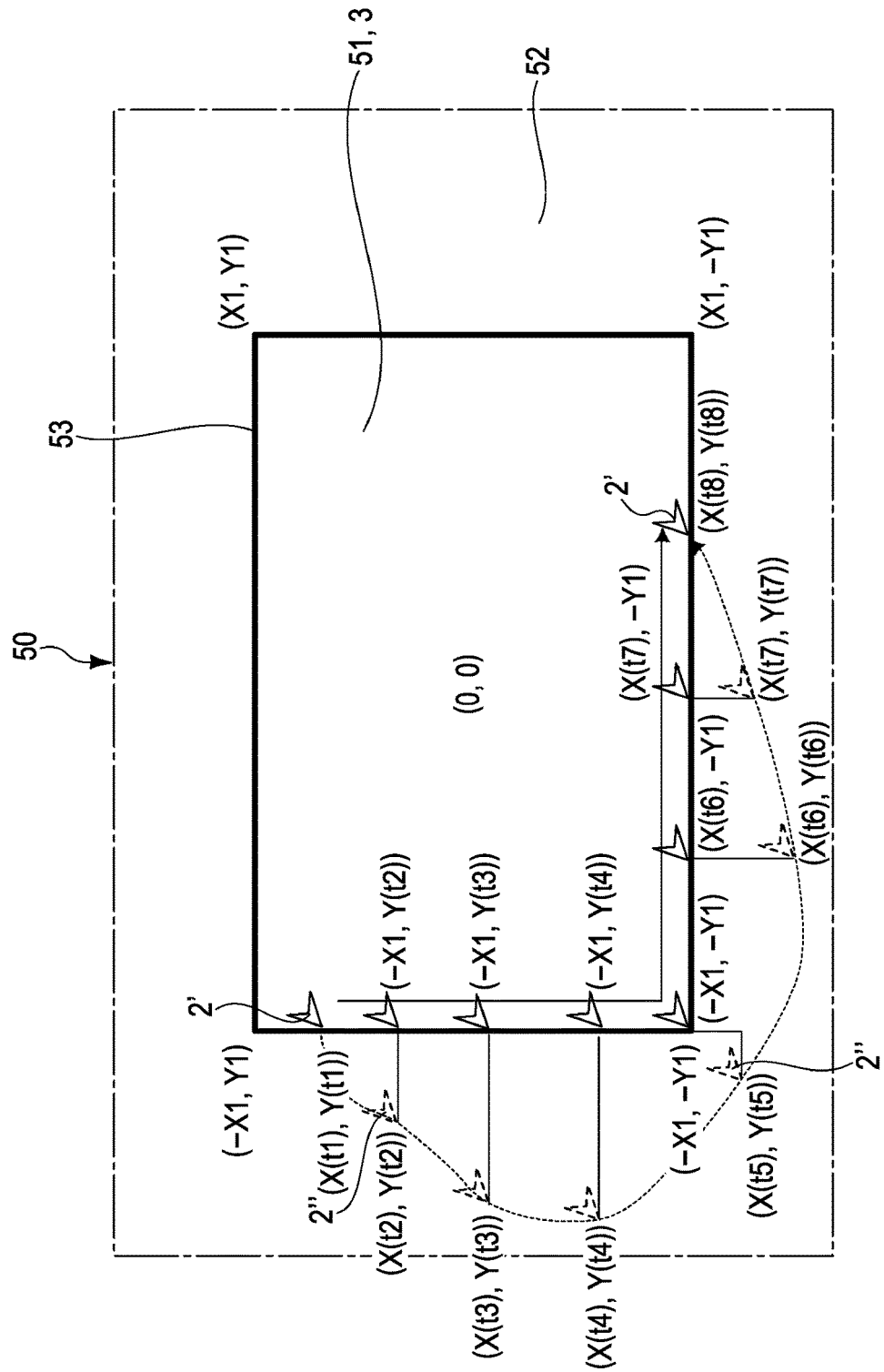
FIG. 15 is a diagram illustrating an example of the movements of a virtual pointer and a real pointer in the case of the processing shown in FIG. 14 is executed.

FIG. 15 is a diagram illustrating an example of the movement of the virtual pointer and real pointer in the case that the processing shown in FIG. 14 has been executed. As shown in FIG. 15, the real pointer 2' is displayed in a range of the coordinate values (second coordinate values (−X1, Y(t2)) through (X(t7), −Y1)) according to the coordinate values of the virtual pointer 2" (first coordinate values (X(t2), Y(t2)) through (X(t7), Y(t7))) on the edge portion of the real screen region 51.

Thus, the user can operate the pointer 2 with a sense of operating the pointer 2 within the whole screen region 50 that is wider than the real screen region 51, by the movement of the virtual pointer 2" and real pointer 2'. Also, mismatch between the display position of the pointer 2 and the relative position between that position and the pointing direction of the input device 1 can be prevented from occurring on the edge portion of the screen 3 (real screen region 51).

Returning to description in FIG. 12, in ST201, in the case that the pointer 2 is not in a movable state (NO in ST201), i.e., in the case that the immovable information has been received from the input device 1, the MPU 35 proceeds to ST207.

In the case that the pointer 2 is in an immovable state, the MPU 35 employs the last coordinate values as the first coordinate values (ST207). Next, the MPU 35 determines whether or not the first coordinate values (X(t), Y(t)) are coordinate values within the virtual screen region 52 (ST208). In this case, for example, by processing such as shown in the above FIG. 13, determination is made whether or not the first coordinate values (X(t), Y(t)) are coordinate values within the virtual screen region 52.

In the case that the first coordinate values (X(t), Y(t)) are not coordinate values within the virtual screen region 52 (NO in ST208), i.e., in the case that the first coordinate values (X(t), Y(t)) are coordinate values within the real screen region 51, the MPU 35 displays the real pointer 2' on the position according to the first coordinate values (ST204).

On the other hand, in the case that the first coordinate values (X(t), Y(t)) are coordinate values within the virtual screen region 52 (YES in ST208), the MPU 35 proceeds to the next ST209. In ST209, the MPU 35 executes processing for moving the first coordinate values (X(t), Y(t)) to the position according to the second coordinate values (X'(t), Y'(t)) (ST209). That is to say, the MPU 35 processing for aligning the coordinate values of the virtual pointer 2" with the coordinate values of the real pointer 2'. In this case, the first coordinate values are moved to the real screen region 51, and accordingly, the virtual pointer 2" is eliminated.

Upon moving the first coordinate values (X(t), Y(t)) to position according to the second coordinate values (X'(t), Y'(t)), the MPU 35 displays the real pointer 2' on the position according to the first coordinate values (X(t), Y(t)) (ST204).

Figure 16:
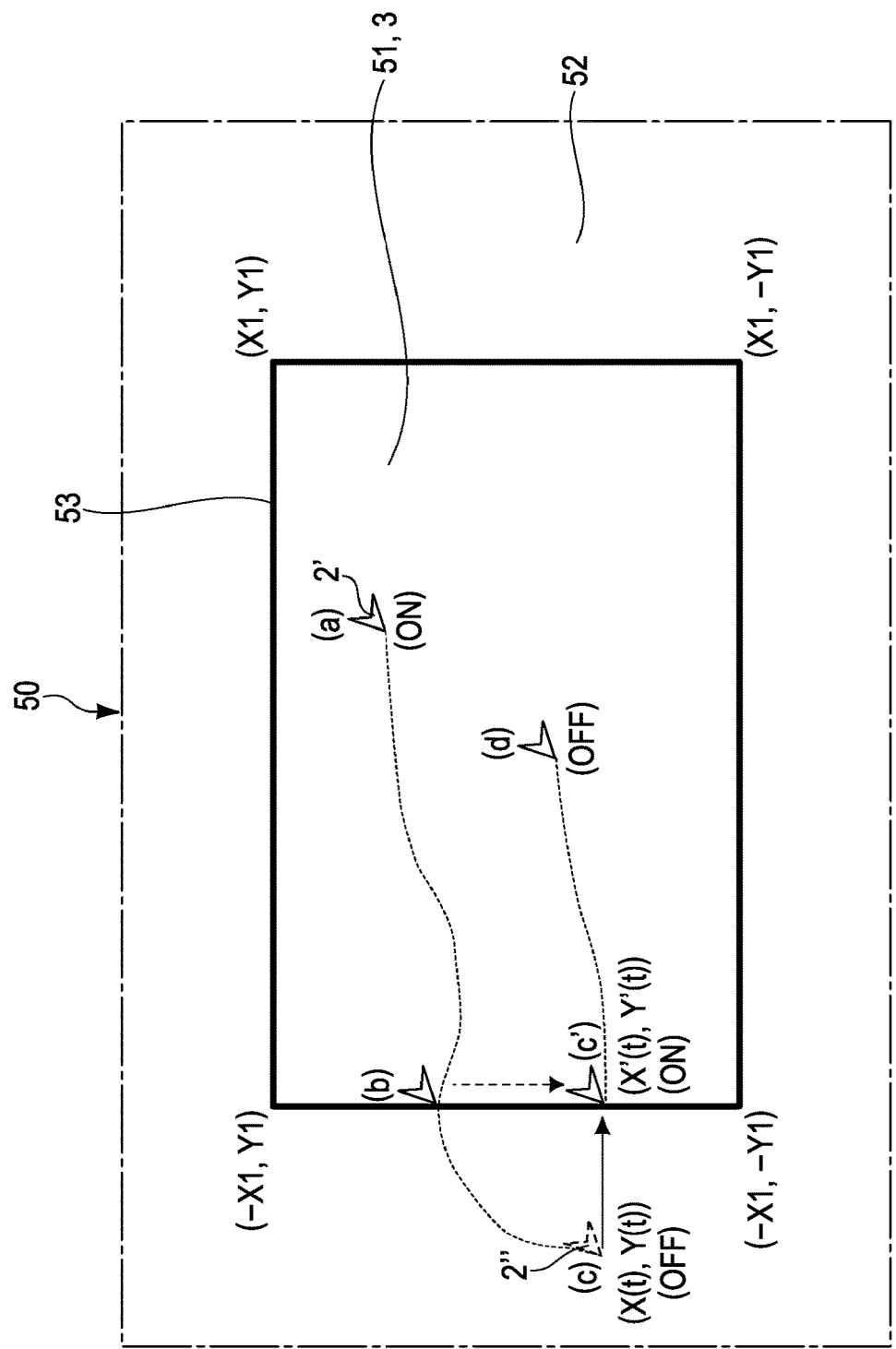
FIG. 16 is a diagram for describing a series of flow regarding the movements of the virtual pointer and the real pointer in the case of the processing shown in FIG. 12 is executed.

FIG. 16 is a diagram for describing a series of flow regarding the movement of the virtual pointer 2" and real pointer 2' in the case that the processing shown in FIG. 12 has been executed.

For example, let us say that the real pointer 2' is displayed in a state in which the real pointer 2' is stopped on the position shown in (a) in FIG. 16. In a state in which the user releases the thumb from above the button 11 of the input device 1, the real pointer 2' is not moved on the screen 3 (In FIG. 12, loop of NO in ST201→NO in ST208→NO in ST204).

The user makes the thumb enter above the button 11 of the input device 1 by directing the tip portion of the input device 1 toward the direction of the real pointer 2' displayed on the position in (a) in FIG. 16. Thus, the real pointer 2' is in a movable state. Next, for example, let us say that the user operates the input device 1 in space, and moves the real pointer 2' to the position shown in (b) in FIG. 16 (In FIG. 12, loop of YES in ST201→NO in ST203→ST204).

In the case that the real pointer 2' exceeds the position shown in (b) in FIG. 16, i.e., in the case of exceeding the edge portion 53 of the real screen region 51, the real pointer 2' is moved along the edge portion of the screen 3 according to the coordinate values of the virtual pointer 2" (first coordinate values (X(t), Y(t))) (loop of YES in ST201→YES in ST203→ST206).

Let us say that the user operates the input device 1 in space to move the virtual pointer 2" to the position shown in (c) in FIG. 16. At this time, the real pointer 2' is displayed on the position shown in (c') in FIG. 16.

Let us say that in the case that the virtual pointer 2" exists on the position shown in (c) in FIG. 16, the user releases the thumb from above the button 11 of the input device. In this case, the coordinate values of the virtual pointer 2" (first coordinate values (X(t), Y(t))) are moved to the positions of the coordinate values of the real pointer 2' (second coordinate values (X'(t), Y'(t))) (NO in ST201→YES in ST208→ST204). In this case, the first coordinate values (X(t), Y(t)) are moved to the real screen region 51, and accordingly, the virtual pointer 2" is eliminated from the virtual screen region 52.

In a state in which the user releases the thumb from above the button 11, the real pointer 2' displayed on the position shown in (c') in FIG. 16 is not moved. The user directs the tip portion of the input device 1 toward the direction of the real pointer 2' displayed on the position shown in (c) in FIG. 16 to make the thumb enter above the button 11 of the input device 1. When making the thumb enter above the input device 1, the real pointer 2' is thus in a movable state. The user operates the input device 1 in space to move the real pointer 2' to the position shown in (d) in FIG. 16 from the position shown in (c') in FIG. 16, and releases the thumb from above the button 11. Thus, the real pointer 2' becomes a stopped state on the position shown in (d) in FIG. 16.

Now, let us assume a case where the virtual pointer 2" exists on the position shown in (c) in FIG. 16, and the coordinate values (X(t), Y(t)) of the virtual pointer 2" are not moved to the coordinate values (X'(t), Y'(t) of the real pointer 2' when the user releases the thumb from above the button 11.

In this case, when the user releases the thumb from above the button 11, the virtual pointer 2" is stopped at the position shown in (c) in FIG. 16 within the virtual screen region 52, and the real pointer 2' is stopped at the position shown in (c') in FIG. 16 on the edge portion 53 of the real screen region 51.

The user can visually recognize the real pointer 2' displayed on the position shown in (c') in FIG. 16, but not the virtual pointer 2" existing on the position shown in (c) in FIG. 16.

In the case of attempting to resume the movement of the real pointer 2' displayed on the position shown in (c') in FIG. 16, the user instinctively directs the tip portion of the input device 1 toward the direction of the real pointer 2' that can visually be recognized. Subsequently, the user makes the thumb enter above the button 11 to change the real pointer 2' to a movable state.

However, in this case, the substantial coordinate values of the pointer 2 are the coordinate values of the virtual pointer 2" (first coordinate values $(X(t), Y(t))$), but not the coordinate values of the real pointer 2' (second coordinate values $(X'(t), Y'(t))$).

For example, let us say that the user has shaken the input device 1 in the right direction by attempting to move the real pointer 2' displayed on the position shown in (c') in FIG. 16 to the right side. In this case, the real pointer 2' is not moved to the right side until the coordinate values of the virtual pointer 2" (first coordinate values) reach the edge portion 53 on the left side of the real screen region 51.

When the movement of the real pointer 2' displayed on the position shown in (c') in FIG. 16 is started from the edge portion 53 on the left side of the real screen region 51 to the right side, the tip portion of the input device 1 points more right side than the position shown in (c') in FIG. 16.

That is to say, mismatch occurs between the display position of the pointer 2, and the direction pointed by the tip portion of the input device 1 by the difference worth between the coordinate values of the virtual pointer 2" (first coordinate values $(X(t), Y(t))$), and the coordinate values of the real pointer 2' (second coordinate values $(X'(t), Y'(t))$). Thus, the user feels uncomfortable.

Therefore, with the control device according to the present embodiment, in the case that the virtual pointer 2" exists within the virtual screen region 52, and in the event that the movement of the virtual pointer 2" is stopped, the coordinate values of the virtual pointer 2" (first coordinate values) are moved to the positions of the coordinate values of the real pointer 2' (second coordinate values).

Thus, for example, in order to resume the movement of the real pointer 2' displayed on the position shown in (c') in FIG. 16, when the user directs the tip portion of the input device 1 toward the direction of the real pointer 2', the substantial coordinate values of the pointer 2 are moved to the display position of the real pointer 2'.

Thus, mismatch can be prevented from occurring between the display position of the pointer 2, and the direction pointed by the tip portion of the input device 1, and accordingly, the user can intuitively operate the pointer 2 without feeling uncomfortable.

Various Modifications of First Embodiment

With the present embodiment, description has been made wherein when the user releases the thumb from above the button 11, the first coordinate values (the coordinate values of the virtual pointer 2") are moved to the positions of the second coordinate values (the coordinate values of the real pointer 2'). However, when the user makes the thumb enter above the button 11, the first coordinate values may be moved to the positions of the second coordinate values. The same advantage may also be obtained by such processing.

Description has been made wherein in FIG. 12, in ST209, the first coordinate values $(X(t), Y(t))$ (the coordinate values of the virtual pointer 2") are moved to the second coordinate values (second coordinate values $(X'(t), Y'(t))$). However, the positions where the first coordinate values are moved are not restricted to these. Typically, the positions where the first coordinate values are moved may be any positions within the real screen region 51. For example, the first coordinate values may be moved to the center (origin $(0, 0)$) of the real screen region 51.

In the case that the virtual pointer 2" exists, the position where the real pointer 2' is displayed is not restricted to on the edge portion of the screen (real screen region 51). For example, the real pointer 2' may be displayed on a position having a little distance from the edge portion of the screen.

In the case that the first coordinate values $(X(t), Y(t))$ are included in the virtual screen region 52 (in the case that the virtual pointer 2" exists), the real pointer 2' does not necessarily have to be displayed. Specifically, in the case that the first coordinate values are included in the virtual screen region 52, the MPU 35 may execute processing for eliminating the real pointer 2'. Note that, in this case, the second coordinate values do not necessarily have to be displayed.

In FIG. 12, description has been made wherein the switching method shown in FIG. 10 has been applied to the method for switching the movable state and the immovable state of the pointer 2. However, the switching method shown in FIG. 11 may be applied to the method for switching the movable state and the immovable state of the pointer 2. In this case, the MPU 35 of the control device 40 should determine in ST201 whether or not the information of the velocity values has been received from the input device 1. This is similar to later-described embodiments.

The processing of the control device 40 described in FIG. 12, i.e., the processing relating to the management of the coordinate values of the pointer 2 may principally be executed by the input device 1. In this case, the input device 1 should store the whole screen region 50. The input device 1 should manage the coordinate values of the pointer 2 within the stored whole screen region 50. With later-described embodiments as well, similarly, the input device 1 may principally execute processing relating to the management of the coordinate values of the pointer, and the like.

Second Embodiment

Next, a control system 100 according to a second embodiment of the present invention will be described. With the second embodiment, description will be made focusing on the operation of the control device 40 included in the control system 100 according to the second embodiment.

The second embodiment differs from the above first embodiment in that the coordinate values of the virtual pointer 2" (first coordinate values) are moved to the real screen region 51 not only when the user releases the thumb from above the button 11, but also when a determination command is transmitted from the input device 1. Accordingly, description will be made focusing on this point.

Figure 17:
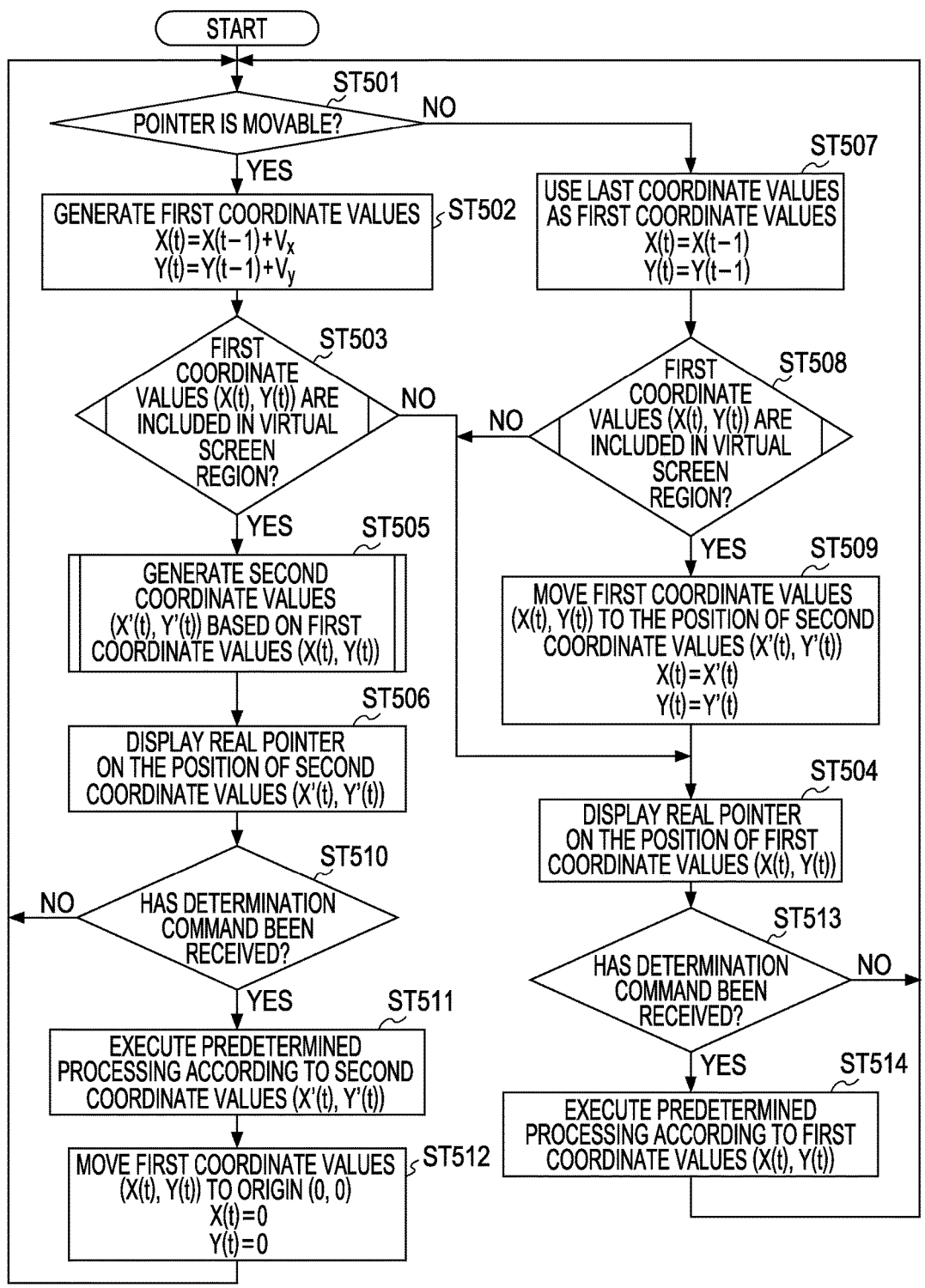
FIG. 17 is a flowchart illustrating the operation of a control device according to another embodiment.
Figure 18:
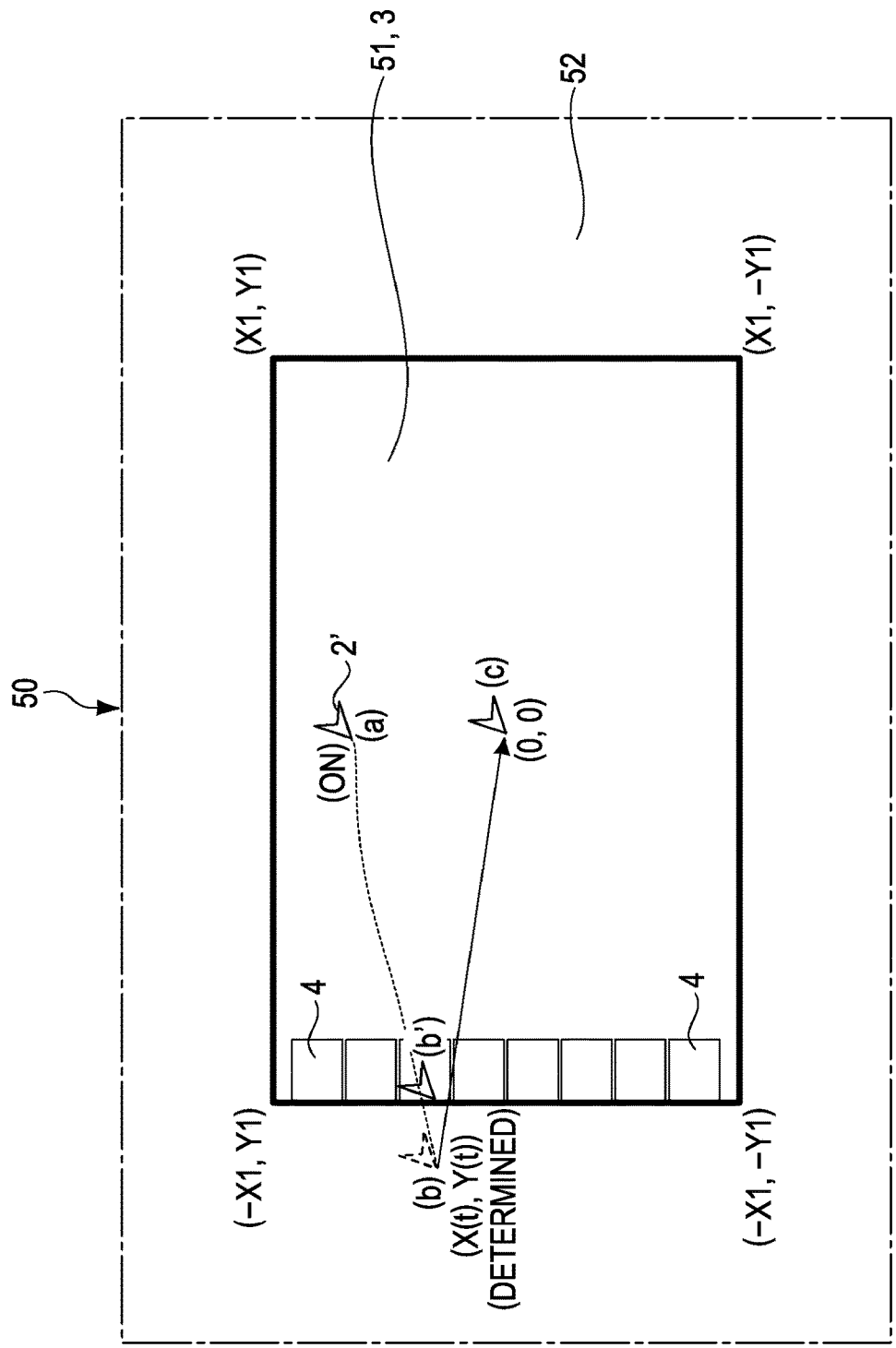
FIG. 18 is a diagram illustrating an example of the movements of the virtual pointer and the real pointer in the case the processing shown in FIG. 17 is executed.

FIG. 17 is a flowchart illustrating the operation of the control device 40 according to the second embodiment. FIG. 18 is a diagram illustrating an example of the movement of the virtual pointer and real pointer in the case that the processing shown in FIG. 17 has been executed.

In ST501 through ST509, the same processing as ST201 through ST209 shown in the above FIG. 12 is executed.

Upon receiving the movable information of the pointer 2 (YES in ST501), the MPU 35 of the control device 40 generates first coordinate values based on the information of velocity values (ST502), and determines whether or not the first coordinate values are coordinate values within the virtual screen region 52 (ST503). In the case that the first coordinate values are coordinate values within the virtual screen region 52 (YES in ST503), the MPU 35 generates second coordinate values based on the first coordinate values (ST505), and displays the real pointer 2' on the position according to the second coordinate values (ST506).

Next, the MPU 35 determines whether or not a determination command has been received from the input device 1 (ST510). In the case that no determination command has been received (NO in ST501), the MPU 35 returns to ST501 to execute the processing in ST501 and thereafter.

The user presses the button 11 from a state in which the user positions the thumb above the button 11 of the input device 1, and releases pressing thereof. Upon the user releasing pressing of the button 11, a determination command is transmitted to the control device 40 from the input device 1 via the transceiver 21 and the antenna 22. The input device 1 may transmit a determination command when the button 11 is pressed, rather than when pressing of the button 11 is released.

Upon a determination command being transmitted from the input device 1, the determination command is input to the MPU 35 of the control device 40 via the antenna 39 and the transceiver 38 (YES in ST510). Upon the determination command being input, the MPU 35 executes predetermined processing according to the second coordinate values (ST511). Specifically, in the case that the virtual pointer 2" exists within the virtual screen region 52, the MPU 35 executes predetermined processing according to the positions of the coordinate values of the real pointer 2' displayed on the edge portion 53 of the real screen region 51. For example, in the case that the real pointer 2' displayed on the edge portion 53 of the real screen region 51 is on an icon 4, the MPU 35 executes processing corresponding to the icon 4 thereof.

Next, the MPU 35 moves the first coordinate values (the coordinate values of the virtual pointer 2") to the origin (0, 0) that is the center of the real screen region 51 (ST512). In this case, the real pointer 2' is displayed on the center of the real screen region 51, and the virtual pointer 2" is eliminated.

In the case of starting the movement of the pointer 2 again, the user should start the movement of the pointer by directing the tip portion of the input device 1 toward the real pointer 2' displayed on the center of the screen 3, and making the thumb enter above the button 11.

Note that, in the case that the first coordinate values are included in the real screen region 51, in the event that the determination command has been received (ST513), predetermined processing is executed according to the first coordinate values (ST514).

Description will be made regarding an example of the movement of the virtual pointer and real pointer in the case that the processing shown in FIG. 17 has been executed, with reference to FIG. 18. As shown in FIG. 18, multiple icons 4 are displayed along the left-side edge portion of the real screen region 51 on the screen 3.

For example, let us say that the real pointer 2' is displayed in a state in which the real pointer 2' is stopped at the position shown in (a) in FIG. 18. The user directs the tip portion of the input device 1 toward the real pointer 2' displayed on the position shown in (a) in FIG. 18, makes the thumb enter above the button 11 to change the pointer 2 to a movable state. Subsequently, the user operates the input device 1 in space to move the real pointer 2' to the position of an icon 4 disposed along the edge portion 53 of the real screen region 51.

Let us say that the first coordinate values enter the virtual screen region 52, and for example, the virtual pointer 2" is moved to the position shown in (b) in FIG. 18. In this case, second coordinate values are generated based on the first coordinate values, and the real pointer 2' is displayed on a position on the edge portion 53 of the real screen region 51, which is a position according to the position of the virtual pointer 2" (see (b') in FIG. 18).

Let us say that the user presses the button 11 from a state in which the user positions the thumb above the button 11, and then releases pressing thereof. In this case, processing relating to the icon 4 corresponding to the position of the real pointer 2' displayed on the position shown in (b') in FIG. 18 is executed on the screen 3 (ST510 and ST511).

Subsequently, the coordinate values of the virtual pointer 2" (first coordinate values) existing on the position shown in (b) in FIG. 18 are moved to the origin (0, 0) (ST512), and accordingly, the virtual pointer 2" is eliminated, and the real pointer 2' is displayed on the center of the screen 3 (see (c) in FIG. 18).

In the case of starting the movement of the pointer 2 again, the user directs the tip portion of the input device 1 toward the real pointer 2' displayed on the center of the screen 3, makes the thumb enter above the button 11, thereby starting the movement of the pointer 2.

According to the processing shown in FIG. 17, the same advantage as the above first embodiment can be obtained. That is to say, mismatch can be prevented from occurring between the display position of the pointer 2, and the direction pointed by the tip portion of the input device 1.

Also, with the second embodiment, an arrangement is made wherein when a determination command is issued, the real pointer 2' is moved to the center of the screen, and accordingly, the user can readily recognize that a determination command has been issued, by confirming that the real pointer 2' is moved to the center of the screen 3.

When receiving a determination command, the MPU 35 does not necessarily have to move the first coordinate values to the center of the real screen region 51. Typically, the first coordinate values should be moved to any position of the real screen region. For example, in the same way as ST209 in FIG. 12, and ST509 in FIG. 17, the first coordinate values (the coordinate values of the virtual pointer 2") may be moved to the positions of the second coordinate values (the coordinate values of the real pointer 2').

Third Embodiment

Next, a third embodiment of the present invention will be described. As described above, the virtual pointer 2" is a hypothetical pointer conceptually determined to exist within the virtual screen region 52, and accordingly, the user is not allowed to visually recognize the virtual pointer 2". Thus, when moving the virtual pointer 2" within the virtual screen region 52, the user may not recognize the position of the virtual pointer 2".

Therefore, with third through eighth embodiments, processing for allowing the user to recognize the position of the virtual pointer 2" existing within the virtual screen region 52 is executed. Note that, with the third embodiment and thereafter, description will be made focusing on points different from the above first embodiment, but each embodiment of the third embodiment and thereafter may be applied to the second embodiment.

Figure 19:
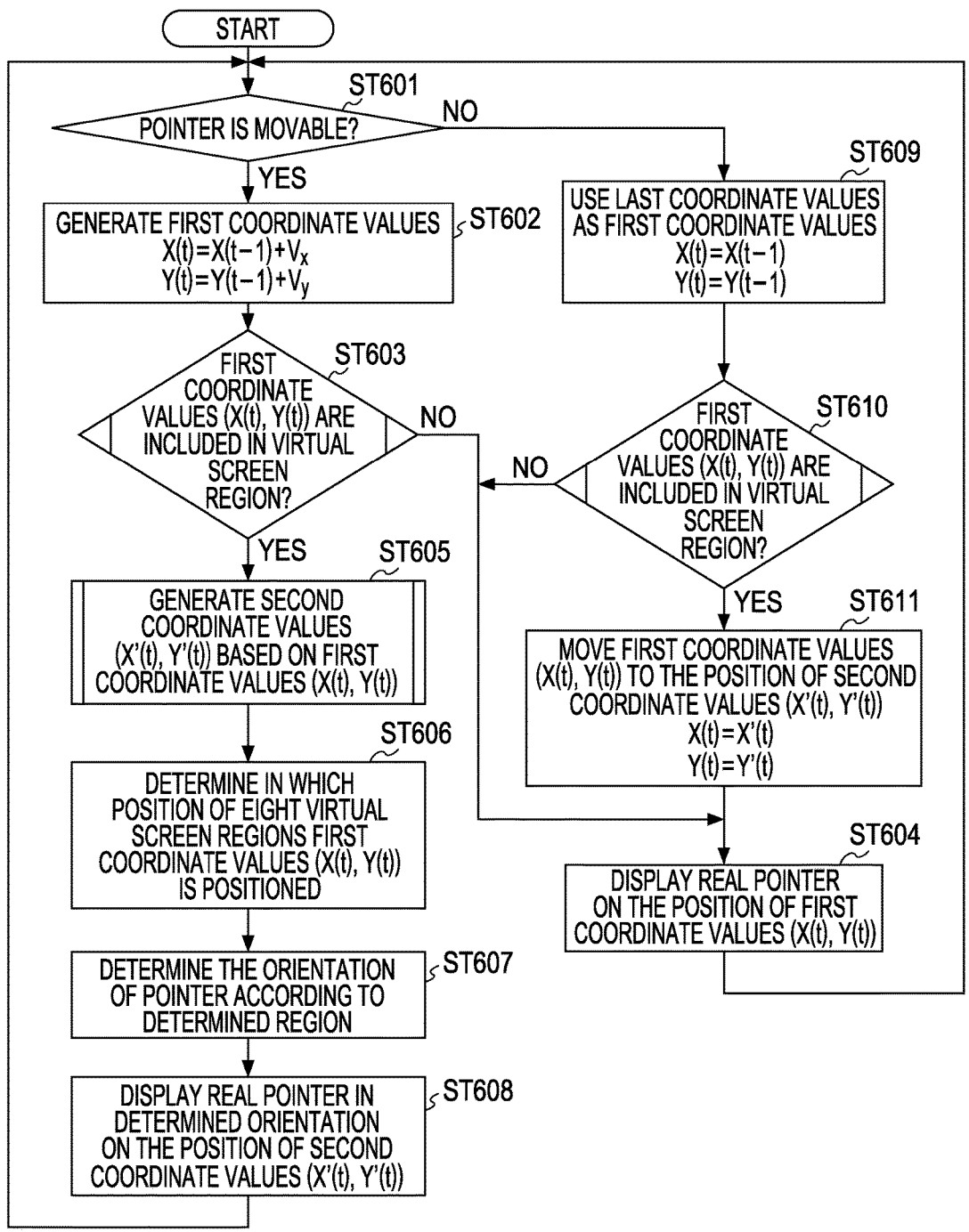
FIG. 19 is a flowchart illustrating the operation of a control device according to yet another embodiment.
Figure 20:
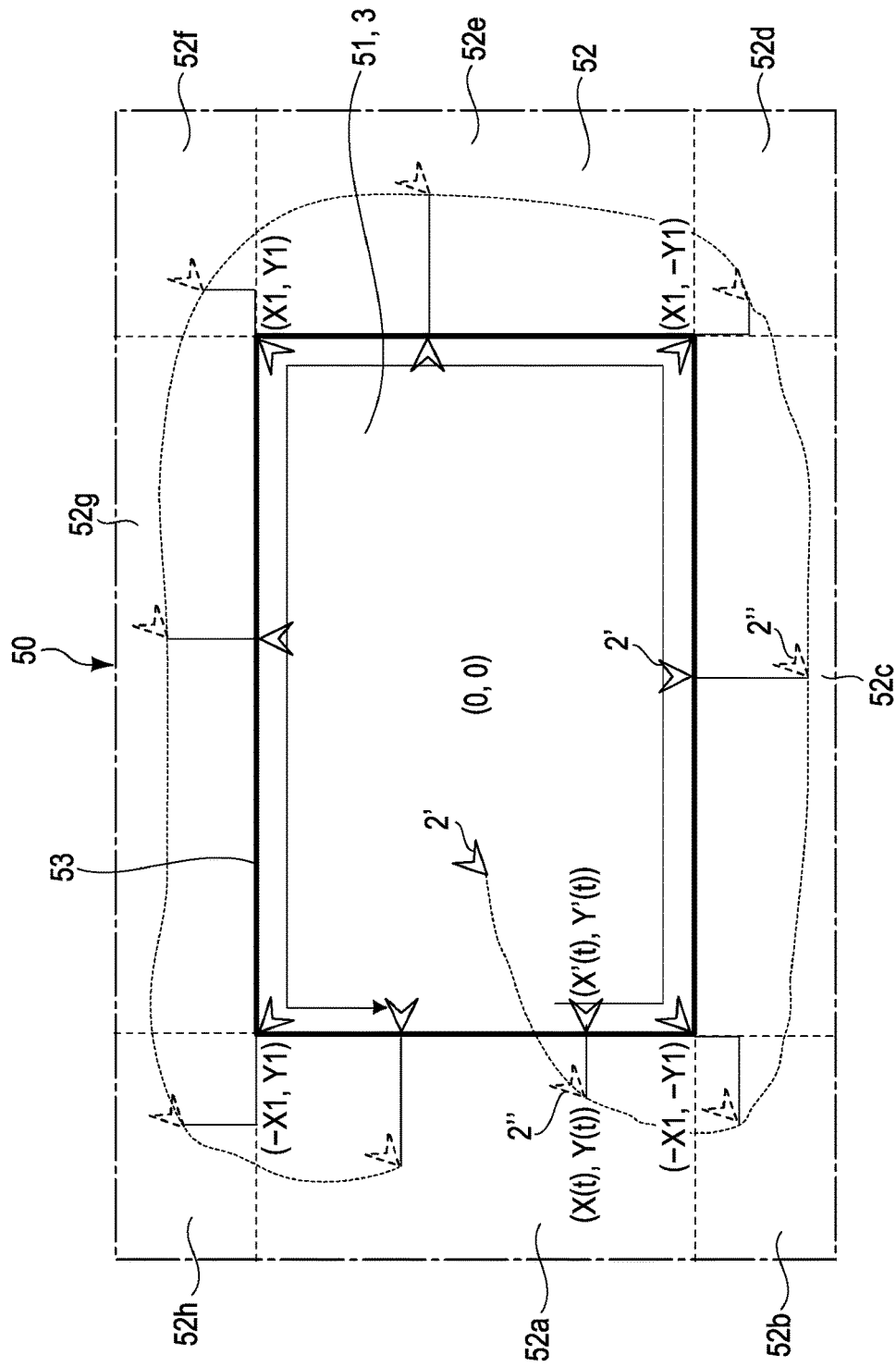
FIG. 20 is a diagram illustrating an example of the movements of the virtual pointer and the real pointer in the case the processing shown in FIG. 19 is executed.

FIG. 19 is a flowchart illustrating the operation of the control device 40 according to the third embodiment, and FIG. 20 is a diagram illustrating an example of the movement of the virtual pointer and real pointer in the case that processing shown in FIG. 19 has been executed. As shown in FIG. 20, the virtual screen region 52 is divided into eight regions 52a through 52h of the left, lower left, lower, lower right, right, upper right, upper, and upper left of the real screen region 51. Note that, with the following description, of the eight divided virtual screen regions 52a through 52h, four virtual screen regions 52 of the left, lower, right, and upper of the real screen region 51 will be referred to as vertical and horizontal regions 52a, 52c, 52e, and 52g. On the other hand, four virtual screen regions 52 of the lower left, lower right, upper right, and upper left of the real screen region 51 will be referred to as corner regions 52b, 52d, 52f, and 52h.

With regard to the processing other than ST606 through ST608 in FIG. 19, the same processing as the processing shown in FIG. 12 is executed.

Upon receiving the movable information of the pointer (YES in ST601), the MPU 35 of the control device 40 generates first coordinate values based on the information of velocity values (ST602), and determines whether or not the first coordinate values are coordinate values within the virtual screen region 52 (ST603). In the case that the first coordinate values are coordinate values within the virtual screen region 52 (YES in ST603), the MPU 35 generates second coordinate values based on the first coordinate values (ST605).

Upon generating the second coordinate values, the MPU 35 of the control device 40 determines which region of the eight divided virtual screen regions 52a through 52h the first coordinate values are positioned on (ST606).

Next, the MPU 35 determines the orientation of the real pointer 2' to be displayed on the edge portion 53 of the real screen region 51 according to the determined virtual screen regions 52a through 52h (ST607).

For example, in the case that the first coordinate values are positioned on the left virtual screen region 52a of the real screen region 51, the orientation of the real pointer 2' is determined to be facing the left. Similarly, in the case that the first coordinate values are positioned on the lower virtual screen region 52c, right virtual screen region 52e, and upper virtual screen region 52g, the orientations of the real pointer 2' are determined to be facing down, facing the right, and facing up, respectively.

Also, for example, in the case that the first coordinate values are positioned on the lower-left virtual screen region 52b of the real screen region 51, the real pointer 2' is determined to be facing diagonally lower-left at 45 degrees. Similarly, the first coordinate values are positioned on the lower-right virtual screen region 52d, upper-right virtual screen region 52f, and upper-left virtual screen region 52h, the orientations of the real pointer 2' are determined to be facing diagonally lower-right at 45 degrees, facing diagonally upper-right at 45 degrees, and facing diagonally upper-left at 45 degrees, respectively.

Upon the orientation of the real pointer 2' being determined, the MPU 35 controls the display so as to display the real pointer 2' with determined orientation on the position according to the second coordinate values (ST608).

Next, description will be made regarding the movement of the real pointer 2' of which the position and orientation to be displayed are controlled according to the movement of the real pointer 2', with reference to FIG. 20.

In the event that the first coordinate values exceed the left-side edge portion 53 of the real screen region 51, and enter the left virtual screen region 52a of the real screen region 51, the virtual pointer 2" can conceptually be determined that the virtual pointer 2" exists within this region 52a. In the case that the virtual pointer 2" is positioned on the left virtual screen region 52a of the real screen region 51, the real pointer 2' is displayed facing the left on the left-side edge portion 53 of the real screen 51 that is a position corresponding to the position of the virtual pointer 2".

In the event that the virtual pointer 2" enters the lower-left virtual screen region 52b of the real screen region 51, the real pointer 2' is displayed facing diagonally lower-left at 45 degrees on the position according to the coordinate values (−X1, −Y1) of the lower-left corner of the real screen region 51.

Hereafter, in the case that the virtual pointer 2" is moved with the path indicated with a dashed line in FIG. 20, the real pointer 2' is displayed facing down on the lower-side edge portion 53 of the real screen region 51, facing diagonally lower-right at 45 degrees on the lower-right corner (X1, −Y1) of the real screen region 51. Also, the real pointer 2' is displayed facing the right on the right-side edge portion 53 of the real screen region 51, facing diagonally upper-right at 45 degrees on the upper-right corner (X1, Y1) of the real screen region 51, facing up on the upper-side edge portion 53 of the screen region 51, facing diagonally upper-left at 45 degrees on the upper-left corner (X1, −Y1) of the real screen region 51.

That is to say, in the case that the virtual pointer 2" is moved with the path indicated with a dashed line in FIG. 20, each time the virtual screen regions 52a through 52h where the virtual pointer 2" is positioned is changed, the real pointer 2' on the edge portion 53 of the real screen region 51 is displayed with the orientation of the real pointer 2' being rotated 45 degrees at a time.

With the third embodiment, the orientation of the real pointer 2' to be displayed on the edge portion 53 of the screen 3 is changed according to the position of the virtual pointer 2", and accordingly, the user can readily recognize the direction where the virtual pointer 2" exists. Thus, the operability of the pointer 2 can be improved.

Modification of Third Embodiment

In FIGS. 19 and 20, description has been made regarding a case where of the eight divided virtual screen regions 52a through 52h, in the event that the virtual pointer 2" is positioned on the four corner regions 52b, 52d, 52f, and 52h, the orientation of the real pointer 2' is constant on each region. However, the display method of the orientation of the real pointer 2' in the event that the virtual pointer 2" is positioned on the four corner regions 52b, 52d, 52f, and 52h, is not restricted to this. For example, the orientation of the real pointer 2' may be changed according to the position of the virtual pointer 2".

Figure 21:
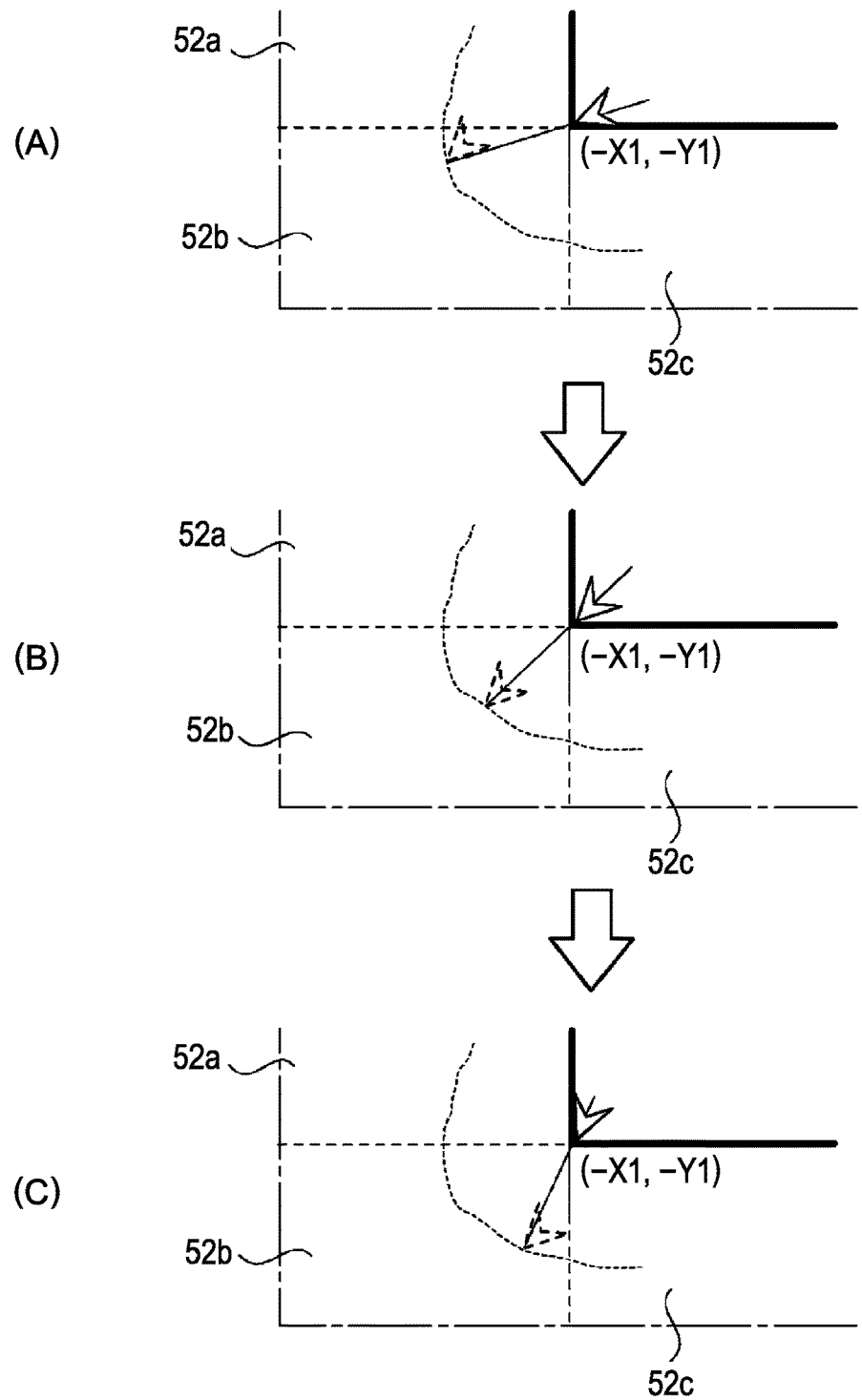
FIG. 21 is a diagram for describing an example in the case that the direction of the real pointer is changed according to the position of the virtual pointer in the event that the virtual pointer is positioned in a corner region.

FIG. 21 is a diagram for describing an example in a case where in the event that the virtual pointer 2" is positioned on a corner region, the orientation of the real pointer 2' may be changed according to the position of the virtual pointer 2". FIG. 21 illustrates, of the four corner regions 52b, 52d, 52f, and 52h, change in the orientation of the real pointer 2' in the case that the virtual pointer 2" moves within the lower-left virtual screen region 52b of the real screen region 51. As shown in (A) through (C) in FIG. 21, in the case that the virtual pointer 2" moves within the virtual screen region 52b, the display is controlled so that the real pointer 2' faces the direction of the virtual pointer 2" at the position of the lower-left corner (−X1, −Y1) of the real screen region 51.

Such control of the orientation of the real pointer 2' is realized by the MPU 35 of the control device 40 determining the orientation of the real pointer 2' based on the first coordinate values (X(t), Y(t)), and the coordinate values (−X1, −Y1) of the lower-left corner of the real screen region 51. Similarly, in the case that the virtual pointer 2" is positioned on the other corners 52d, 52e, and 52g, the MPU 35 of the control device 40 should determine the orientation of the real pointer 2' based on the first coordinate values, and the coordinate values (X1, −Y1), (X1, Y1), and (−X1, Y1) of the corners of the real screen region 51, respectively.

According to the control of the orientation of the real pointer 2' such as shown in FIG. 21, recognition of the direction where the virtual pointer 2" exists in the case that the virtual pointer 2" is positioned on the corner regions 52b, 52d, 52e, and 52g can further be facilitated.

Fourth Embodiment

Next, a fourth embodiment of the present invention will be described. The fourth embodiment differs from the above embodiments in that the coordinate values and orientation of the real pointer 2' to be displayed on the edge portion of the real screen region 51 are controlled with the center coordinates (origin (0, 0)) of the real screen region 51 as a reference. Accordingly, description will be made focusing on this point.

Figure 22:
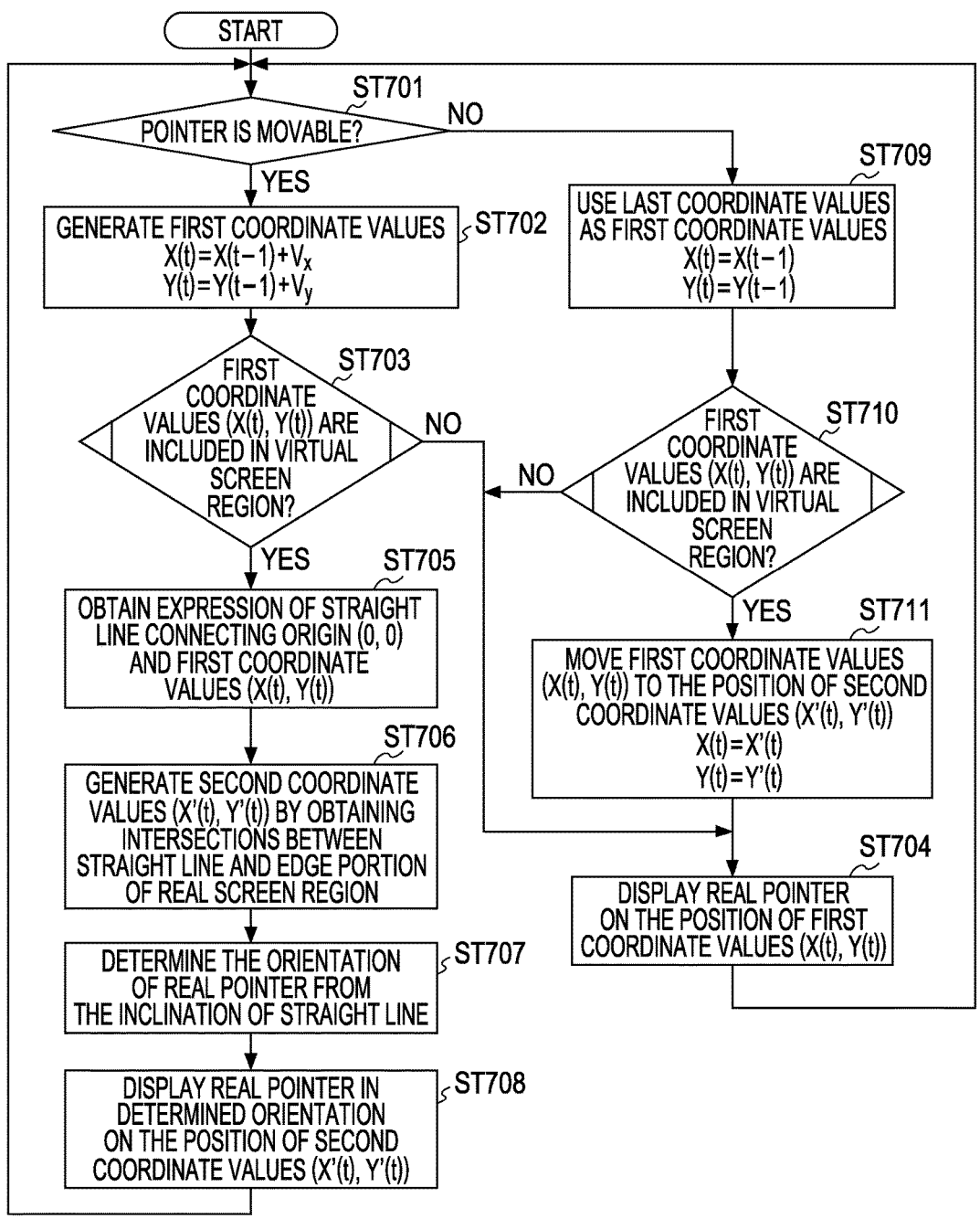
FIG. 22 is a flowchart illustrating the operation of a control device according to yet another embodiment.
Figure 23:
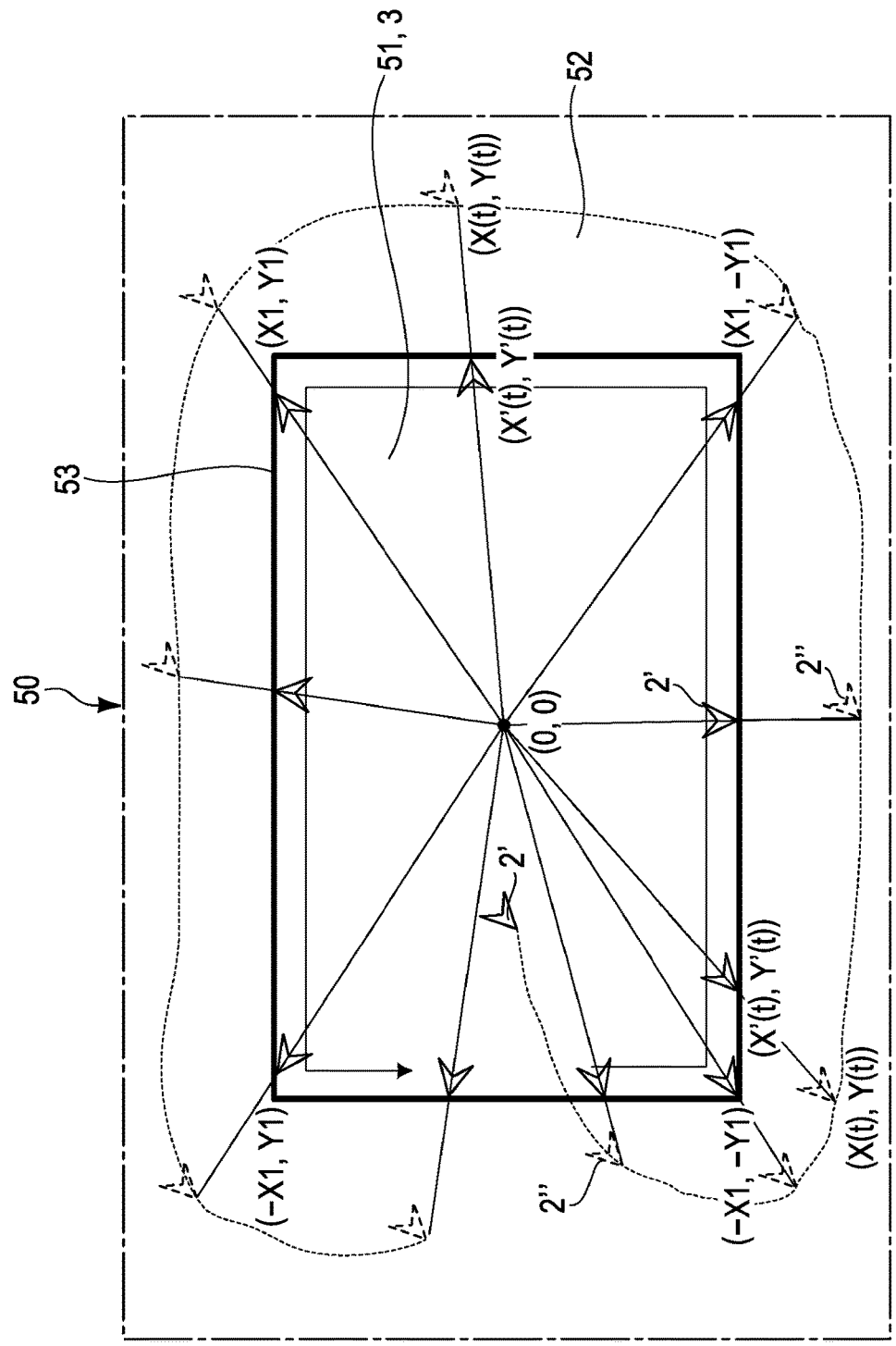
FIG. 23 is a diagram illustrating an example of the movements of the virtual pointer and the real pointer in the case the processing shown in FIG. 22 is executed.

FIG. 22 is a flowchart illustrating the operation of a control device according to the fourth embodiment. FIG. 23 is a diagram illustrating an example of the movement of the virtual pointer and real pointer in the case that the processing shown in FIG. 22 has been executed.

With regard to the processing other than ST705 through ST708, the same processing as the processing shown in the above FIG. 12 is executed.

As shown in FIG. 22, upon receiving the movable information of the pointer 2 (YES in ST701), the MPU 35 of the control device 40 generates first coordinate values based on the information of velocity values (ST702), and determines whether or not the first coordinate values are coordinate values within the virtual screen region 52 (ST703).

In the case that the first coordinate values are coordinate values within the virtual screen region 52 (YES in ST703), the MPU 35 calculates the expression of a straight line connecting the first coordinate values and the center coordinates (origin (0, 0)) of the real screen region 51 (ST705).

Next, the MPU 35 generates second coordinate values (X'(t), Y'(t)) by obtaining an intersection between the calculated straight line and the edge portion 53 of the real screen region 51 (ST706). Note that two intersections are calculated as an intersection between the straight line and the edge portion 53 of the real screen region 51, but of the two intersections, the MPU 35 should employ an intersection closer to the first coordinate values as second coordinate values.

Upon the second coordinate values being generated, the MPU 35 determines the orientation of the real pointer 2' from the inclination of the straight line (ST707). In this case, the orientation of the real pointer 2' is determined so as to face the inclination direction of the straight line.

Upon the orientation of the real pointer 2' being determined, the MPU 35 controls the display so as to display the real pointer 2' on the position according to the generated second coordinate values (X'(t), Y'(t)) on the real screen region 51 with the determined orientation (ST708).

According to the processing shown in FIG. 22, the movement and orientation of the real pointer 2' as to the movement of the virtual pointer 2" are such as shown in FIG. 23.

With the fourth embodiment as well, similar to the third embodiment, the orientation of the real pointer 2' to be displayed on the edge portion 53 of the real screen region 51 is changed according to the position of the virtual pointer 2", and accordingly, the user can readily recognize the direction where the virtual pointer 2" exists. Thus, the operability of the pointer 2 can be improved.

Fifth Embodiment

Next, a fifth embodiment of the present invention will be described. With the fifth embodiment, the shape of the real pointer 2' in the case that the virtual pointer 2" does not exist within the virtual screen region 52, and the shape of the real pointer 2' in the case that the virtual pointer 2" exists within the virtual screen region 52 differ. Accordingly, description will be made focusing on this point.

Figure 24:
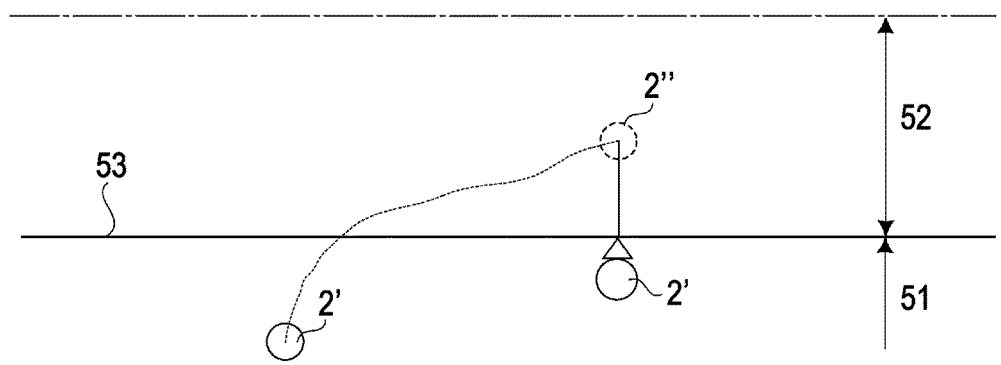
FIG. 24 is a diagram illustrating the real pointer displayed within a real image region by a control device according to yet another embodiment.

FIG. 24 is a diagram illustrating a real pointer to be displayed within the real screen region by a control device according to the fifth embodiment. As shown in FIG. 24, the real pointer 2' to be displayed within the real screen region 51 in the case that the virtual pointer 2" does not exist within the virtual screen region 52 (in the case that the first coordinate values are included in the real screen region 51) has a round shape.

On the other hand, in the case that the virtual pointer 2" exists within the virtual screen region 52 (in the case that the first coordinate values are included in the virtual screen region 52), the real pointer 2' to be displayed on the edge portion 53 of the real screen region 51 does not have a simple round shape but a shape wherein an arrow portion is added to the body of a round shape.

The real pointer 2' in the case that the virtual pointer 2" does not exist within the virtual screen region 52 has a simple round shape, but with this round-shaped real pointer 2', the direction of the virtual pointer 2" is not readily pointed. Therefore, in the case that the virtual pointer 2" exists within the virtual screen region 52, the shape of the real pointer 2' is changed so as to point the direction of the virtual pointer 2".

Thus, the user can readily recognize the direction where the virtual pointer 2" exists. Also, with the fifth embodiment, in the case that the virtual pointer 2" exists within the virtual screen region 52, the shape of the real pointer 2' is changed, and accordingly, the user can readily recognize that the operation of the pointer 2 has been switched to the operation within the virtual screen region 52.

The orientation of the real pointer 2' may be determined by the method described in the above third embodiment, or may be determined by the method described in the above fourth embodiment.

With the fifth embodiment, the virtual pointer 2' in the case that the virtual pointer 2" exists within the virtual screen region 52 has a shape wherein an arrow portion is added to the body of a round shape. However, the shape of the real pointer 2' is not restricted to this. Typically, as long as a shape whereby the direction of the virtual pointer 2" can be pointed, any kind of shape may be employed. For example, such as described in the above embodiments, the real pointer 2' may be changed to a arrow-feather shaped pointer 2, or may be changed to animation expressions or the like.

Sixth Embodiment

Next, a sixth embodiment of the present invention will be described. With the sixth embodiment, in the case that the virtual pointer 2" exist within the virtual screen region 52, not only the real pointer 2' points the direction of the virtual pointer 2" but also the shape of the real pointer 2' is changed according to distance between the real pointer 2' and the virtual pointer 2". Accordingly, description will be made focusing on this point. Note that, with the sixth embodiment, description will be made focusing on a point different from the above third embodiment.

Figure 25:
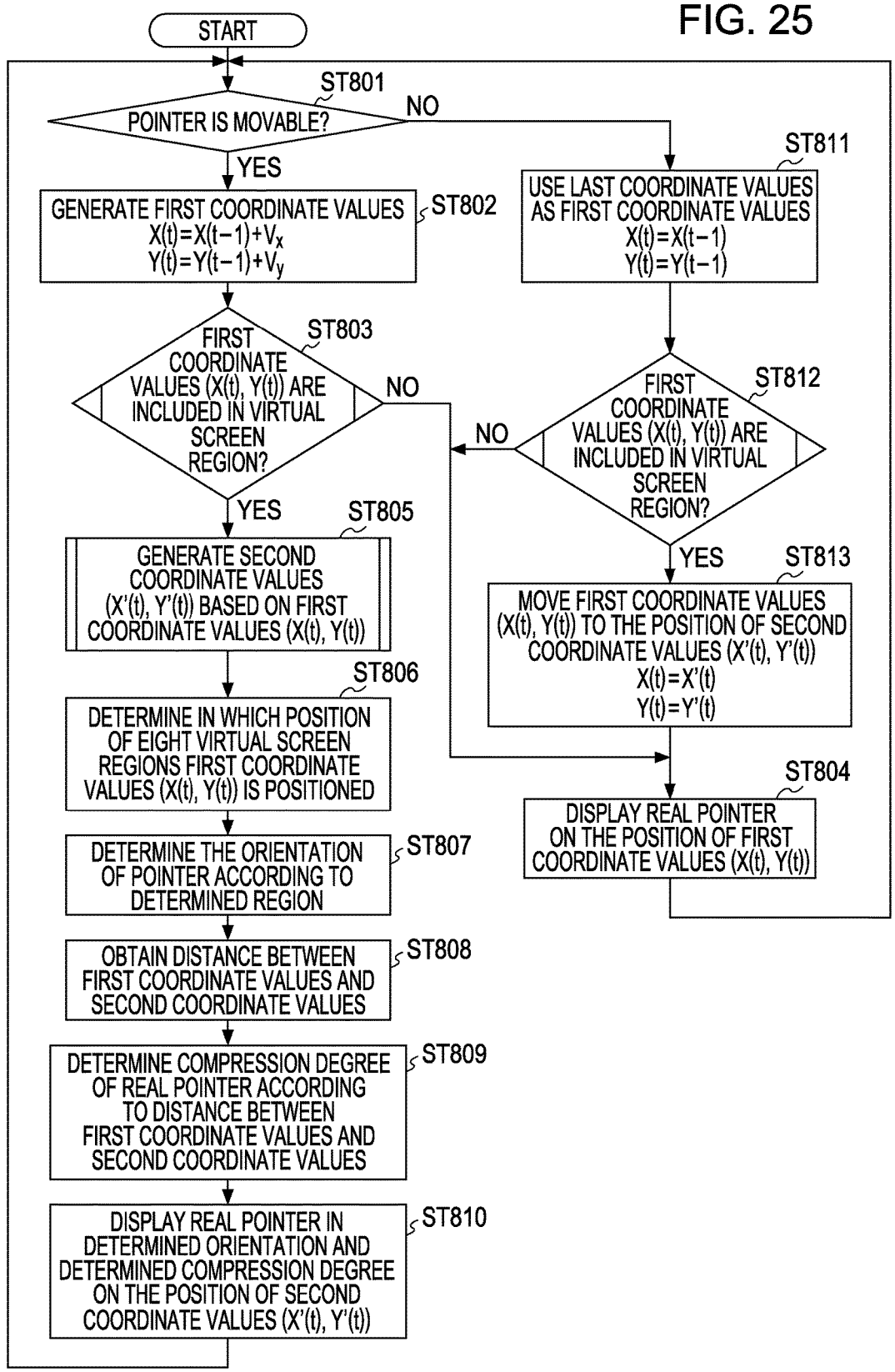
FIG. 25 is a flowchart illustrating the operation of a control device according to yet another embodiment.
Figure 26:
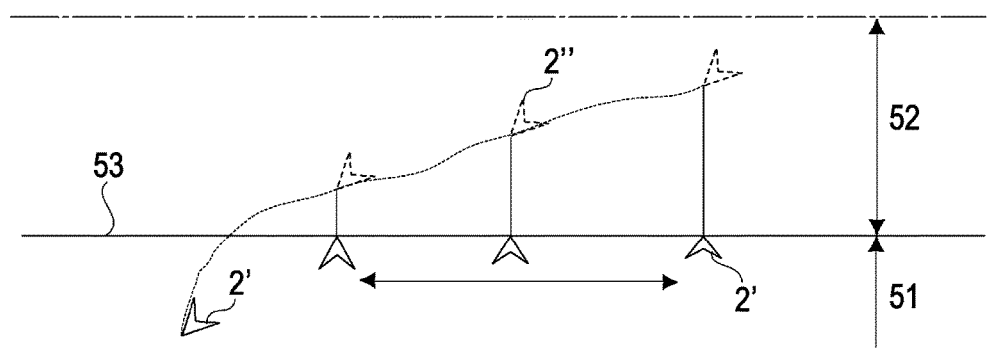
FIG. 26 is a diagram illustrating an example of the movements of the virtual pointer and the real pointer in the case the processing shown in FIG. 25 is executed.

FIG. 25 is a flowchart illustrating the operation of a control device according to the sixth embodiment, and FIG. 26 is a diagram illustrating an example of the movement of the virtual pointer and real pointer in the case that the processing shown in FIG. 25 has been executed.

With regard to the processing other than ST808 through ST810, the same processing as the processing shown in the above FIG. 19 is executed.

As shown in FIG. 25, upon determining the orientation of the real pointer 2' according to in which position of the eight divided regions 52a through 52h the first coordinate values are located in ST807, the MPU 35 of the control device 40 obtains distance between the first coordinate values and the second coordinate values (ST808).

Next, the MPU 35 determines the compressing degree of the real pointer 2' according to the distance between the first coordinate values and the second coordinate values (ST809). In this case, determination is made so that the greater the distance between the first coordinate values and the second coordinate values is, the greater the compressing degree of the real pointer 2' is.

Next, the MPU 35 controls the display so as to display the real pointer 2' on the position according to the second coordinate values on the edge portion 53 of the real screen region 51 with the orientation of the real pointer 2' determined in ST807, and the compressing degree of the real pointer 2' determined in ST809 (ST810).

According to the processing shown in FIG. 25, the movement, orientation, and compressing degree of the real pointer 2' as to the movement of the virtual pointer 2" are such as shown in FIG. 26. Note that FIG. 26 illustrates a case where the real pointer 2' is displayed on the upper-side edge portion 53 of the real screen region 51.

With the sixth embodiment, the real pointer 2' is displayed with a compressed shape according to the distance between the real pointer 2' and the virtual pointer 2", and accordingly, the user can readily recognize not only the direction where the virtual pointer 2" exists but also the distance between the real pointer 2' and the virtual pointer 2".

Various Modifications of Sixth Embodiment

Figure 27A:
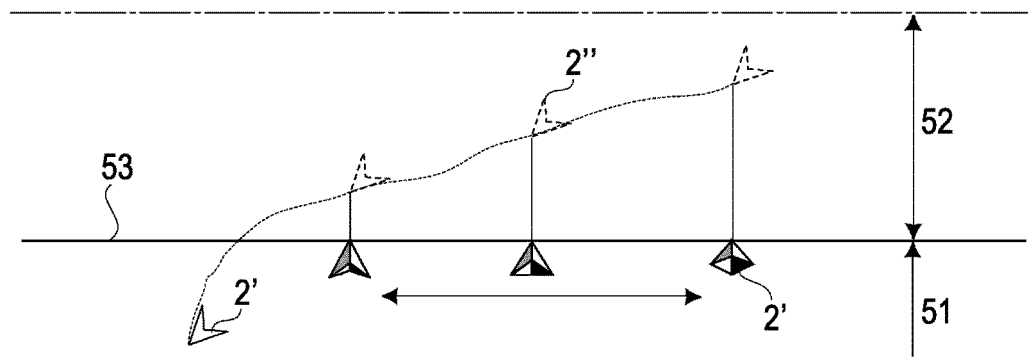
FIGS. 27A and 27B are diagrams illustrating a modification of yet another embodiment.
Figure 27B:
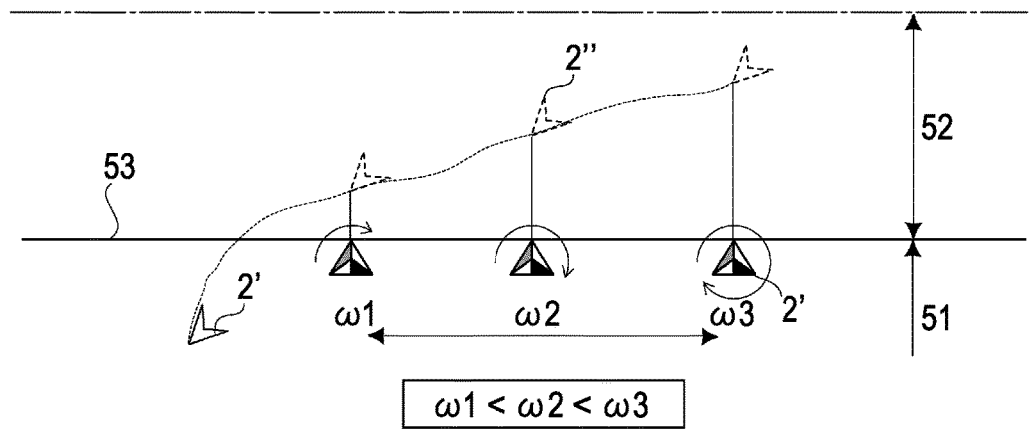

FIGS. 27A and 27B, and FIGS. 28A through 28C are diagrams illustrating a modification of the sixth embodiment. FIG. 27A illustrates a case where the real pointer 2' to be displayed on the edge portion 53 of the real screen region 51 is displayed with three-dimensional animation expressions. Animation expressions will be made so that as the distance between the real pointer 2' and the virtual pointer 2" increases, the compressing degree of the three-dimensional real pointer 2' increases. FIG. 27B illustrates a case where as the distance between the real pointer 2' and the virtual pointer 2" increases, the rotation speed of the real pointer 2' three-dimensionally displayed increases.

Figure 28A:
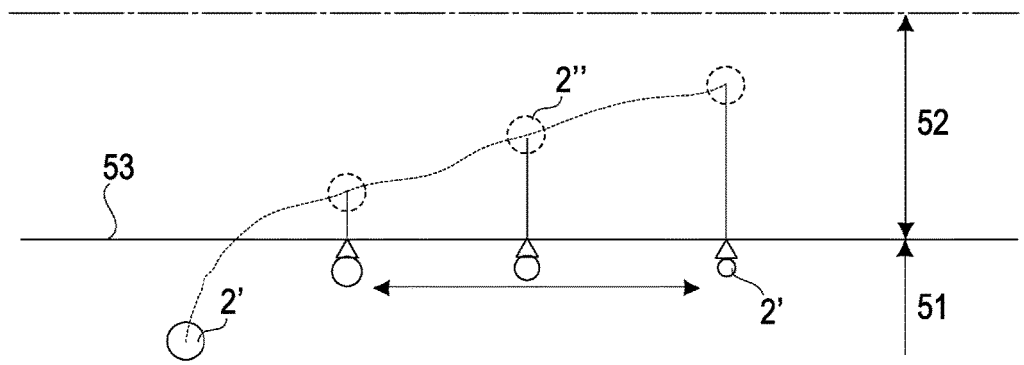
FIGS. 28A through 28C are diagrams illustrating a modification of yet another embodiment.
Figure 28B:
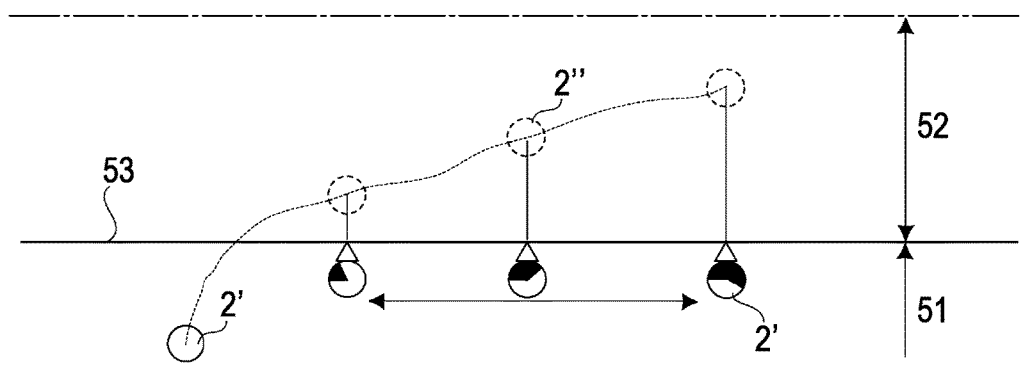
Figure 28C:
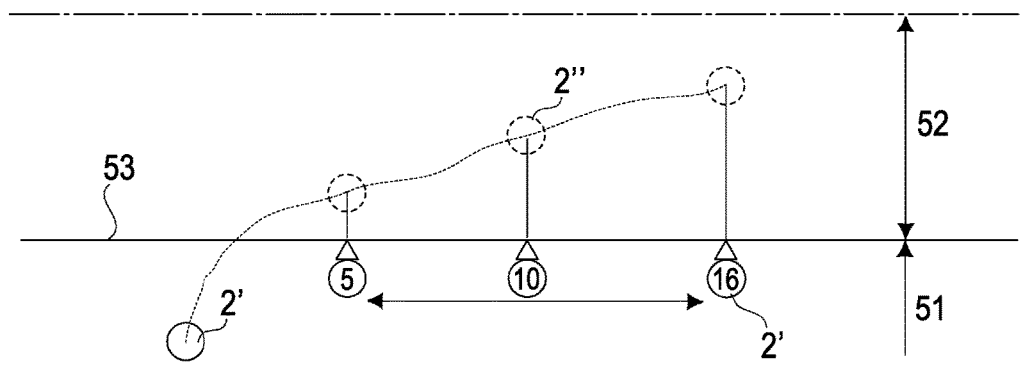

FIG. 28A illustrates a case where as the distance between the real pointer 2' and the virtual pointer 2" increases, the size of the round-shaped real pointer 2' decreases. FIG. 28B illustrates a case where as the distance between the real pointer 2' and the virtual pointer 2" increases, the pie chart indication meter of the round-shaped real pointer 2' increases. FIG. 28C illustrates a case where as the distance between the real pointer 2' and the virtual pointer 2" increases, the number displayed into the round-shaped real pointer 2' increases.

FIGS. 29A and 29B are diagrams illustrating an example in a case where, with the center coordinates (origin (0, 0)) of the real screen region 51 as a reference, the shape of the real pointer is changed according to the distance between the real pointer and the virtual pointer. FIG. 29A illustrates a case where the distance between the real pointer 2' and the virtual pointer 2" increases, the compressing degree of the arrow-feather shaped real pointer 2' increases. FIG. 29B illustrates a case where the distance between the real pointer 2' and the virtual pointer 2" increases, the size of the round-shaped real pointer 2' decreases.

In the case such as shown in FIGS. 29A and 29B as well, the user can be allowed to recognize the direction where the virtual pointer 2" exists, and the distance between the real pointer 2' and the virtual pointer 2".

With description in FIGS. 25 through 29B, description has been made regarding a case where the user is allowed to recognize sense of distance by change in the compressing degree of the real pointer 2', change in animation expressions, change in rotation speed, change in size, change in pie chart indication meter expressions, change in numerals, and the like. However, the method for allowing the user to recognize the distance between the real pointer 2' and the virtual pointer 2" is not restricted to this. Typically, the shape of the real pointer 2' should be changed so as to allow the user to recognize the distance between the real pointer 2' and the virtual pointer 2". Other examples for allowing the user to recognize the distance between the real pointer 2' and the virtual pointer 2" include change in the color of the real pointer 2', change in color density, change in blinking speed, and the like. Alternatively, a combination of at least two of the above examples may be employed.

Seventh Embodiment

Next, a seventh embodiment of the present invention will be described. The seventh embodiment differs from the above embodiments in that in the case that the virtual pointer 2" exists within the virtual screen region 52, an indicator 61 is displayed instead of the real pointer 2'. Accordingly, description will be made focusing on this point.

Figure 30:
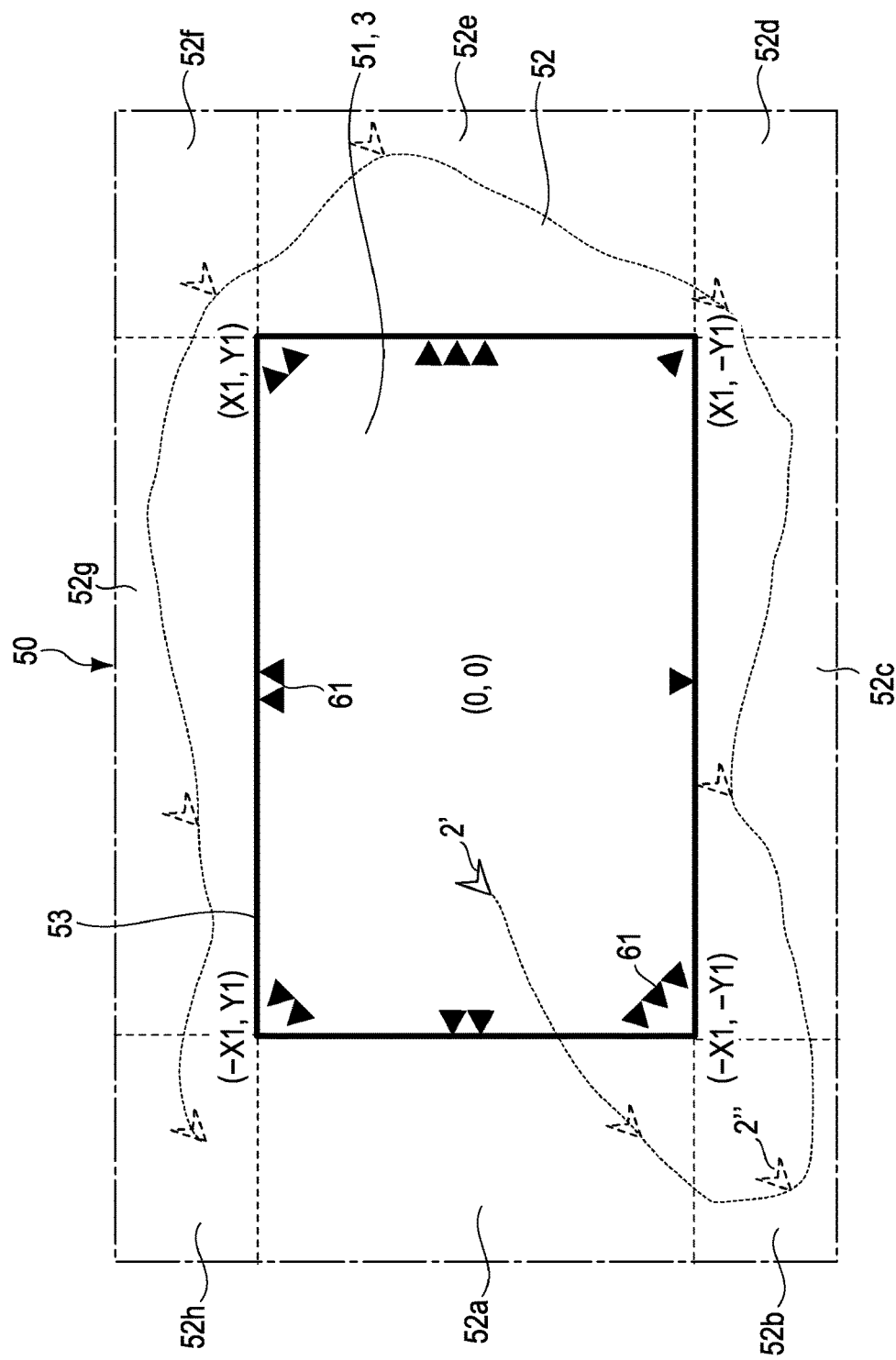
FIG. 30 is a diagram illustrating an indicator to be displayed within the real screen region in the case that the virtual pointer exists within the virtual screen region.

FIG. 30 is a diagram illustrating an indicator to be displayed on the real screen region in the case that the virtual pointer exists within the real screen region. As shown in FIG. 30, the virtual screen region 52 is divided into eight regions 52a through 52h of the left, lower left, lower, lower right, right, upper right, upper, and upper left of the real screen region.

In the case that the virtual pointer 2" exists within the virtual screen region 52, the real pointer 2' is eliminated, and the indicator 61 is displayed instead of the real pointer 2'.

For example, in the case that the virtual pointer 2" exists within the left-side virtual screen region 52a of the real screen region 51, the indicator 61 is displayed so as to point the left side near the center of the edge portion 53 of the real screen region 51. Similarly, in the case that the virtual pointer 2" exists within the lower region 52c, right region 52e, and upper region 52g of the real screen region 51, the indicator 61 is displayed so as to point downward near the center of the lower edge portion 53 of the real screen region 51, so as to point the right near the center of the right edge portion 53, and so as to point upward near the center of the upper edge portion 53, respectively.

In the case that the virtual pointer 2" exists within the lower-left virtual screen region 52b of the real screen region 51, the indicator 61 is displayed so as to point a lower-left direction near the lower-left corner (−X1, −Y1) of the real screen region 51. Similarly, in the case that the virtual pointer 2" exists within the lower-right region 52d, upper-right region 52f, and upper-left region 52h of the real screen region 51, the indicator 61 is displayed so as to point lower right near the lower-right corner (X1, −Y1), so as to point upper right near the upper-right corner (X1, Y1), and so as to point upper left near the upper-left corner (−X1, Y1), respectively.

Also, in the case that the virtual pointer 2" exists within the four vertical and horizontal regions 52a, 52c, 52e, and 52g, as distance between the edge portion 53 of the real screen region 51, and the virtual pointer 2" increases, the number of the indicators 61 to be displayed increases.

In the case that the virtual pointer 2" exists within the four corner regions 52b, 52d, 52f, and 52h, as distance between the corners of the real screen region 51, and the virtual pointer 2" increases, the number of the indicators 61 to be displayed increases.

With regard to the number of the indicators 61, for example, the minimum number in the case that the distance is short is set to 1, and the maximum number in the case that the distance is long is set to 3. Note that the number of the indicators 61 is not restricted to these. For example, the number of the indicators 61 may be changed between 1 through 5, or between 1 through 10. The number of the indicators 61 may be changed as appropriate.

According to the indicators 61, the user can readily recognize the direction where the virtual pointer 2" exists, and the distance between the edge portion 53 (or corners) of the real screen region 51 and the virtual pointer 2".

In FIG. 30, a case has been described wherein the shape of the indicator is a triangle. However, the shape of the indicator is not restricted to this. Typically, as long as a shape whereby a predetermined direction can be pointed, any kind of shape may be employed. For example, the indicator 61 may be an animation or the like.

In FIG. 30, the method for allowing the user to recognize sense of distance as to the virtual pointer 2" by change in the number of the indicators 61 has been described. However, the method for allowing the user to recognize sense of distance is not restricted to this. For example, change in the size of the indicator 61, change in color, change in animation expressions, or the like may be employed.

Eighth Embodiment

Next, an eighth embodiment of the present invention will be described. The eighth embodiment differs from the above embodiments in that a small screen equivalent to the whole screen region 50 is displayed within the real screen region 51. Accordingly, description will be made focusing on this point.

Figure 31:
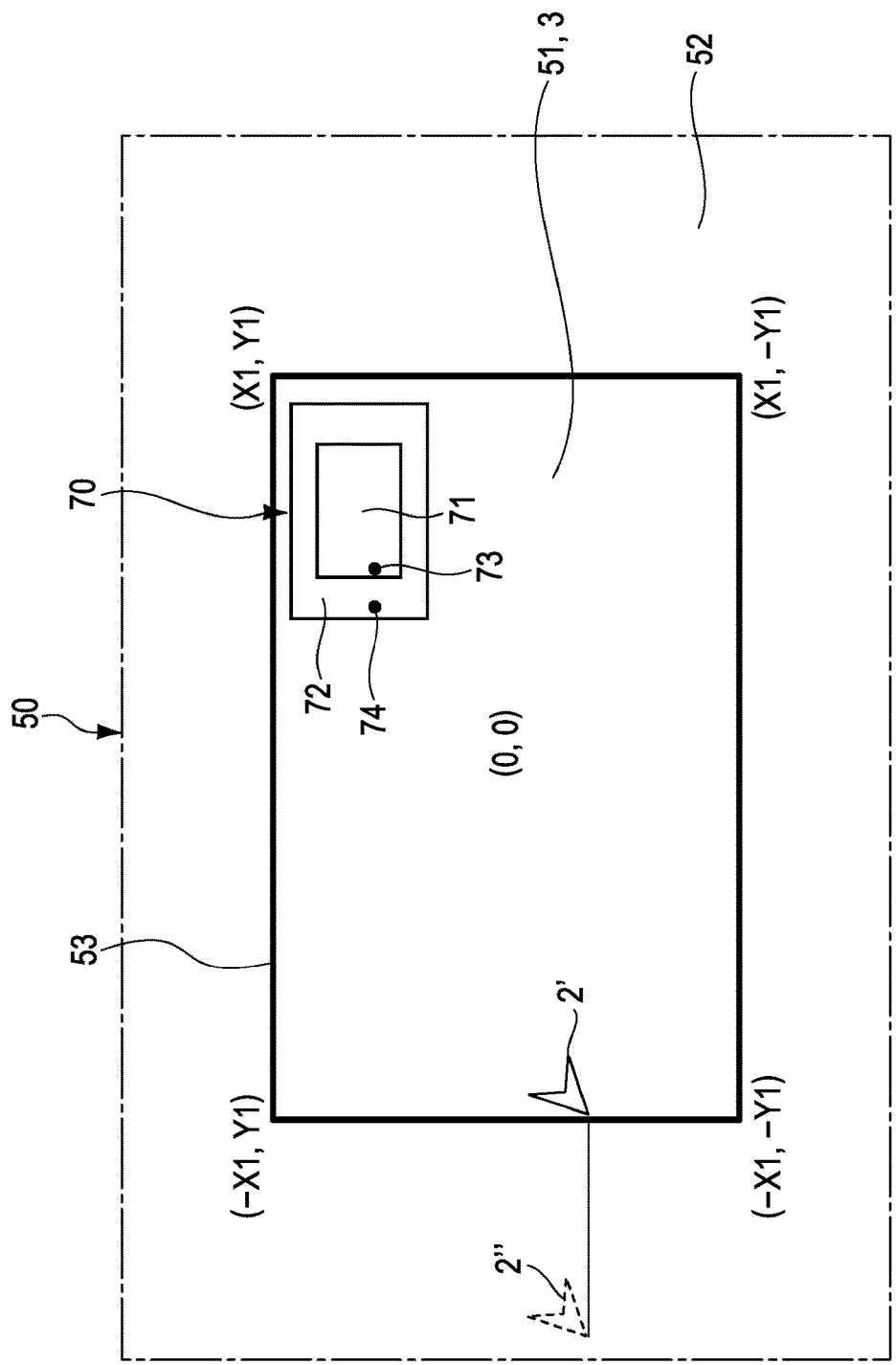
FIG. 31 is a diagram illustrating a small screen displayed within the real screen region.

FIG. 31 is a diagram illustrating a small screen to be displayed within the real screen region 51. As shown in FIG. 31, a small screen 70 equivalent to the whole screen region 50 is displayed within the real screen region 51. The small screen 70 is displayed, for example, within the upper-right real screen region 51. The position where the small screen 70 is displayed may be any position as long as the display position does not prevent the user from comfortably viewing the screen 3.

Typically, the small screen 70 is displayed in the case that the virtual pointer 2" exists within the virtual screen region 52, and is not displayed in the case that the virtual pointer 2" is not displayed within the virtual screen region 52. However, the display timing for the small screen 70 is not restricted to this, and accordingly, the small screen 70 may be displayed within the real screen region 51 all the time.

The small screen 70 includes a first region 71 equivalent to the real screen region 51, and a second region 72 equivalent to the virtual screen region 52. A first pointer 73 indicating the position of the real pointer 2' within the real screen region 51 is displayed within the first region 71. A second pointer 74 indicating the position of the virtual pointer 2" within the virtual screen region 52 is displayed within the second region 72.

The first point 73 and the second point 74 have, for example, a round shape, but are not restricted to this. For example, the first point 73 and the second point 74 may have the same shapes as the real pointer 2' and the virtual pointer 2", respectively.

The first point 73 is moved and displayed according to the movement of the real pointer 2'. Similarly, the second point 74 is moved and displayed according to the movement of the virtual pointer 2". Thus, the user can readily recognize the position of the virtual pointer 2" by viewing the small screen 70.

FIG. 31 illustrates a case where in the event that the virtual pointer 2" exists within the virtual screen region 52, the real pointer 2' is displayed, but in the case that the virtual pointer 2" does not exist, the real pointer 2' does not have to be displayed within the real screen region 51.

Ninth Embodiment

With a ninth embodiment and thereafter, description will be made regarding a case where a selection operating region is set within the virtual screen region 52.

Figure 32:
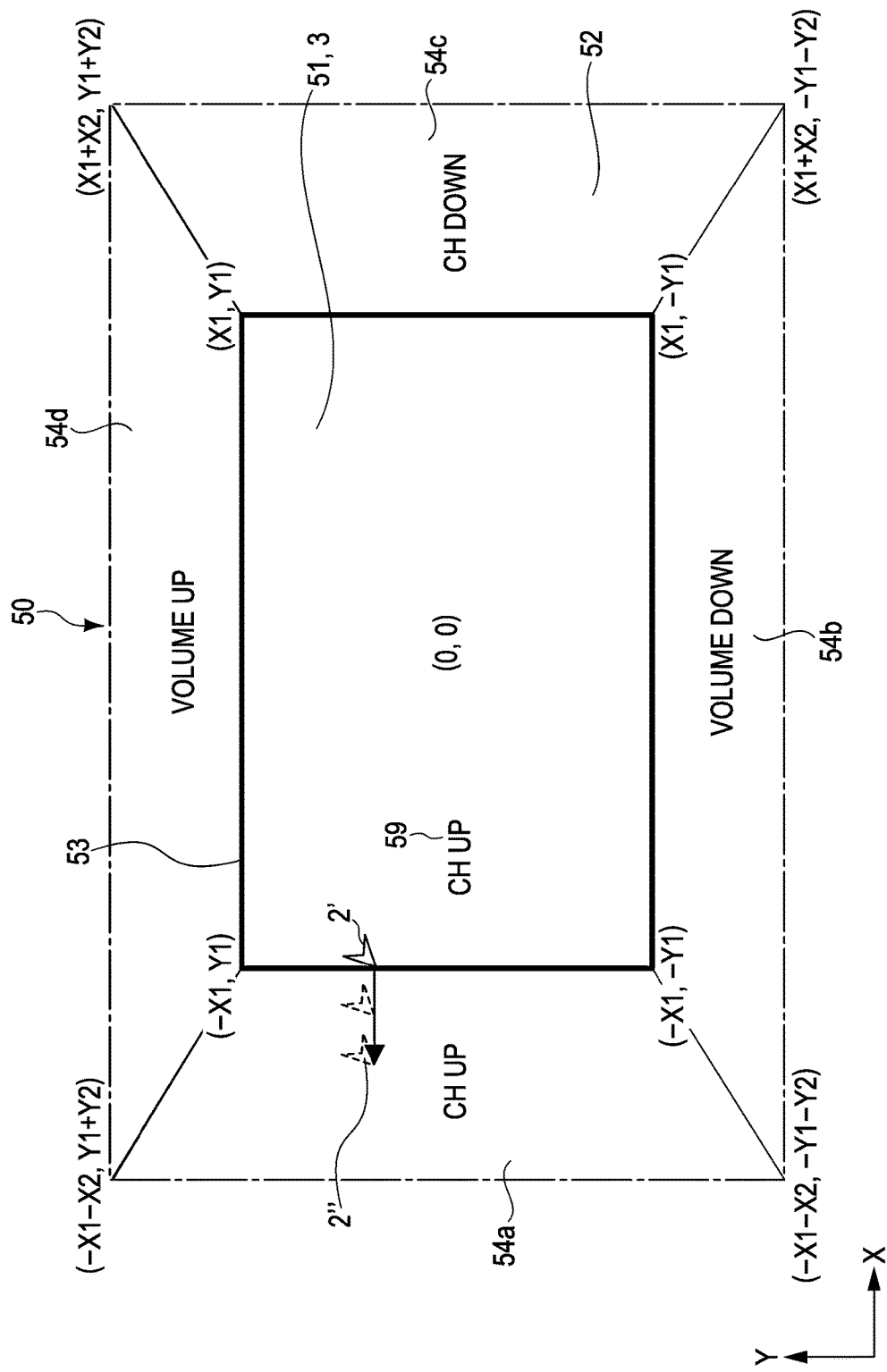
FIG. 32 is a diagram illustrating a selection operating region that a control device according to yet another embodiment stores in a manner correlated with the virtual screen region.
Figure 33:
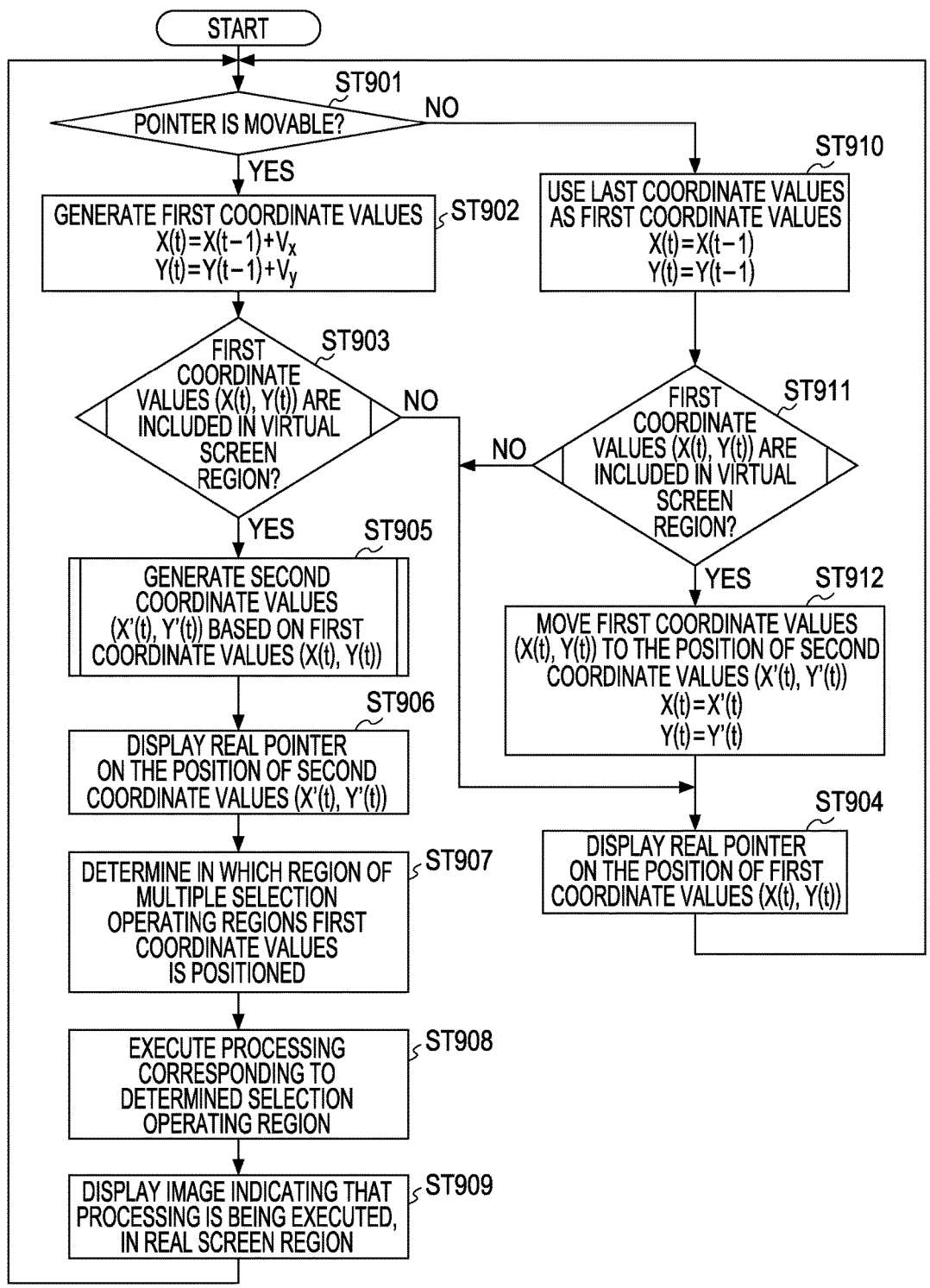
FIG. 33 is a flowchart illustrating the operation of a control device according to yet another embodiment.

FIG. 32 is a diagram illustrating selection operating regions that a control device according to the ninth embodiment stores in a manner correlated with the virtual screen region. FIG. 33 is a flowchart illustrating the operation of the control device according to the ninth embodiment. As shown in FIG. 32, the virtual screen region 52 is divided into four trapezoidal regions, and these four regions are correlated with four selection operating regions 54a, 54b, 54c, and 54d. The control device 40 stores the four selection operation regions in the ROM 37, RAM 36, or other memory. FIG. 32 illustrates a case where the selection operating regions 54a, 54b, 54c, and 54d are trapezoids, but the selection operating regions may be rectangles, and accordingly, the shapes of the selection operating region are not restricted to a particular shape.

The selection operating region 54a positioned on the left side of the real screen region 51 is, for example, an operating region for changing channels up such as with a television broadcast or the like. The selection operating region 54c positioned on the right side of the real screen region 51 is an operating region for changing channels down such as a television broadcast or the like.

Also, the selection operating region 54*d* positioned on the upper side of the real screen region 51 is an operating region for turning volume up of the sound volume output. The selection operating region 54*b* positioned on the lower side of the real screen region 51 is an operating region for turning volume down of sound volume output.

With regard to the processing other than ST907 through ST909 in FIG. 33, the same processing as the processing shown in FIG. 12 is executed.

Upon receiving the movable information of the pointer (YES in ST901), the MPU 35 of the control device 40 generates first coordinate values based on the information of velocity values (ST902), and determines whether or not the first coordinate values are coordinate values within the virtual screen region 52 (ST903). In the case that the first coordinate values are coordinate values within the virtual screen region 52 (YES in ST903), the MPU 35 generates second coordinate values based on the first coordinate values (ST905), and displays the real pointer 2' on the position according to the second coordinate values (ST906).

Next, the MPU 35 of the control device 40 determines which region of the four selection operating regions 54*a*, 54*b*, 54*c*, and 54*d* the first coordinate values belong to (ST907).

Next, the MPU 35 executes processing corresponding to the determined selection operating region (ST908). For example, in the case that the first coordinate values are positioned within the selection operating region 54*a* positioned on the left side of the real screen region 51, the MPU 35 executes changing channels up processing for television broadcasts. Also, for example, in the case that the first coordinate values are positioned within the selection operating region 54*d* positioned on the upper side of the real screen region 51, the MPU 35 executes turning volume up processing for sound volume output.

Upon executing the processing corresponding to the determined selection operating region, the MPU 35 displays an image 59 indicating that the processing thereof is being executed, within the real screen region 51 (ST909).

According to the processing shown in FIG. 33, the user can intuitively switch the channel such as a television broadcast, or adjust sound volume output with a sense of operating the virtual pointer 2" within the virtual screen region 52 (within the determined selection operating region).

Also, when the processing corresponding to the determined selection operating region is being executed, the image 59 indicating that the processing is being executed is displayed within the real screen region 51, and accordingly, the user can readily recognize that the processing is being executed.

Here, in the case that the user releases the thumb from above the button 11 of the input device, the first coordinate values are returned to the inside of the real screen region 51 (NO in ST901→ST910→YES in ST911→ST912→ST904). In the case that the first coordinate values are included in the real screen region 51, the processing corresponding to the determined selection operating region is not executed (NO in ST903, NO in ST911).

Accordingly, the processing corresponding to the determined selection operating region can be finished by the user releasing from above the button 11. For example, let us say that television broadcast channel switching processing has been executed by the user operating the virtual pointer 2" within the selection operating region 54*a*. In this case, when the channel is switched to an arbitrary channel, the user releases the thumb from the button 11, and thus, the first coordinate values are moved to the inside of the real screen region 51, and accordingly, channel switching can be finished. Thus, the user can finish the processing corresponding to the determined selection operating region by simple finger operations.

Various Modifications of Ninth Embodiment

In the case that the virtual pointer 2" exists within a selection operating region (within the virtual screen region 52), the shape of the real pointer 2' may be changed according to the distance between the first coordinate values and the second coordinate values.

In the case that the virtual pointer 2" exists within a selection operating region, an arrangement may be made wherein the MPU 35 of the control device 40 awaits transmission of a determination command from the input device 1, and then executes the processing corresponding to the selection operating region thereof.

In FIGS. 32 and 33, a case has been described wherein in the event that the virtual pointer 2" exists within a selection operating region (within the virtual screen region 52), the real pointer 2' is displayed within the real screen region 51. However, even in the event that the virtual pointer 2" exists within a selection operating region (within the virtual screen region 52), when the processing corresponding to the determined selection operating region is being executed, the real pointer 2' does not have to be displayed within the real screen region 51.

Also, description has been made wherein in the case that the processing corresponding to the determined selection operating region is being executed, the image 59 indicating that the processing thereof is being executed is displayed, but the image 59 does not have to be displayed.

In the case that the virtual pointer 2" exists, the MPU 35 may variably control the switching speed of the processing corresponding to the determined selection operating region according to the distance between the first coordinate values and the second coordinate values. In this case, for example, the MPU 35 should obtain the distance between the first coordinate values and the second coordinate values after ST907 in FIG. 33, and in ST908 execute the processing corresponding to the determined selection operating region at the switching speed according to the obtained distance. The distance between the first coordinate values and the second coordinate values may be calculated with the origin (0, 0) of the real screen region 51 as a reference (see FIGS. 22 and 23).

In this case, control is performed so that as the distance between the first coordinate values and the second coordinate values increases, the switching speed increases. For example, as the above distance increases, channel switching speed, or volume switching speed increases. Thus, the user can arbitrarily adjust the switching speed by intuitive operations. In the case that the switching speed is variably controlled, control does not have to be performed based on the first coordinate values and the second coordinate values.

Figure 34:
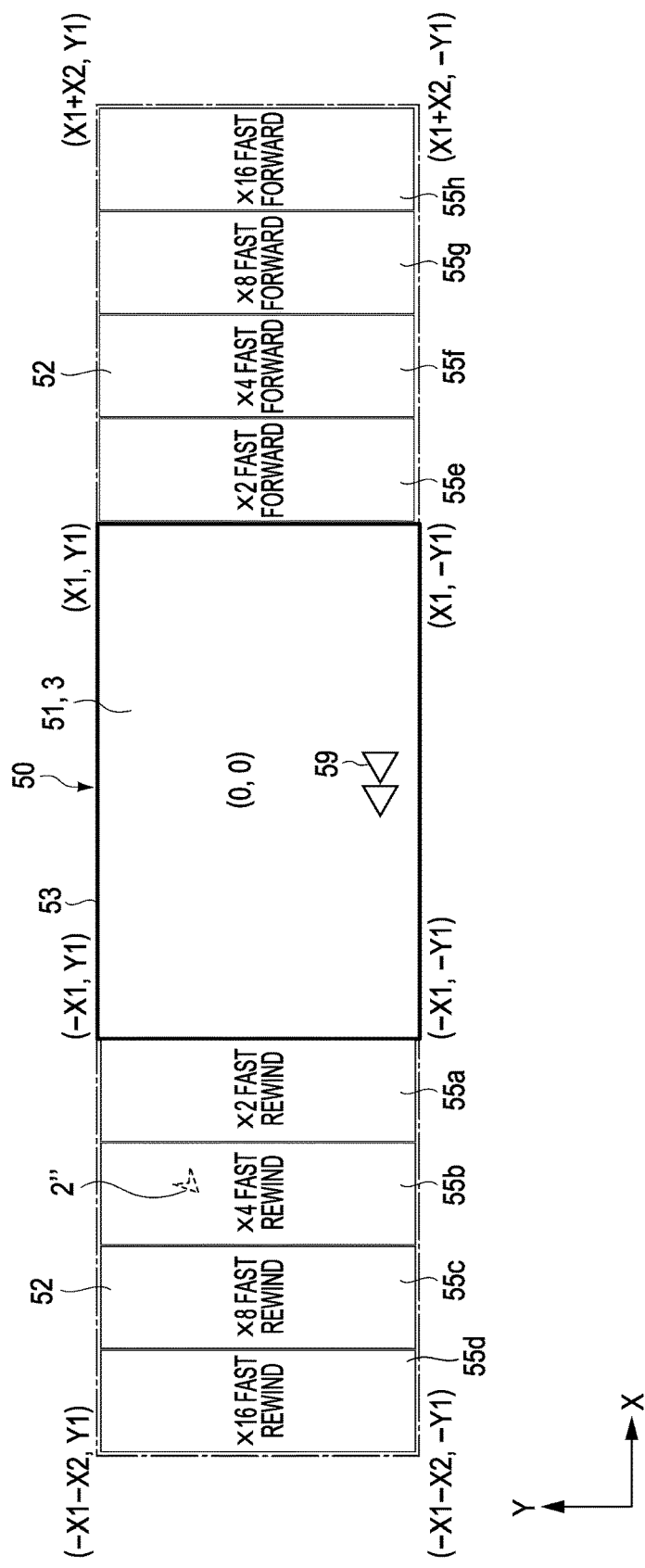
FIG. 34 is a diagram for describing another embodiment in the case that switching speed is variable.

FIG. 34 is a diagram for describing another mode in the case that the switching speed is set variably. With the example shown in FIG. 34, the virtual screen region 52 is set to the left side and right side of the real screen region 51. The virtual screen region 52 on the left side of the real screen region 51 is divided into four regions, and these four regions are correlated with four selection operating regions 55*a*, 55*b*, 55*c*, and 55*d*. Similarly, the virtual screen region 52 on the right side of the real screen region 51 is divided into four regions, and these four regions are correlated with four selection operating regions 55e, 55f, 55g, and 55h. That is to say, with the example in FIG. 34, the virtual screen region 52 is divided into the eight selection operating regions.

The selection operating regions 55a, 55b, 55c, and 55d on the left side of the real screen region 51 are operating regions equivalent to ×2 fast rewind, ×4 fast rewind, ×8 fast rewind, and ×16 fast rewind, respectively.

On the other hand, the selection operating regions 55e, 55f, 55g, and 55h on the right side of the real screen region 51 are operating regions equivalent to ×2 fast forward, ×4 fast forward, ×8 fast forward, and ×16 fast forward, respectively.

In the case that the first coordinate values are included in the virtual screen region 52, the MPU 35 should determine, of the eight selection operating regions 55a through 55h, in which selection operating region the first coordinate values are positioned, and according to the determination result, should execute predetermined speed rewind, or forward processing. Thus, the switching speed is variably controlled. In such a case as well, the user can arbitrarily adjust the switching speed by intuitive operations.

FIG. 34 illustrates a case where in the event that the virtual pointer 2″ exists within the virtual screen region 52, the real pointer 2′ is not displayed within the real screen region 51. Also, FIG. 34 illustrates a case where, when rewind or forward processing is being executed, the image 59 according to the processing thereof is displayed below within the real screen region 51.

Here, in the case of FIG. 34, the selection operating regions are divided and set beforehand so as to change the switching speed, and accordingly, the MPU 35 does not have to obtain the distance between the first coordinate values and the second coordinate values. As described above, the MPU 35 should determine in which selection operating region the first coordinate values are positioned, and according to the determination result, should execute predetermined speed rewind, or forward processing. Thus, the switching speed is variably controlled.

In FIGS. 32 through 34, description has been made assuming that the selection operating regions are equivalent to up/down of channels, up/down of sound volume, and fast forward/rewind of a moving image. However, the selection operating regions are not restricted to these. For example, the selection operating regions may be an operating region for playback/stop of a moving image, or may be frame forward/frame rewind of still images, or may be an operating region for chapter setting of a moving image. Alternatively, a moving image itself or a still image itself may be set to the selection operating regions.

Figure 35:
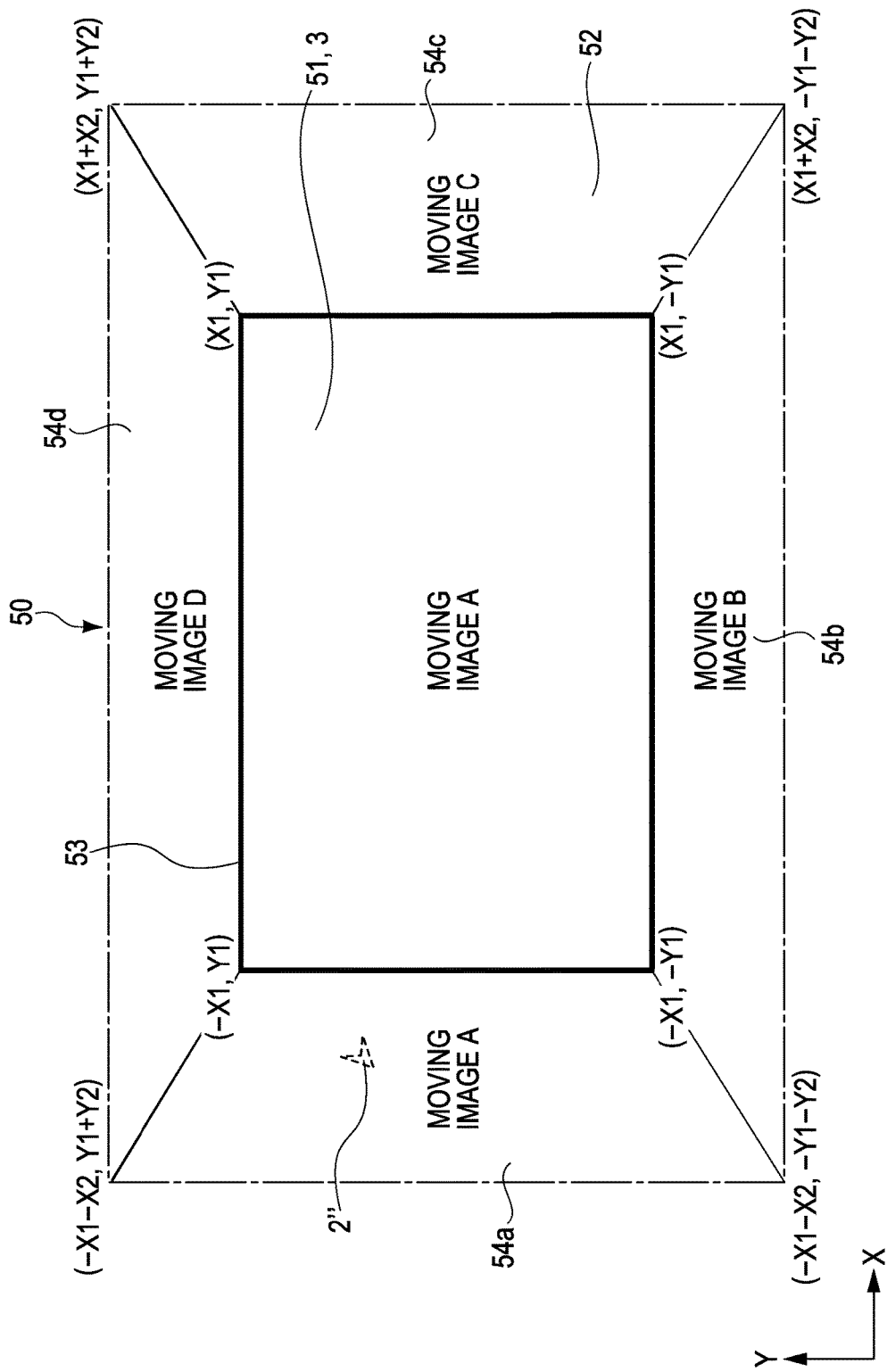
FIG. 35 is a diagram illustrating the whole screen region in the case that a moving image is set to the selection operating region.

FIG. 35 is a diagram illustrating the whole screen region in the case that a moving image is set to the selection operating regions. As shown in FIG. 35, a moving image A is set to the selection operating region 54a positioned on the left side of the real screen region 51. Similarly, a moving image B, a moving image C, and a moving image D are set to the selection operating region 54b on the lower side of the real screen region 51, the selection operating region 54c on the right side, and the selection operating region 54d on the upper side, respectively.

In the case that the first coordinate values are included in a selection operating region (within the virtual screen region 52), the MPU 35 of the control device 40 determines in which selection operating region of the four selection operating regions 54a through 54d the first coordinate values are positioned. Subsequently, the MPU 35 should play the moving image set to the determined selection operating region. The moving image may be displayed on the entirety of the real screen region 51, or may be displayed on a part of the real screen region 51.

Thus, the user can select an arbitrary moving image out of multiple moving images with a sense of operating the virtual pointer 2″ within the virtual screen region 52 (selection operating region).

FIG. 35 illustrates a case where, in the event that the virtual pointer 2″ exists within the virtual screen region 52 (selection operating region), the real pointer 2′ is not displayed, but the real pointer 2′ may be displayed.

Tenth Embodiment

Next, a tenth embodiment of the present invention will be described.

With the above ninth embodiment, a case has been described wherein the selection operating regions are set to only the virtual screen region 52, and no selection operating region is set to the real screen region 51. On the other hand, with the tenth embodiment, the selection operating regions are set to the two regions of the virtual screen region 52 and the real screen region 51. Accordingly, description will be made focusing on this point.

Figure 36:
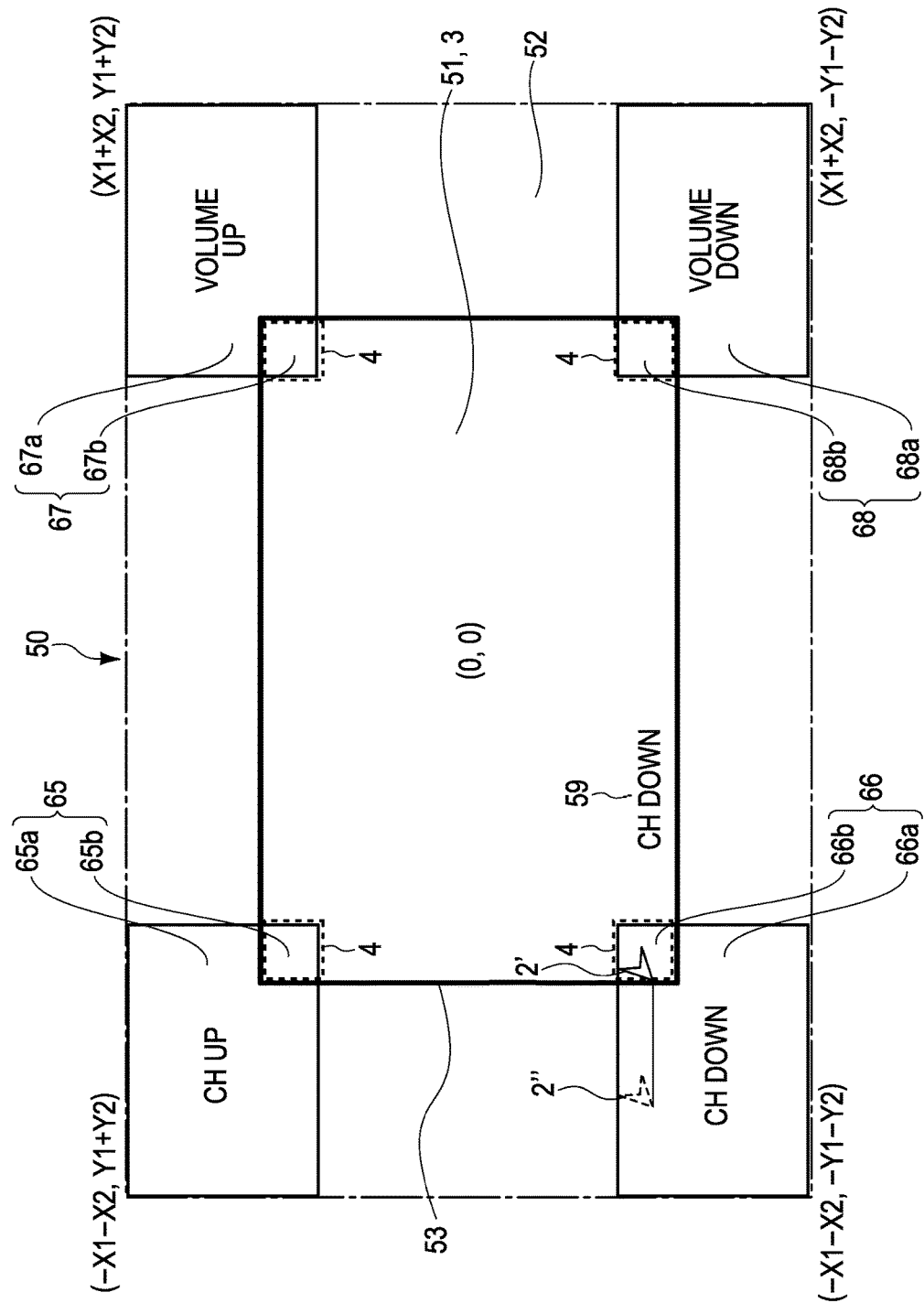
FIG. 36 is a diagram illustrating a selection operating region that a control device according to yet another embodiment stores.

FIG. 36 is a diagram illustrating selection operating regions that a control device according to the tenth embodiment. As shown in FIG. 36, selection operating regions 65, 66, 67, and 68 are set to two of the virtual screen region 52 and the real screen region 51.

As shown in FIG. 36, the four selection operating regions 65, 66, 67, and 68 are set to the four corners of the upper-left, lower-left, lower-right, and upper-right of the whole screen region 50, respectively.

The selection operating region 65 set to the corner at the upper left of the whole screen region 50 is taken as a changing channels up operating region for television broadcasts, the selection operating region 66 set to the corner at the lower left of the whole screen region 50 is taken as a changing channels down operating region.

Also, the selection operating region 67 set to the corner at the upper right of the whole screen region 50 is taken as a turning volume up operating region for sound volume output, the selection operating region 68 set to the corner at the lower right of the whole screen region 50 is taken as a turning volume down operating region. A selection operation to be set to the selection operating regions may be changed as appropriate.

The four selection operating regions 65, 66, 67, and 68 include first selection operating regions 65a, 66a, 67a, and 68a set in the virtual screen region 52, and second selection operating regions 65b, 66b, 67b, and 68b set in the real screen region 51, respectively.

An icon 4 corresponding to each of the second selection operating regions is displayed within the second selection operating regions 65b, 66b, 67b, and 68b set in the real screen region 51. The icons 4 may be displayed all the time, or may be displayed when the real pointer 2′ enters the second selection operating regions 65b, 66b, 67b, and 68b. Alternatively, the icons 4 may be displayed when the virtual pointer 2″ enters the first selection operating regions 65a, 66a, 67a, and 68a. In the case of a mode wherein the icons 4 are not displayed all the time, the visibility of the real screen region 51 can be improved.

The MPU 35 of the control device 40 determines whether or not the first coordinate values are positioned in the selection operating regions 65, 66, 67, and 68, and in the case that the first coordinate values are positioned in one of the selection operating regions, should execute the processing corresponding to the selection operating region thereof.

As shown in FIG. 36, in the case that the selection operating regions are set to the two regions of the virtual screen region 52 and the real screen region 51 as well, the same advantage as the ninth embodiment can be obtained. That is to say, the user can switch the channel for a television broadcast or the like, or adjust sound volume output by intuitive operations of the pointer 2.

FIG. 36 illustrates a case where in the event that the virtual pointer 2" exists within the vertical screen region 52, the real pointer 2' is displayed in the real screen region 51, but the real pointer 2' does not have to be displayed. Also, FIG. 36 illustrates a case where when the processing corresponding to the determined selection operating region is being executed, the image 59 corresponding to the processing thereof is displayed in the real screen region 51, but the image 59 does not have to be displayed.

Various Modifications

The embodiments according to the present invention are not restricted to the above-mentioned embodiments, and various modifications are available.

An embodiment of the present invention may be applied to, for example, a handheld device including a display unit. In this case, the user moves the pointer 2 displayed on the display unit by moving the main unit of the handheld device. Examples of the handheld device include PDAs (Personal Digital Assistants), cellular phones, portable music players, and digital cameras.

With the above-mentioned embodiments, a mode has been illustrated wherein the input device 1 wirelessly transmits the input information to the control device 40, but the input information may be transmitted by cable.

With the above-mentioned embodiment, the biaxial acceleration sensor unit, and biaxial angular velocity sensor unit have been described. However, regardless of this, the input device 1 may include both of an orthogonal triaxial acceleration sensor and an orthogonal triaxial angular velocity sensor, or may include just one of theses, by which the processing illustrated in the above-mentioned embodiments are realized. Alternatively, a mode can be conceived wherein the input device 1 includes a single-axis acceleration sensor or a single-axis angular velocity sensor. In the case that a single-axis acceleration sensor or a single-axis angular velocity sensor is provided, typically a screen can be conceived wherein a plurality of GUI serving as an pointing object of the pointer 2 to be displayed on the screen 3 are arrayed on a single axis.

Alternatively, the input device 1 may include a geomagnetic sensor or image sensor instead of the acceleration sensor and angular velocity sensor.

The detection axes of the angular velocity sensor unit 15 and the acceleration sensor unit 16, of the sensor unit 17 do not have to be orthogonal mutually, as with the X' axis and Y' axis described above. In this case, each acceleration projected in the mutually orthogonal axial direction is obtained by a computation using a trigonometric function. Also, similarly, each acceleration around the mutually orthogonal axes may be obtained by a computation employing a trigonometric function.

With regard to the sensor unit 17 described in the above-mentioned embodiments, a mode has been described wherein the detection axes of the X' axis and the Y' axis of the angular velocity sensor unit 15 are matched with the detection axes of the X' axis and the Y' axis of the acceleration sensor unit 16, respectively. However, these axes does not have to be matched. For example, in the case that the angular velocity sensor unit 15 and the acceleration sensor unit 16 will be mounted on a substrate, the angular velocity sensor unit 15 and the acceleration sensor unit 16 may be mounted on the substrate by being shifted within the principal surface of the substrate thereof by a predetermined rotation angle so that the detection axes of the angular velocity sensor unit 15 and the acceleration sensor unit 16 are not matched. In this case, the acceleration and angular velocity of each axis may be obtained by a computation employing a trigonometric function.

The present application contains subject matter related to that disclosed in Japanese Priority Patent Application JP 2009-135018 filed in the Japan Patent Office on Jun. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A control device comprising:
   processing circuitry configured to:
   receive information relating to a pointing position of an object;
   determine, based on the received information, whether the pointing position is within an image region;
   control display of a first pointer within the image region in accordance with movement of the pointing position;
   when the first pointer moves toward outside of the image region while the pointing position moves toward outside of the image region, control the image region to display the first pointer; and
   when the first pointer does not move toward outside of the image region while the pointing position moves toward outside of the image region, control the image region to display a second pointer different from the first pointer.

2. The control device of claim 1, wherein the processing circuitry is configured to control the image region to display the second pointer instead of the first pointer.

3. The control device of claim 2, wherein the second pointer indicates the pointing position outside of the image region.

4. The control device of claim 3, wherein the second pointer includes an arrow shape, and wherein the arrow shape points toward the pointing position outside of the image region.

5. The control device of claim 2, wherein the processing circuitry is configured to control the image region to change an attribute of the second pointer in accordance with a change of a distance between an edge portion of the image region and the pointing position when the pointing position is outside of the image region.

6. The control device of claim 5, wherein
   the processing circuitry is configured to control the image region to change the shape of the second pointer as the attribute of the second pointer.

7. The control device of claim 5, wherein the processing circuitry is configured to control the image region to change a rate of rotation of the second pointer as the attribute of the second pointer.

8. The control device of claim 5, wherein the processing circuitry is configured to control the image region to change a size of the second pointer as the attribute of the second pointer.

9. The control device of claim 5, wherein the processing circuitry is configured to control the image region to change a number image shown in the second pointer as the attribute of the second pointer.

10. The control device of claim 5, wherein the processing circuitry is configured to control the image region to change a pie chart as the attribute of the second pointer.

11. The control device of claim 5, wherein the processing circuitry is configured to control the image region to change, as the attribute of the second pointer, at least one of a shape of the second pointer, a rate of rotation of the second pointer, a number image shown in the second pointer, a filled portion of a pie chart shown in the second pointer, a color of the second pointer, a color density of the second pointer, or a blink rate of the second pointer.

12. The control device of claim 5, wherein the processing circuitry is configured to control the image region to change the attribute of the second pointer in a state where the second pointer is kept substantially adjacent to an edge portion of the image region.

13. The control device of claim 12, wherein the processing circuitry is configured to control the image region to display the second pointer apart from the edge portion of the image region.

14. The control device of claim 2, wherein the processing circuitry is configured to control the image region to display the second pointer by changing an attribute of the first pointer.

15. The control device of claim 2, wherein the processing circuitry is configured to control the image region to display the first pointer instead of the second pointer when the pointing position is canceled while the pointing position is outside of the image region.

16. The control device of claim 1, wherein the processing circuitry is configured to control the image region to display the first pointer and the second pointer simultaneously.

17. The control device of claim 16, wherein the processing circuitry is configured to control the image region to display an additional region as the second pointer, the additional region indicating the pointing position outside of the image region.

18. The control device of claim 1, wherein the processing circuitry is configured to display at least a part of a whole region including the image region and a peripheral region outside of the image region.

19. The control device of claim 18, wherein the peripheral region is invisible.

20. A control method comprising:
receiving information relating to a pointing position of an object, the pointing position being detected with a sensor configured to detect movement of the object;
determining, based on the received information, whether the pointing position is within an image region, the image region being shown in a display;
controlling display of a first pointer within the image region in accordance with movement of the pointing position;
controlling the image region to display the first pointer when the first image moves toward outside of the image region while the pointing position moves toward outside of the image region; and
controlling the image region to display a second pointer different from the first pointer when the first pointer does not move toward outside of the image region while the pointing position moves toward outside of the image region.

* * * * *